(12) United States Patent
Dhanal et al.

(10) Patent No.: US 11,624,170 B2
(45) Date of Patent: Apr. 11, 2023

(54) WORK VEHICLE MULTI-SPEED DRIVE ASSEMBLY WITH CLUTCH RETENTION MECHANISM

(71) Applicant: Deere & Company, Moline, IL (US)

(72) Inventors: Yuvraj V. Dhanal, Pune (IN); Yuvraj B. Gosavi, Pune (IN); Jeffrey S. Turner, Coffeyville, KS (US); Lisa R. Lloyd, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/185,713

(22) Filed: Feb. 25, 2021

(65) Prior Publication Data

US 2022/0267991 A1 Aug. 25, 2022

(51) Int. Cl.
*E02F 9/20* (2006.01)
*F16D 11/14* (2006.01)
*F16D 11/00* (2006.01)

(52) U.S. Cl.
CPC .............. *E02F 9/202* (2013.01); *F16D 11/14* (2013.01); *F16D 2011/006* (2013.01)

(58) Field of Classification Search
CPC ........ F16D 2023/0618; F16D 11/00–14; E02F 9/202
See application file for complete search history.

(56) References Cited

U.S. PATENT DOCUMENTS

| | | |
|---|---|---|
| 1,625,564 A | 4/1927 | Pollard |
| 2,685,948 A | 8/1954 | Freeman et al. |
| 3,062,073 A | 11/1962 | Brass |
| 3,081,759 A | 3/1963 | Mauck et al. |
| 3,150,544 A | 9/1964 | Brass |

(Continued)

FOREIGN PATENT DOCUMENTS

| | | |
|---|---|---|
| CN | 106763565 A | 5/2017 |
| DE | 2619011 A1 | 8/1977 |

(Continued)

OTHER PUBLICATIONS

USPTO non-final office action issued in pending Utility U.S. Appl. No. 17/080,562 dated Dec. 6, 2021.

(Continued)

*Primary Examiner* — David R Morris
(74) *Attorney, Agent, or Firm* — Klintworth & Rozenblat IP LLP

(57) ABSTRACT

A drive assembly for a work vehicle has a drive housing including at least one housing element forming a reaction member, a drive shaft rotatable about a drive axis, and a planetary gear set coupled to the drive shaft and configured to selectively rotate an output element. The drive assembly also includes at least one clutch arrangement having at least one clutch ring configured to selectively interact with the planetary gear set to effect a rotation speed of the output element. At least one actuator is configured to axially drive the clutch ring along the drive axis. A retention mechanism is configured to retain the clutch ring at an axial position along the drive axis. The retention mechanism includes a detent ball, a detent groove and a resilient member configured to urge the detent ball into the detent groove to retain the clutch ring at the axial position.

19 Claims, 26 Drawing Sheets

(56) References Cited

U.S. PATENT DOCUMENTS

| | | | |
|---|---|---|---|
| 3,640,152 A | 2/1972 | Shirai et al. | |
| 3,675,511 A | 7/1972 | Wakamatsu et al. | |
| 3,942,024 A | 3/1976 | Ingham | |
| 4,122,354 A | 10/1978 | Howland | |
| 4,213,299 A | 7/1980 | Sharar | |
| 4,473,752 A | 9/1984 | Cronin | |
| 4,484,495 A | 11/1984 | Mason | |
| 4,569,252 A | 2/1986 | Harper | |
| 4,631,455 A | 12/1986 | Taishoff | |
| 4,708,030 A | 11/1987 | Cordner | |
| 4,750,384 A | 6/1988 | Belliveau | |
| 4,862,009 A | 8/1989 | King | |
| 4,916,980 A | 4/1990 | Asada et al. | |
| 4,926,713 A | 5/1990 | Madill | |
| 5,033,994 A | 7/1991 | Wu | |
| 5,177,968 A | 1/1993 | Fellows | |
| 5,418,400 A | 5/1995 | Stockton | |
| 5,558,173 A | 9/1996 | Sherman | |
| 5,856,709 A | 1/1999 | Ibaraki et al. | |
| 5,993,354 A * | 11/1999 | Winks | F16D 23/06 477/109 |
| 6,015,363 A | 1/2000 | Mathis | |
| 6,371,877 B1 | 4/2002 | Schroeder et al. | |
| 6,378,479 B1 | 4/2002 | Nishidate et al. | |
| RE37,743 E | 6/2002 | Yang | |
| 6,409,622 B1 | 6/2002 | Bolz et al. | |
| 6,484,596 B2 | 11/2002 | Puchas | |
| 6,527,658 B2 | 3/2003 | Holmes et al. | |
| 6,569,054 B2 | 5/2003 | Kato | |
| 6,582,333 B2 | 6/2003 | Man | |
| 6,661,109 B2 | 12/2003 | Fukasaku et al. | |
| 6,746,354 B1 | 6/2004 | Ziemer | |
| 6,770,005 B2 | 8/2004 | Aikawa et al. | |
| 6,811,010 B1 * | 11/2004 | Armstrong | F16D 23/06 192/48.91 |
| 6,832,970 B2 | 12/2004 | Eibler | |
| 6,852,063 B2 | 2/2005 | Takahashi et al. | |
| 6,910,453 B2 | 6/2005 | Sugino et al. | |
| 6,965,173 B2 | 11/2005 | Fukasaku et al. | |
| 7,028,794 B2 | 4/2006 | Odahara et al. | |
| 7,044,255 B2 | 5/2006 | Maeda et al. | |
| 7,086,978 B2 | 8/2006 | Aikawa et al. | |
| 7,117,965 B2 | 10/2006 | Yatabe et al. | |
| 7,223,191 B2 | 5/2007 | Aikawa et al. | |
| 7,374,031 B2 | 5/2008 | Skorucak | |
| 7,387,043 B2 | 6/2008 | Sakamoto et al. | |
| 7,503,871 B2 | 3/2009 | Kozarekar et al. | |
| 7,582,033 B2 | 9/2009 | Kefti-Cherif et al. | |
| 7,753,147 B2 | 7/2010 | Usoro | |
| 7,780,562 B2 | 8/2010 | King et al. | |
| 8,143,735 B2 | 3/2012 | Bauer | |
| 8,226,517 B2 | 7/2012 | Tsai et al. | |
| 8,235,859 B2 | 8/2012 | Yun | |
| 8,480,529 B2 | 7/2013 | Pohl et al. | |
| 8,500,601 B2 | 8/2013 | Arnold et al. | |
| 8,584,359 B1 | 11/2013 | Bowman | |
| 8,727,944 B2 | 5/2014 | Noboru et al. | |
| 8,734,281 B2 | 5/2014 | Ai et al. | |
| 8,996,227 B2 | 3/2015 | Sisk et al. | |
| 9,017,207 B2 | 4/2015 | Pohl et al. | |
| 9,074,656 B2 | 7/2015 | Benz et al. | |
| 9,145,136 B2 | 9/2015 | Suntharalingam et al. | |
| 9,184,646 B2 | 11/2015 | Fulton | |
| 9,261,064 B2 | 2/2016 | Patel et al. | |
| 9,371,810 B2 | 6/2016 | Creviston | |
| 9,421,855 B2 | 8/2016 | Suntharalingam et al. | |
| 9,541,172 B1 | 1/2017 | Wright | |
| 9,555,795 B2 | 1/2017 | Nefcy et al. | |
| 9,676,265 B2 | 6/2017 | Choi | |
| 9,726,282 B2 | 8/2017 | Pohl et al. | |
| 9,829,103 B2 | 11/2017 | Volpert | |
| 9,862,260 B2 | 1/2018 | Lee | |
| 10,167,906 B2 | 1/2019 | Neelakantan et al. | |
| 10,183,569 B2 | 1/2019 | Toyota et al. | |
| 10,422,389 B2 | 9/2019 | Ebihara | |
| 10,479,187 B2 | 11/2019 | Lubben et al. | |
| 10,487,918 B2 | 11/2019 | Turner et al. | |
| 10,518,626 B2 | 12/2019 | Pettersson | |
| 10,519,920 B2 | 12/2019 | Patil et al. | |
| 10,591,025 B2 | 3/2020 | Fliearman et al. | |
| 10,619,711 B2 | 4/2020 | Fliearman et al. | |
| 10,900,454 B1 | 1/2021 | Fliearman et al. | |
| 2001/0019210 A1 | 9/2001 | Fukasaku et al. | |
| 2001/0025621 A1 | 10/2001 | Shiraishi et al. | |
| 2001/0042649 A1 | 11/2001 | Maeda et al. | |
| 2002/0019284 A1 | 2/2002 | Aikawa et al. | |
| 2002/0033059 A1 | 3/2002 | Pels | |
| 2002/0117860 A1 | 8/2002 | Man et al. | |
| 2002/0139592 A1 | 10/2002 | Fukasaku et al. | |
| 2002/0177504 A1 | 11/2002 | Pels | |
| 2003/0001391 A1 | 1/2003 | Kuang et al. | |
| 2003/0104900 A1 | 6/2003 | Takahashi | |
| 2003/0224888 A1 | 12/2003 | Wilder et al. | |
| 2004/0055800 A1 | 3/2004 | Katou et al. | |
| 2004/0116226 A1 | 6/2004 | Baker et al. | |
| 2006/0111211 A1 | 5/2006 | Kefti-Cherif et al. | |
| 2006/0154771 A1 | 7/2006 | Klemen et al. | |
| 2006/0166777 A1 | 7/2006 | Aikawa et al. | |
| 2007/0108006 A1 | 5/2007 | Schmid et al. | |
| 2007/0157899 A1 | 7/2007 | Seufert et al. | |
| 2007/0265126 A1 | 11/2007 | Janson et al. | |
| 2008/0162007 A1 | 7/2008 | Ishii et al. | |
| 2008/0179119 A1 | 7/2008 | Grenn et al. | |
| 2008/0179159 A1 * | 7/2008 | Pollman | F16D 13/30 60/435 |
| 2008/0314195 A1 | 12/2008 | Andoh et al. | |
| 2009/0055061 A1 | 2/2009 | Zhu | |
| 2009/0176611 A1 | 7/2009 | Avery | |
| 2009/0264241 A1 | 10/2009 | Dittrich et al. | |
| 2009/0312145 A1 | 12/2009 | Pohl et al. | |
| 2010/0029428 A1 | 2/2010 | Abe et al. | |
| 2010/0044183 A1 | 2/2010 | Guggolz et al. | |
| 2010/0048338 A1 | 2/2010 | Si | |
| 2010/0063704 A1 | 3/2010 | Okubo et al. | |
| 2010/0076634 A1 | 3/2010 | Brigham | |
| 2010/0190602 A1 | 7/2010 | Wittkopp et al. | |
| 2010/0234166 A1 | 9/2010 | Samie et al. | |
| 2011/0010031 A1 | 1/2011 | Syed et al. | |
| 2011/0015020 A1 | 1/2011 | Grosser | |
| 2011/0053729 A1 | 3/2011 | Parsons et al. | |
| 2011/0070999 A1 | 3/2011 | Soliman et al. | |
| 2011/0152026 A1 | 6/2011 | Williams | |
| 2011/0263379 A1 | 10/2011 | Liang et al. | |
| 2012/0103293 A1 | 5/2012 | Robinette et al. | |
| 2012/0165156 A1 | 6/2012 | Oguri | |
| 2012/0235473 A1 | 9/2012 | Jiang et al. | |
| 2012/0240723 A1 | 9/2012 | Gluckler et al. | |
| 2012/0316026 A1 | 12/2012 | Oguri et al. | |
| 2013/0046427 A1 | 2/2013 | Hohenberg | |
| 2013/0252773 A1 | 9/2013 | Suntharalingam et al. | |
| 2013/0316873 A1 | 11/2013 | Jansen et al. | |
| 2014/0011619 A1 | 1/2014 | Pohl et al. | |
| 2014/0128205 A1 | 5/2014 | Phillips et al. | |
| 2014/0137824 A1 | 5/2014 | Jacques et al. | |
| 2014/0150604 A1 | 6/2014 | Kaltenbach | |
| 2014/0256490 A1 | 9/2014 | Honda | |
| 2015/0143936 A1 * | 5/2015 | Eo | F16H 3/089 74/339 |
| 2015/0226323 A1 | 8/2015 | Pohl et al. | |
| 2015/0239335 A1 | 8/2015 | Wachter et al. | |
| 2016/0031438 A1 | 2/2016 | Matsui et al. | |
| 2016/0031439 A1 | 2/2016 | Nefcy et al. | |
| 2016/0052382 A1 | 2/2016 | Clark et al. | |
| 2016/0076629 A1 | 3/2016 | Modrzejewski et al. | |
| 2016/0082821 A1 | 3/2016 | Mueller et al. | |
| 2016/0096522 A1 | 4/2016 | Ortmann et al. | |
| 2016/0137045 A1 | 5/2016 | Zhu et al. | |
| 2016/0200311 A1 | 7/2016 | Nefcy et al. | |
| 2016/0207525 A1 | 7/2016 | Nefcy et al. | |
| 2016/0258495 A1 | 9/2016 | Bird | |
| 2016/0288780 A1 | 10/2016 | Shukla et al. | |
| 2016/0348741 A1 | 12/2016 | Niemiec et al. | |
| 2017/0050508 A1 | 2/2017 | Pritchard et al. | |
| 2017/0248196 A1 | 8/2017 | Turner et al. | |

(56) References Cited

U.S. PATENT DOCUMENTS

| | | |
|---|---|---|
| 2017/0328470 A1 | 11/2017 | Pohl et al. |
| 2017/0368925 A1 | 12/2017 | Maki |
| 2018/0100564 A1 | 4/2018 | Fliearman et al. |
| 2018/0106365 A1 | 4/2018 | Tsukizaki et al. |
| 2018/0149247 A1 | 5/2018 | Rekow et al. |
| 2018/0172124 A1 | 6/2018 | Valente et al. |
| 2018/0186230 A1 | 7/2018 | Fukuda et al. |
| 2018/0236864 A1 | 8/2018 | Imamura et al. |
| 2018/0238443 A1 | 8/2018 | Aulin et al. |
| 2018/0244145 A1 | 8/2018 | Ohnemus et al. |
| 2018/0298993 A1 | 10/2018 | Fliearman et al. |
| 2019/0084555 A1 | 3/2019 | Omura et al. |
| 2019/0160936 A1 | 5/2019 | Lubben et al. |
| 2019/0176609 A1 | 6/2019 | Bando |
| 2019/0176806 A1 | 6/2019 | Trent |
| 2019/0219022 A1 | 7/2019 | Patil et al. |
| 2019/0344655 A1 | 11/2019 | Pettersson |
| 2019/0351751 A1 | 11/2019 | Sato et al. |
| 2020/0331337 A1 | 10/2020 | Fliearman et al. |
| 2020/0331338 A1 | 10/2020 | Fliearman et al. |
| 2020/0332754 A1 | 10/2020 | Fliearman et al. |
| 2020/0332756 A1 | 10/2020 | Fliearman et al. |
| 2020/0332757 A1 | 10/2020 | Fliearman et al. |
| 2020/0332864 A1 | 10/2020 | Fliearman et al. |
| 2020/0332865 A1 | 10/2020 | Fliearman et al. |
| 2020/0332866 A1 | 10/2020 | Fliearman et al. |
| 2020/0332867 A1 | 10/2020 | Fliearman et al. |
| 2020/0332868 A1 | 10/2020 | Fliearman et al. |

FOREIGN PATENT DOCUMENTS

| | | | |
|---|---|---|---|
| DE | 3120675 A1 | | 2/1982 |
| DE | 3444562 A1 | | 6/1985 |
| DE | 69218975 T2 | | 6/1994 |
| DE | 69008994 T2 | | 12/1994 |
| DE | 10007959 A1 | | 9/1998 |
| DE | 19745995 A1 | | 9/1998 |
| DE | 19927521 A1 | | 6/2000 |
| DE | 19911924 A1 | | 9/2000 |
| DE | 19923316 A1 | | 11/2000 |
| DE | 10003741 A1 | | 4/2001 |
| DE | 10103726 A1 | | 8/2002 |
| DE | 102006037576 A1 | | 4/2008 |
| DE | 112007000573 | | 1/2009 |
| DE | 102010007612 | | 10/2010 |
| DE | 1020100005178 | | 11/2010 |
| DE | 102010030570 A1 | | 12/2011 |
| DE | 102010030571 A1 | | 12/2011 |
| DE | 102010060140 A1 | | 4/2012 |
| DE | 102011080068 A1 | | 1/2013 |
| DE | 102011089708 A1 | | 6/2013 |
| DE | 102011089709 A1 | | 6/2013 |
| DE | 102011089710 A1 | | 6/2013 |
| DE | 112011103973 T5 | | 10/2013 |
| DE | 102008045202 A1 | | 3/2014 |
| DE | 102013203009 A1 | | 8/2014 |
| DE | 102013012747 A1 | | 9/2014 |
| DE | 102013206970 A1 | | 10/2014 |
| DE | 102013209022 A1 | | 11/2014 |
| DE | 102014200720 A1 | | 2/2015 |
| DE | 102014200723 B3 | | 2/2015 |
| DE | 102013219948 A1 | | 4/2015 |
| DE | 102014225298 A1 | | 7/2015 |
| DE | 112014000378 T5 | | 9/2015 |
| DE | 112014000411 T5 | | 10/2015 |
| DE | 102017203026 A1 | | 8/2017 |
| DE | 102017204269 A1 | | 9/2017 |
| DE | 112016004789 | | 7/2018 |
| DE | 102018122936 | | 3/2020 |
| DE | 102019204909 A1 | | 10/2020 |
| DE | 102020204705 A1 | | 10/2020 |
| DE | 102020204795 A1 | | 10/2020 |
| EP | 0384808 A1 | | 9/1991 |
| EP | 645271 B1 | | 3/1995 |
| EP | 0391386 B1 | | 9/1995 |
| EP | 2272702 A2 | | 1/2011 |
| EP | 2664785 | | 11/2013 |
| EP | 1069310 B4 | | 3/2014 |
| GB | 650564 | | 2/1951 |
| GB | 2506199 A | | 3/2014 |
| JP | 04296649 A | | 10/1992 |
| JP | 2003267079 A | | 9/2003 |
| JP | 2015116004 A | | 6/2015 |
| WO | 1999023398 A2 | | 5/1999 |
| WO | 200100088369 A1 | | 11/2001 |
| WO | 200700107458 | | 9/2007 |
| WO | 2012078203 A1 | | 6/2012 |
| WO | 2018028745 | | 2/2018 |

OTHER PUBLICATIONS

NTN Automotive Sales Headquarters, Compact Clutch Integrated Pulley for Alternators, NTN Technical Review No. 75, 2007.
Harmonic Drive LLC, Harmonic Planetary Precision Gearing & Motion Control, Product Brochure, Mar. 2006.
Ioan-Adrian Viorel et al., Integrated Starter-Generators for Automotive Applications, Technical University of Cluj-Romania, Dept. of Electrical Machines, vol. 45, No. 3, 2004.
North Atalantic Starter, Starter Drives Explained, Northatlan.com, 2005.
German Search Report for application No. 1020182214956 dated May 28, 2019.
USPTO Final Office Action dated Mar. 8, 2019 for Utility U.S. Appl. No. 15/056,767.
USPTO Final Office Action dated Jun. 11, 2018 for Utility U.S. Appl. No. 15/056,767.
USPTO Non-Final Office Action dated Sep. 9, 2019 for Utility U.S. Appl. No. 15/834,356.
USPTO Non-Final Office Action dated Nov. 2, 2017 for Utility U.S. Appl. No. 15/056,767.
USPTO Non-Final Office Action dated Sep. 28, 2018 for Utility U.S. Appl. No. 15/056,767.
USPTO Non-Final Office Action dated Nov. 1, 2018 for Utility U.S. Appl. No. 15/825,520.
USPTO Non-Final Office Action dated Feb. 25, 2019 for Utility U.S. Appl. No. 15/834,356.
USPTO Non-Final Office Action dated Mar. 4, 2020 for Utility U.S. Appl. No. 16/385,934.
USPTO Non-Final Office Action dated Jun. 19, 2020 for Utility U.S. Appl. No. 16/386,075.
USPTO Non-Final Office Action dated Aug. 24, 2020 for Utility U.S. Appl. No. 16/385,964.
USPTO Non-Final Office Action dated Aug. 24, 2020 for Utility U.S. Appl. No. 16/385,784.
USPTO Non-Final Office Action dated Nov. 4, 2020 for Utility U.S. Appl. No. 16/385,860.
USPTO Non-Final Office Action dated Oct. 30, 2020 for Utility U.S. Appl. No. 16/386,052.
Deere & Company, Utility U.S. Appl. No. 17/032,114, filed Sep. 25, 2020.
Deere & Company, Utility U.S. Appl. No. 16/887,973, filed May 29, 2020.
Deere & Company, Utility U.S. Appl. No. 16/887,998, filed May 29, 2020.
Deere & Company, Utility U.S. Appl. No. 17/080,562, filed Oct. 26, 2020.
Deere & Company, Utility U.S. Appl. No. 17/185,692, filed Feb. 25, 2021.
USPTO non-final office action issued in pending Utility U.S. Appl. No. 16/887,973 dated Jan. 31, 2022.
German Search Report issued in application No. DE102022200825.1 dated Sep. 27, 2022 with machine translation (26 pages).
German Search Report issued in application No. DE102022206133.0 dated Oct. 12, 2022 with machine translation (26 pages).
Non-Final Office Action issued in U.S. Appl. No. 17/,216,243 dated Dec. 13, 2022, 22 pages.
USPTO Non-Final Office Action issued in U.S. Appl. No. 17/325,437 dated Feb. 9, 2023 9 pages.

(56) References Cited

OTHER PUBLICATIONS

German Search Report issued in application No. DE 102022203350.7 dated Jan. 17, 2023 with translation 12 pages.

\* cited by examiner

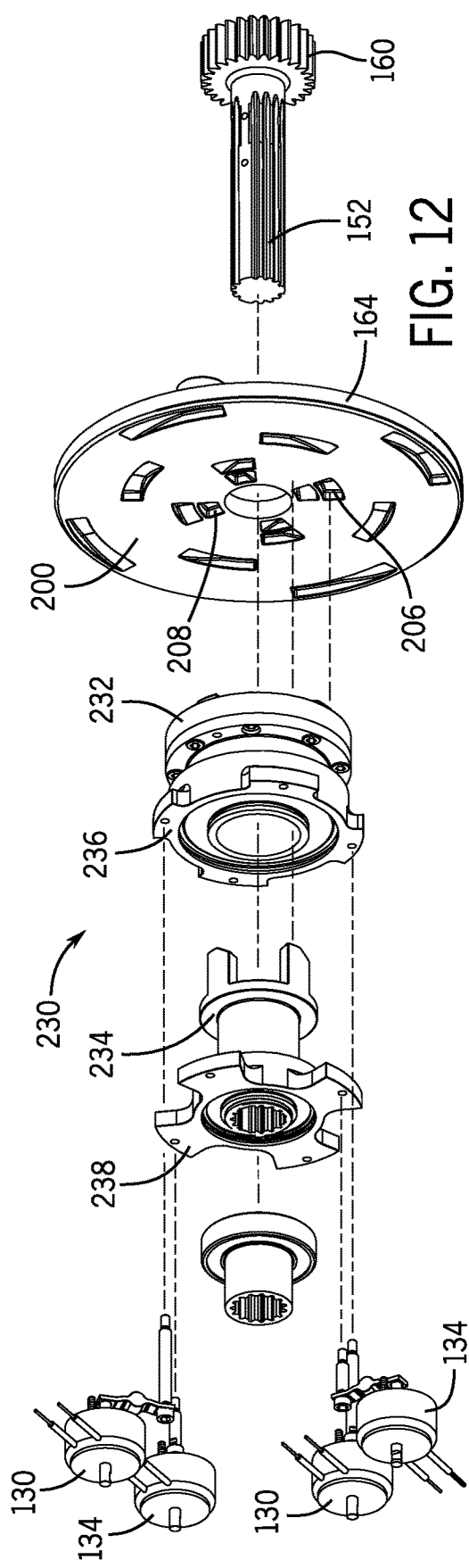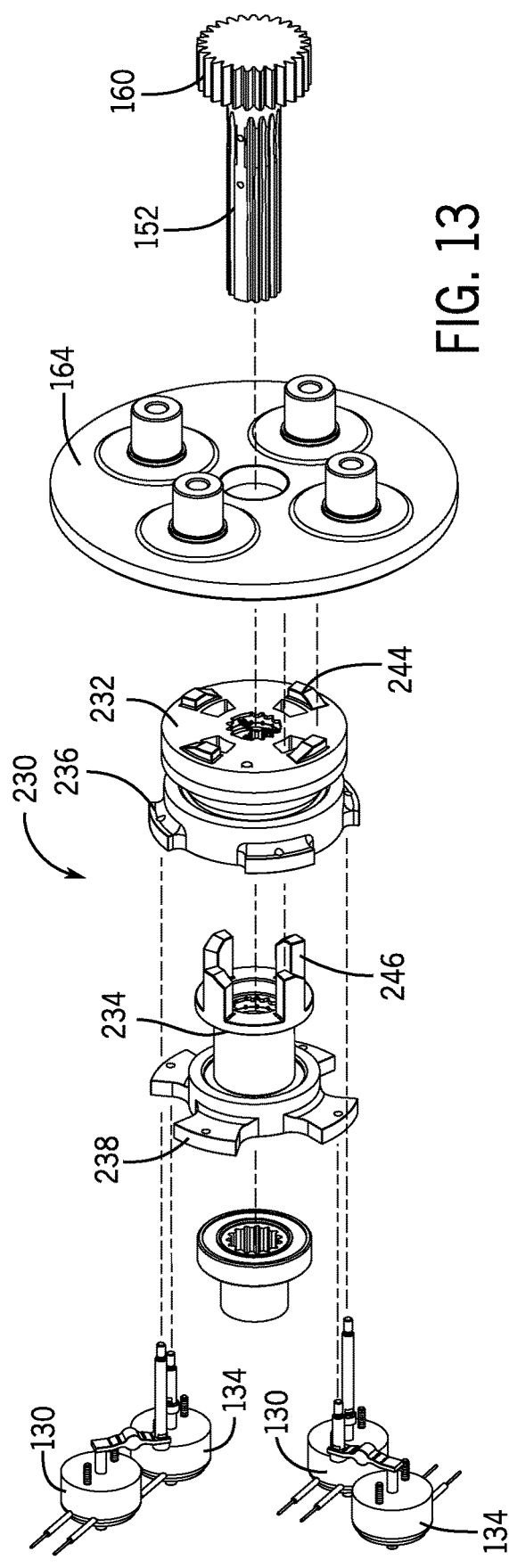

WORK VEHICLE MULTI-SPEED DRIVE ASSEMBLY WITH CLUTCH RETENTION MECHANISM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle drive systems, including drive assemblies in which a clutch arrangement is selectively retained at one or more axial positions.

BACKGROUND OF THE DISCLOSURE

Work vehicles, such as those used in the agriculture, construction and forestry industries, and other conventional vehicles, may be powered by an internal combustion engine (e.g., a diesel engine) and/or one or more electric power sources (e.g., electric motors). Various drive arrangements may be employed in the vehicle to effect power transfer from the prime or secondary power sources. For example, the vehicle power and drive line may include one or more drive assemblies to effect one or more output speeds for operating certain vehicle components. For example, wheel end drives, final drives and the like may provide one or more gear ratios to transfer terminal or near terminal power to the tractive ground-engaging wheels or tracks of the vehicle. Efficient and smooth operation through the speed and torque ranges required of such drives is desirable.

SUMMARY OF THE DISCLOSURE

This disclosure provides a multi-speed drive assembly such as may be used in work vehicles (e.g., as tractive wheel drives).

In one aspect, the disclosure provides a drive assembly for a work vehicle having a drive housing including at least one housing element forming a reaction member, a drive shaft rotatable about a drive axis relative to the reaction member, and a planetary gear set coupled to the drive shaft and configured to selectively rotate an output element. The drive assembly further includes at least one clutch arrangement having at least one clutch ring configured to selectively interact with the planetary gear set to effect a rotation speed of the output element, and at least one actuator configured to axially drive the clutch ring along the drive axis to selectively interact with the planetary gear set. A retention mechanism is configured to retain the clutch ring at one or more axial positions along the drive axis and includes a detent ball, a detent groove and a resilient member configured to urge the detent ball into the detent groove to retain the clutch ring at an axial position.

In another aspect, the disclosure provides a drive assembly for a work vehicle including a drive housing having at least one housing element forming a stationary reaction member, a stationary spindle secured to a housing element of the at least one housing element forming stationary reaction member, a drive shaft rotatable about a drive axis relative to the stationary reaction member and the stationary spindle, and a planetary gear set coupled to the first drive shaft and configured to selectively rotate an output element. The planetary gear set includes a sun gear coupled to the drive shaft, a planet carrier, a set of planet gears supported by the planet carrier and engaging the sun gear, and a ring gear circumscribing and engaging the planet gears. The drive assembly also includes a plurality of clutch rings, each clutch ring interfaced with the stationary spindle or the drive shaft, and configured for movement along the drive axis to selectively engage and disengage the planet carrier. The drive assembly further includes a plurality of actuators, at least one actuator of the plurality of actuators configured for axially driving a corresponding clutch ring of the plurality of clutch rings along the drive axis from a first axial position to a second axial position, and a plurality of retention mechanisms, each retention mechanism configured to retain the corresponding clutch ring at the first axial position and the second axial position along the drive axis. Each retention mechanism includes a detent ball, a detent groove and a resilient member configured to urge the detent ball into the detent groove to retain the corresponding clutch ring at the first axial position and the second axial position.

The details of one or more embodiments are set forth in the accompanying drawings and the description below. Other features and advantages will become apparent from the description, the drawings, and the claims.

BRIEF DESCRIPTION OF THE DRAWINGS

FIGS. 12 and 13 are isolated exploded views of the second input clutch arrangement;

Like reference symbols in the various drawings indicate like elements.

DETAILED DESCRIPTION

Figure 1:
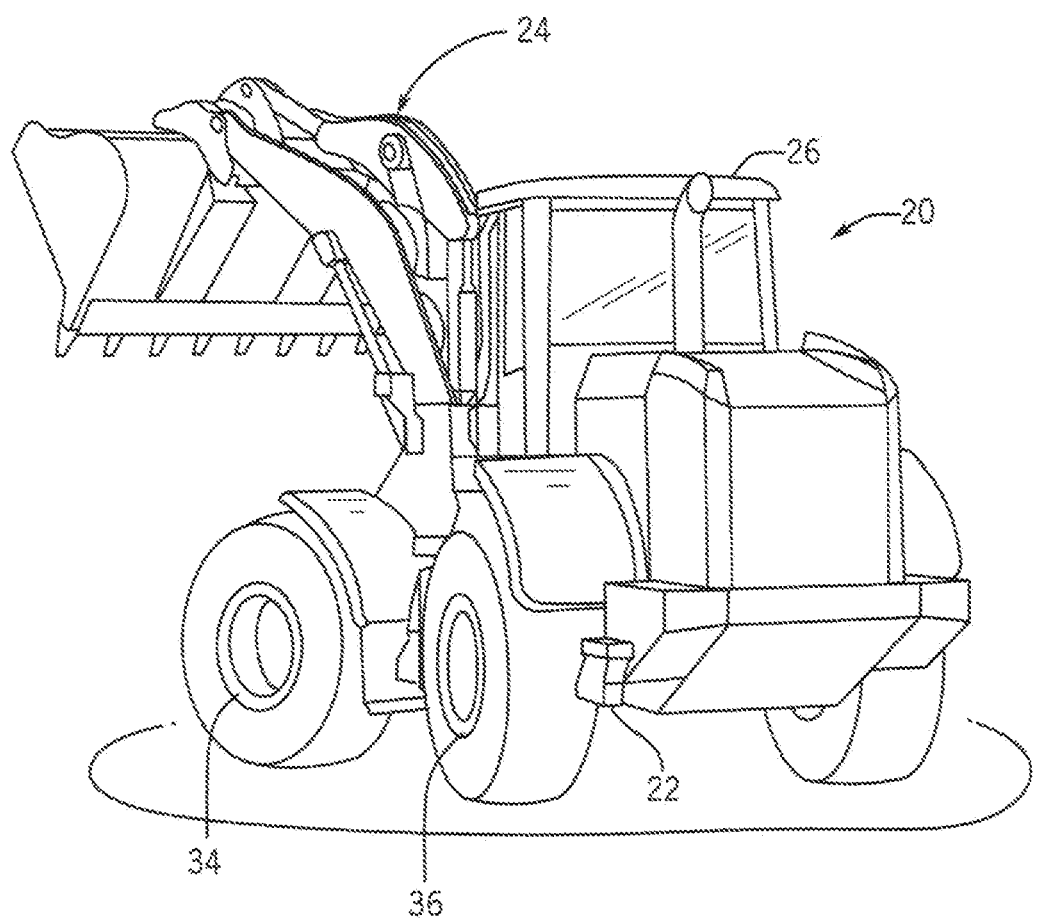
FIG. 1 is a simplified perspective side view of an example work vehicle in the form of a wheel loader in which the disclosed drive assembly may be employed.

The following describes one or more example embodiments of the disclosed drive assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension. Additionally, the term "circumferential" may refer to a collective tangential dimension that is perpendicular to the radial and axial dimensions about an axis.

Overview

Generally, the disclosure provides a drive assembly for a work vehicle that selectively retains a clutch element at one or more axial positions relative to a planetary gear set. In example implementations, the drive assembly retains the clutch element at an axial position where the clutch element is disengaged from the planetary gear set and at another axial position where the clutch element is engaged with the planetary gear set. The drive assembly may retain the clutch element at the one or more axial positions independently from an actuator for moving the clutch element. In one example implementation, the drive assembly may be employed in a common configuration for wheel end drive units for one or more wheels of the work vehicle.

In certain embodiments, the drive assembly is or includes a power transmission assembly with a gear set that is driven by a power source, such as one or more electric machines or hydraulic motors. The gear set transmits rotational power from the power source to a rotating output member. The output member may be an intermediate component or tied directly to the driven component. The gear set may effect a ratio change between the input power source and the output member, directly transmit the power without a change in ratio, or a combination thereof. The output member may thus rotate at the same speed as, or one or more different speeds than, the input power source or input shaft. The gear set may take any of various forms including arrangements with enmeshing spur or other gears as well as arrangements with one or more planetary gear sets. Large gear reduction ratios may be achieved by the drive assembly such that a single electric machine or hydraulic motor may be used and operated at suitable speeds for one or more speed and torque outputs. However, multiple electric machines or hydraulic motors may power the drive assembly.

Further, in certain embodiments, the drive assembly may automatically and/or selectively shift gear ratios (i.e., shift between power flow paths having different gear ratios). The drive assembly may include one or more active engagement components that engage or disengage to effect power transmission through a power flow path. In this manner, clutch configurations may be employed to carry out the ratio changes with appropriate control hardware and logic. In various embodiments, the clutch arrangements may have one or more positive interlocking shifting type clutches, possibly referred to as "dog" clutches, in which raised features (e.g., axially extending projections) of the clutches engage and disengage corresponding raised features or move into and out of corresponding recesses in mating components of the gear set. In the case of male/female mating features, a reverse relationship may exist (e.g., the clutches define the recesses receiving raised projections of the gear set). Moreover, one or more clutches may serve to engage and disengage interlocking features of two or more components of a planetary gear set, such that one or more clutch components do not have interlocking features themselves.

In certain embodiments, the drive assembly includes one or more (i.e., at least one) input clutch arrangements. The one or more input clutch arrangements may be interfaced with a stationary reaction member of the drive assembly or a rotating component of the drive assembly. The stationary reaction member may be a stationary housing element or other component fixed relative to the housing element. The rotating component may be, for example, a drive shaft. An input clutch arrangement is configured to selectively engage with and disengage from a planetary gear set to effect one or more gear ratios and corresponding output rotation speeds and torques. For example, engagement of an input clutch arrangement interfaced with a stationary reaction member to the planetary gear set grounds one or more components of the planetary gear set. Conversely, engagement of an input clutch arrangement interfaced with a rotating component of the drive assembly to the planetary gear set may rotationally fix one or more components of the planetary gear set to the rotating component of the drive assembly. An input clutch arrangement may be permanently coupled to the reaction member such that actuating components may be fixedly mounted to the drive assembly without the need for actuation of moving gear set components and the corresponding service lines (e.g., hydraulic passages or lines). Actuation components may also be mounted fixed relative to the reaction member to further reduce or eliminate service lines to non-stationary components. Selective engagement of the multiple clutch elements by the actuation components thereby allows the drive assembly to output multiple output speeds and torques.

In one implementation, the one or more input clutch arrangements include first and second input clutch arrangements selectively actuated to engage and disengage a planetary gear set. In this example, engagement of the first input clutch arrangement grounds a component of the planetary gear set to effect a first gear ratio and output rotation speed and torque. Engagement of the second input clutch arrangement rotationally fixes components of the planetary gear set to effect a second gear ratio and output rotation speed and torque. Such a multi-speed drive assembly may thus effect two speeds by selectively grounding or fixing different components of the planetary gear set. In that case, the second rotation speed of an output element may be greater than the first rotation speed of the output element. In one or more implementations, one of the rotation speeds of the output element (e.g., the second rotation speed) may match the rotation speed and direction of the drive shaft, thereby providing a direct drive mode with a 1:1 gear ratio.

A retention mechanism is interfaced with a clutch arrangement and an adjacent drive assembly component to selectively and releasably retain the clutch arrangement at various axial positions relative to the planetary gear set. For example, the retention mechanism may be interfaced with a clutch element (i.e., a clutch ring) of the clutch arrangement and an adjacent reaction member or rotating component of the drive assembly. The various axial positions include a first axial position at which the clutch element is disengaged from the planetary gear set and a second axial position at which the clutch element is engaged with the planetary gear set. The retention mechanism is configured to retain the clutch element independently from the actuation components. That is, the retention mechanism may retain the clutch element at the one or more axial positions with the actuation components deactivated or deenergized.

The retention mechanism interacts with the clutch element to provide a retention force which retains the clutch element at an axial position. The retention force may be overcome by an axially directed force applied to the clutch element to reposition the clutch element from one axial position to another. In an example implementation, the retention mechanism includes a detent ball, a detent groove, and a resilient member urging the detent ball into the detent groove to provide the retention force. In some implementations, the drive assembly includes a plurality of retention mechanisms, each retention mechanism configured to retain a respective clutch element at one or more axial positions.

In certain embodiments, the drive assembly also includes a control clutch arrangement. The control clutch arrangement is interfaced with a stationary reaction member and the planetary gear set. The control clutch arrangement is configured (e.g., engaged) to couple (i.e., rotationally fix) a reaction component of the planetary gear set to the stationary reaction member and is configured (e.g., disengaged) to alternatively decouple to the reaction component from the stationary reaction member. The control clutch arrangement, when disengaged, damps or attenuates torque transmitted to through the planetary gear set by permitting rotation of the reaction component relative to the stationary reaction member.

In one implementation, the control clutch arrangement is normally engaged to couple (i.e., rotationally fix) the stationary reaction member to the reaction component of the planetary gear set. For example, the control clutch arrangement may be urged into engagement by one or more springs. The control clutch arrangement is selectively disengaged to decouple the stationary reaction member from the reaction component. For example, the control clutch arrangement may be disengaged by activating an actuator to act against the one or more springs to damp or attenuate a torque increase or spike. The torque increase or spike is generated in response to an input clutch arrangement interacting with the planetary gear set, for example, when an input clutch arrangement is moved into engagement with the planetary gear set.

In one or more further examples, the planetary gear set may be a compound planetary gear set including two stages having a first-stage sun gear coupled to a drive shaft, a set of first-stage planet gears circumscribing and engaging the first-stage un gear, a first-stage planet carrier support the first-stage planet gears, a first-stage ring gear, a second-stage sun gear, a second-stage carrier coupled to an output element and a second-stage ring gear. The one or more input clutch arrangements are configured to selectively engage the first-stage planet to effect the rotation speed and rotation direction of the output element.

In an implementation, the first-stage sun gear may be rotationally fixed to the first drive shaft to rotate with the first drive shaft. The second drive shaft may be rotationally fixed to the first-stage ring gear to rotate with the first-stage ring gear. The second-stage ring gear may be rotationally fixed to the second drive shaft to rotate with the second drive shaft, and thus, may be considered an input component. The second-stage sun gear may be a reaction component, and except as described otherwise below, is substantially fixed against rotation. The second-stage carrier may provide the output torque and rotation speed, and thus, may be considered an output component, may be connected to or formed as part of or an entirety of the output element. Such a configuration may be referred to as a ring in, sun reaction, carrier out configuration. In another implementation, the second-stage sun gear may be rotationally fixed to the second drive shaft to rotate with the second drive shaft and may be considered an input component. The second-stage ring gear may be considered a reaction component, and except as described otherwise below, is substantially fixed against rotation. The second-stage carrier may provide the output torque and rotation speed and may be considered an output component. Such a configuration may be referred to as a sun in, ring reaction, carrier out configuration.

The drive assembly also includes an actuation arrangement having one or more (i.e., at least one) actuators operable to engage and/or disengage respective clutch arrangements. In certain embodiments, the actuation arrangement includes a number of electromechanical or electromagnetic solenoid actuators (that convert electrical energy into a mechanical linear push and/or pull force). In one example, one or more solenoid actuators may be used to reposition each individual clutch ring of a particular clutch arrangement, such that at least two solenoid actuators are used to reposition paired or bifurcated clutch rings of a clutch arrangement. Different types of actuators may be used in combination to reposition one or more clutch rings of the clutch arrangements. Various implementations are encompassed by this disclosure.

As used herein with respect to the solenoid and other type of actuators, the term "activated" or "energized" refers to a command that results in the associated solenoid moving its armature by the application of electromagnetic force. In one example, an energize command for the solenoids results in the respective armatures being pushed out of or pulled into the solenoids, which may occur from applying a current to a coil within the solenoid to push or pull the armature out of/into the solenoid. It is also possible to operate the solenoids by discontinuing current to the coil such that a spring pushes/pulls the armature relative to the solenoid coil.

In some implementations, the actuation arrangement may include one or more hydraulic actuators. In one example, the hydraulic actuator includes a hydraulic piston configured for reciprocal movement within a cavity or chamber, and a piston rod connected to and movable with the piston to extend or retract relative to the cavity or chamber. The hydraulic piston is activated or energized by providing pressurized fluid, such as oil, to an interior of barrel at one side of the piston. The pressurized fluid effects movement of the piston and piston rod in a direction to extend or retract relative to the cavity or chamber. The piston and piston rod are moved in an opposite direction, for example, under a spring force acting in a direction opposite to the pressurized fluid. Thus, the hydraulic piston is deactivated or deenergized by removing or venting the pressurized fluid from one side of the piston such that the piston and piston rod are moved relative to the cavity or chamber under the spring force.

In one implementation, the actuation arrangement may include one or more solenoid actuators operable to engage and/or disengage one or more input clutch arrangements, and either one or more solenoid actuators or one or more hydraulic actuators operable to engage and/or disengage a control clutch arrangement.

The drive assembly disclosed herein may be useful for any number of work or conventional vehicle applications. In the work vehicle context, the drive assembly may power various sub-systems including various aspects of the power and drive trains of the vehicle. As one example, the drive assembly may be or be incorporated into a wheel drive for providing tractive power to the ground-engaging wheels or tracks of the vehicle. The drive assembly may be incorporated into the power and drive train at an intermediate location between the wheels/tracks and the prime mover or transmission, or it may be at the wheel/track ends (e.g., one at each ground-engaging wheel or track) in which case the drive assembly may be considered a "final drive" that couples directly or through a downstream gearset to the wheel or track carrying hub. In such a case when the drive assembly is remote from the prime mover, a secondary power source, such as one or more electric machines or hydraulic motors provide the immediate power input to the drive assembly.

The following describes one or more example implementations of the disclosed drive assembly. Discussion herein may sometimes focus on the example application of a wheel end drive assembly of a wheel loader, but the disclosed drive assembly is suitable for other types of components and work vehicles, including various other construction machines (e.g., crawlers, motor graders, dump trucks) as well as various agriculture or forestry machines (e.g., combines, harvesters, balers, mowers, forwarders, forestry skidders and so on) and utility vehicles.

Example Work Vehicle Multi-Speed Drive Assembly with Clutch Retention Mechanism

Figure 2A:
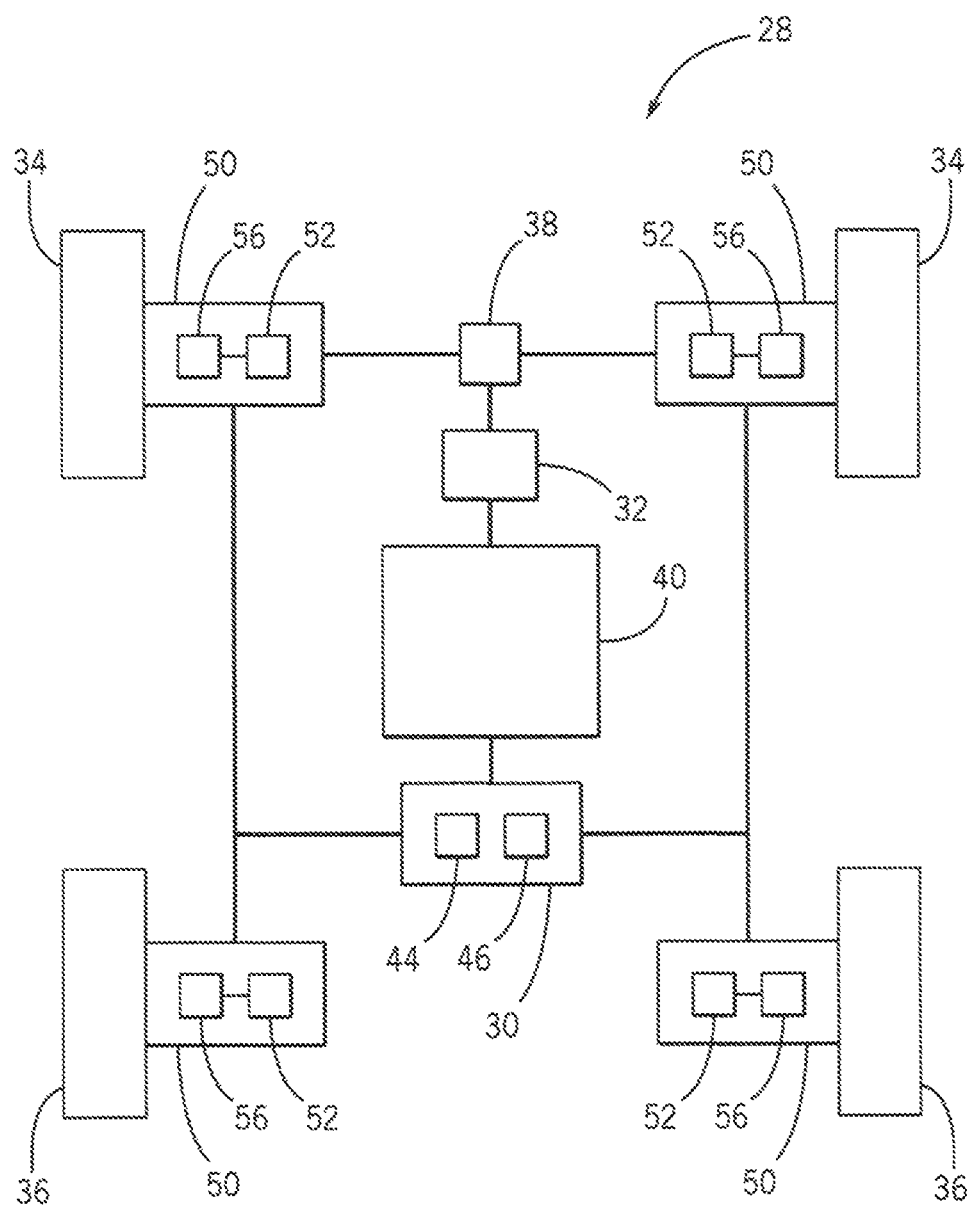
FIG. 2A is a schematic diagram of certain components of a power and drive train for the example work vehicle of FIG. 1.

Referring to FIGS. 1 and 2A, in some embodiments, the disclosed work vehicle 20 may be a wheel loader although, as noted, the drive assembly described herein may be applicable to a variety of machines. As shown, the work vehicle 20 may be considered to include a structural main frame or chassis 22 supporting a work implement 24 that is selectively positioned by various combinations of structural elements (e.g., arms, crossbars, pivot joints, etc.) and controllably moved utilizing any number of actuators, such as hydraulic cylinders. The work vehicle 20 may further be considered to include an operator cabin 26, a power and drive train 28, a control system 30, and a hydraulic system 32. The work vehicle 20 may be supported off the ground by ground-engaging wheels or tracks. In the illustrated example, the work vehicle 20 includes a front axle with steerable front wheels 34 (one at each left or right lateral side of the work vehicle 20) and a rear axle with non-steerable rear wheels 36 (one or more at each left or right side of the work vehicle 20).

The power and drive train 28 has wheel steering components 38, including various devices (e.g., power steering pumps and lines, steering mechanisms, and the like) that couple manual (e.g., operator steering controls or wheel) and/or automated (via the control system 30) steering input to the wheels, such as the steerable wheels 34. The power and drive train 28 includes a prime mover, such as an engine 40, which supplies power to the work vehicle 20, as either direct mechanical power or after being converted to electric or hydraulic power. In one example, the engine 40 is an internal combustion engine, such as a diesel engine, having an engine shaft for outputting mechanical power. The engine 40 is controlled by an engine control module (not shown) of the control system 30. It should be noted that the use of an internal combustion engine is merely an example, as the prime power source may one or more fuel cells, electric motors, hybrid-gas electric motors, or other power-producing devices.

The engine 40 provides power to onboard mechanical, electrical and hydraulic subsystems of the work vehicle 20 governing such things as tractive power to propel the work vehicle 20 and for off-boarding power to other sub-systems remote from the work vehicle 20. For example, the engine 40 may provide mechanical power that is converted to an electric format to run the electronics of the control system 30 and one or more electric drives of the work vehicle 20. The control system 30 thus may have mechanical to electrical power conversion components 44, one or more batteries 46, and associated electronics, including various alternators, generators, voltage regulators, rectifiers, inverters, and the like. The control system 30 may be configured as a computing device or electronic control unit (ECU) with associated processor devices and memory architectures, as a hard-wired computing circuit (or circuits), as a programmable circuit, as a hydraulic, electrical, or electro-hydraulic controller.

The control system 30 may be configured to execute various computational and control functionality with respect to the work vehicle 20, including various devices associated with the power and drive train 28, the hydraulic system 32, and various additional components of the work vehicle 20. In some embodiments, the control system 30 may be configured to receive input signals in various formats (e.g., as hydraulic signals, voltage signals, current signals, and so on), and to output command signals in various formats (e.g., as hydraulic signals, voltage signals, current signals, mechanical movements such as rotation, and so on). The control system 30 is configured to operate various aspects of the disclosed drive assembly, including electromechanical actuators (e.g., solenoids), which may form part of the power and drive train 28 or part of another subsystem of the work vehicle 20.

In some embodiments, the control system 30 may include or be configured to receive input commands from, or otherwise interface with, a human-machine interface or operator interface (not shown) and various sensors, units, and systems onboard or remote from the work vehicle 20. In response, the control system 30 may generate one or more types of commands for implementation by various systems of the work vehicle 20. The control system 30 may additionally or alternatively operate autonomously without input from a human operator, communicating with other systems or devices (including other controllers) in various known ways, including via a CAN bus (not shown), via wireless or hydraulic communication means, or otherwise. In one example and as discussed in greater detail below, the control system 30 may command current to electromagnets associated with an actuator assembly to engage and/or disengage clutches within the drive assembly.

The engine 40 may also provide mechanical power that is converted to hydraulic format to power various hydraulic drives, pumps and compressors that pressurize fluid to drive various actuators of the hydraulic system 32 in order to power components of the work vehicle 20, such as the work implement 24, wheel steering and braking, a tow-behind work implement (not shown), or the like. In this example, the work vehicle 20 supports the mounting of the work implement 24 as a loader with linkage boom arms and a bucket that may be raised and lowered during operation by one or more hydraulic piston-cylinder devices. The hydraulic system 32 may be coupled to and operated by the control system 30 autonomously or in response to commands from an operator input device (e.g., operator controls, operator display device, etc.) in the cabin 26 or remote from the work vehicle 20. The hydraulic system 32 may include other components (e.g., valves, flow lines, pistons/cylinders, seals/gaskets, and so on), such that control of various devices may be effected with, and based upon, hydraulic, mechanical, or other signals and movements.

As noted above, the drive assembly of this disclosure may be implemented in various subsystems within the work vehicle context and may be powered in one or more formats. The following describes one example drive assembly implemented as, and incorporated within, an electric wheel end drive 50. One such wheel end drive 50 is installed just upstream from each of the four wheels 34, 36 of the work vehicle 20. Each wheel end drive 50 itself, or one or more components thereof, may thus be considered a "final" drive due to its location proximate the associated wheel 34, 36 and its functioning to provide the last or nearly last gear ratio for the associated wheel 34, 36. The wheel end drives 50 may differ at each or pairs (e.g., front and rear) of the wheels 34, 36. However, due to the bi-directional functionality of the drive assembly, the wheel end drives 50 are identical for all wheels 34, 36, and as such, only one will be detailed below. Moreover, while the example wheel end drive 50 is electric, it may be operated by a different input power format (e.g., hydraulic or mechanical). The example wheel end drive 50 is also described herein as having multiple (e.g., two) electric machines for input power. However, the wheel end drive 50 may be operated with one or more than two electric machines. In the former case, intermediate input gearing may be utilized or omitted depending on the operating parameters (e.g., speed and torque) of the electric machine and/or the drive assembly itself and the wheels 34, 36. As will be described, intermediate input gearing is used to couple power to the drive assembly when two or more electric machines are employed.

Additionally, the example wheel end drive 50 is a multiple-mode drive operable to output multiple speed and torque ranges for tractive power to the wheels 34, 36. Thus, while the engine 40 supplies prime power for the electric machine(s), the wheel end drives 50 are the direct power (and speed and torque) influencers to the wheels 34, 36, such that a central range transmission, axles or other upstream speed- and torque-changing gearing may be, and in the example implementation is, omitted from the work vehicle 20.

Figure 2B:
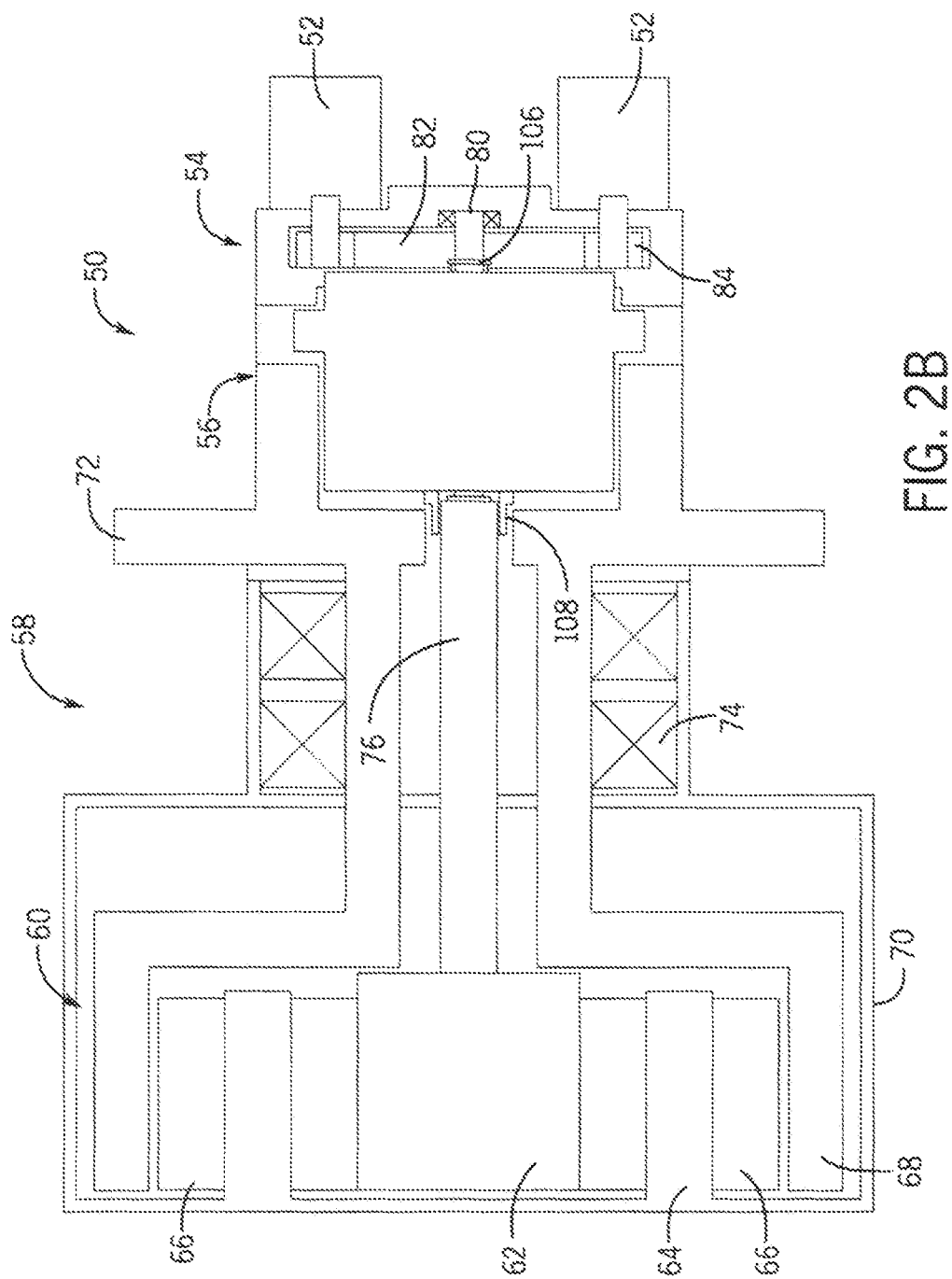
FIG. 2B is a schematic diagram of an example wheel end drive implementation of the disclosed drive assembly that may be incorporated in the example work vehicle of FIG. 1.

Referring also to FIG. 2B, the example wheel end drive 50 includes as principal components the input power sources in the form of two electric machines 52 that couple via an input gear set 54 to a drive assembly 56, which in turns couples to and drives one of the wheels 34, 36 via an outboard wheel end 58. The outboard wheel end 58 may be configured in any way suitable to mount the associated wheel 34, 36. Depending on speed and torque requirements of the wheel end drive 50, the outboard wheel end 58 may contain an outboard gear set, such as a single stage planetary gear set 60 having a sun gear 62 and a carrier 64 that supports planet gears 66 that mesh with a ring gear 68. The carrier 64 may be fixed to a wheel hub (not shown) of the associated wheel 34, 36 directly, or the carrier 64 may be contained within an outboard wheel end housing 70 that couples to the wheel hub. The ring gear 68 may be fixed to or formed integral with a mounting flange 72. The example outboard gear set 60 is a sun-in, carrier out planetary arrangement or a ring-in, carrier out planetary arrangement, although various other configurations are envisioned, including the omission of an outboard gear set or the carrier and/or the outboard wheel end housing 70 being formed by or directly coupled to the wheel hub of the wheel 34, 36. The wheel end drive 50 is assembled to the vehicle chassis 22, such as by the mounting flange 72, in a fixed orientation in the case of the rear wheels 36 or pivotally, about an upright, generally vertical or vertically canted, steering axis (not shown), in the case of the steered front wheels 34. One or more wheel bearings 74 allow the carrier 64 and/or outboard wheel end housing 70 to rotate relative to the vehicle chassis 22 about a generally lateral, or side to side, fixed or pivotal drive or rotation axis. The outboard wheel end 58 rotates about the rotation axis under power output from the drive assembly 56 via output shaft 76 coupled to or formed integrally with the sun gear 62 of the outboard planetary gear set 60. The drive assembly 56 is powered through an input shaft 80 splined to a central input gear 82, which meshes with relatively small diameter shaft gears 84 rotated by the electric machines 52. As noted, the input side of the wheel end drive 50 may be implemented in various ways, including with a different input gear set (e.g., a different axial gear set or a single or double stage planetary gear set), by a single electric machine with or without an input gear set (e.g., direct shaft mounting of the electric machine to the drive assembly), by more than two electric machines with a modified input gear set of any suitable axial, planetary or other gear configuration, and by a power source of a different format (e.g., mechanical or hydraulic). The input side as well as the outboard wheel end 58 of the wheel end drive 50 may be configured as needed to provide a 1:1 or other gear ratio between the electric machines 52 and the drive assembly 56 and between the drive assembly 56 and the wheel hub as needed depending, at least in part, on the desired speed and torque at the wheel 34, 36 and the speed and torque capacity of the electric machines 52.

As described in greater detail below, the drive assembly 56 includes actuators, clutch arrangements and a gear set within a housing. Generally, the drive assembly 56 operates to transfer power (rotational speed and torque) from the electric machines 52 to the outboard wheel end 58 at each wheel 34, 36 at multiple gear ratios that are selected based on the status of the clutch arrangements, which are controlled by the actuators based on signals from the control system 30. In this example, the drive assembly 56 transfers power from an input element 106 coupled to the electric machines 52 to an output element 108 coupled to the outboard wheel end 58, generally along a rotation axis.

Referring now to FIGS. 3-15, the following details the example drive assembly 56 of the wheel end drive 50. Generally, the drive assembly may be a multi-speed drive assembly and is not limited to the examples described herein and shown in the drawings. However, for illustrative purposes, the following description refers to embodiments in which the drive assembly 56 is a two-speed drive including direct or high drive modes in each clock direction, in which 1:1 gear ratios are achieved through which the input and output speeds and torques match, and another mode in each clock direction in which a gear ratio is achieved to effect a different output speed and torque relative to the input power. To this end, the example drive assembly includes one or more input clutch arrangements at an input side configured to selectively interact with a planetary gear set to effect the different gear ratios. It will be appreciated however, that references to first and second, or high and low, input clutch arrangements in the following description are for illustrative purposes, and the present disclosure is not limited to a particular number or configuration of such input clutch arrangements. The example drive assembly 56 effects low and high modes. In each clock direction, the high mode is the direct drive mode and has a higher speed and lower torque than the low mode.

Figure 3:
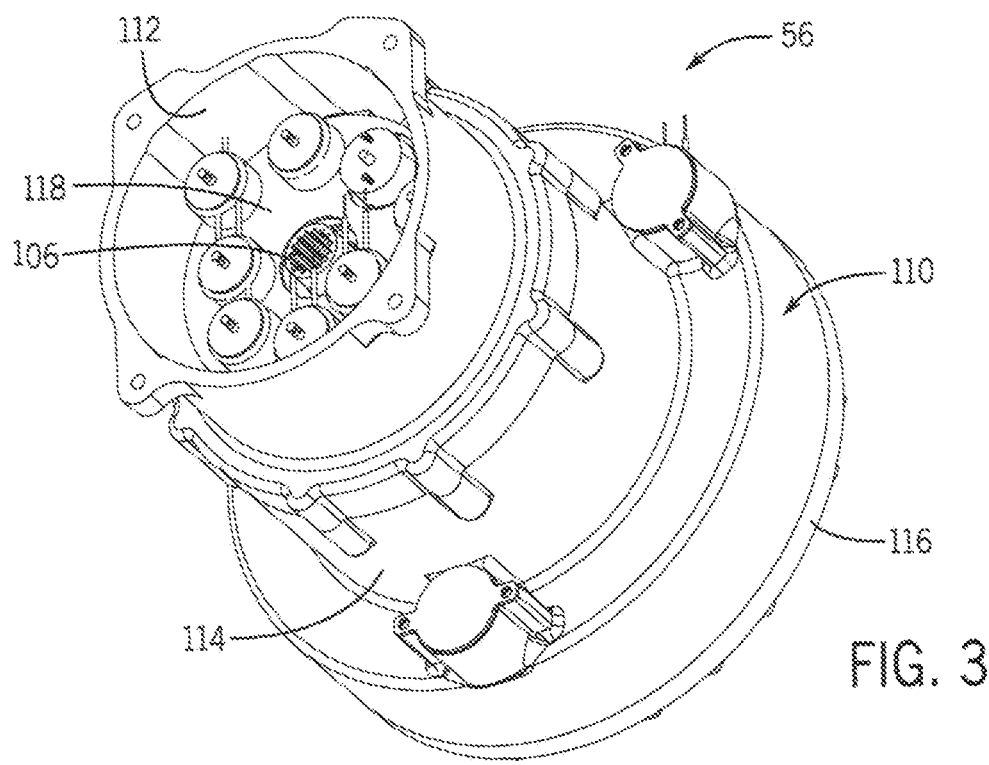
FIGS. 3 and 4 are isometric views of the drive assembly that may be implemented in the work vehicle of FIG. 1.
Figure 4:
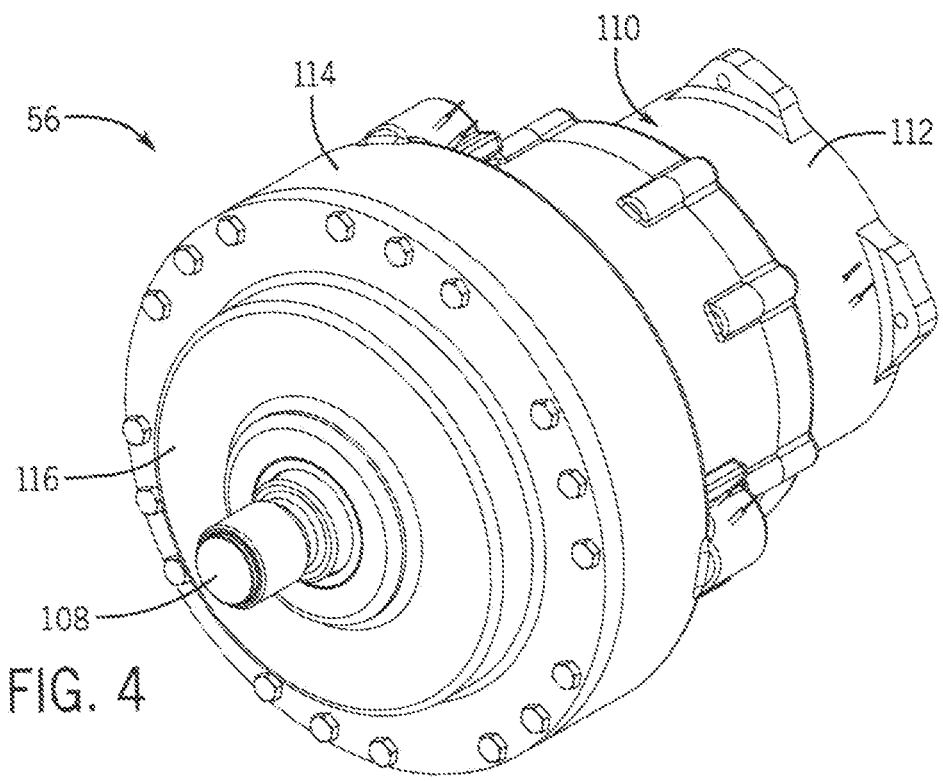

Reference is initially made to FIGS. 3 and 4, which are more detailed isometric side views of the drive assembly 56. In the discussion below, relative orientations toward the drive assembly input side, generally depicted by FIG. 3, may be generally considered the first, or input, side, and relative orientations toward the drive assembly output side, generally depicted by FIG. 4, may be generally considered a second, or output, side.

In one example, the drive assembly 56 generally includes a drive housing having at least one housing element forming a reaction member. For example, the drive housing may be a housing arrangement 110, which is formed by a number of housing elements 112, 114, 116. The housing elements 112, 114, 116 may include a first housing element 112 that functions as a reaction member, a second housing element 114 that also functions as a reaction member, and a third housing element 116 that functions as an end plate for the second housing element 114. As noted above, the drive assembly 56 may operate to transfer torque between an input element 106 on a relative input side and an output element 108 on a relative output side. In this example, the output element 108 may be considered as an output drive shaft extending outwardly relative to the third housing element 116.

In general, the housing arrangement 110 is fixed axially and radially with respect to the rotation axis, and is, in its entirety, considered a reaction member against which certain forces effected by non-fixed components of the drive assembly 56 are applied. For example, reaction forces from the various clutch arrangements and the actuator arrangement are applied to the housing arrangement 110 (either directly to a component of the housing arrangement 110 and/or indirectly to a stationary component fixed to the housing arrangement 110), and the housing arrangement 110 functions as a direct or indirect backstop of such applied forces. As introduced above, the first housing element 112 and the second housing element 114 each function as reaction members that are fixed axially and radially with respect to the rotation axis, such that at least in the case of the rear non-steered wheels, the first and second housing elements 112, 114 are fixed relative to the work vehicle chassis 22.

In the example drive assembly 56, the first housing element 112, or a hub portion thereof (e.g., a stationary spindle), forms a reaction member against which reaction forces from the one or more input clutch arrangements are applied. Similarly, the second housing element 114 forms a reaction member against which reaction forces from the control clutch arrangement are applied. In addition, reaction forces from one or more actuators operable to engage and/or disengage respective one or more input clutch arrangements are applied to the first housing element 112, and reaction forces from one or more actuators operable to engage and/or disengage the control clutch arrangement are applied to the second housing element 114. It will be appreciated that the first and second housing elements 112, 114 are described for illustrative purposes and that different variations and numbers of housing elements are envisioned which may likewise be considered suitable reaction members.

Figure 5:
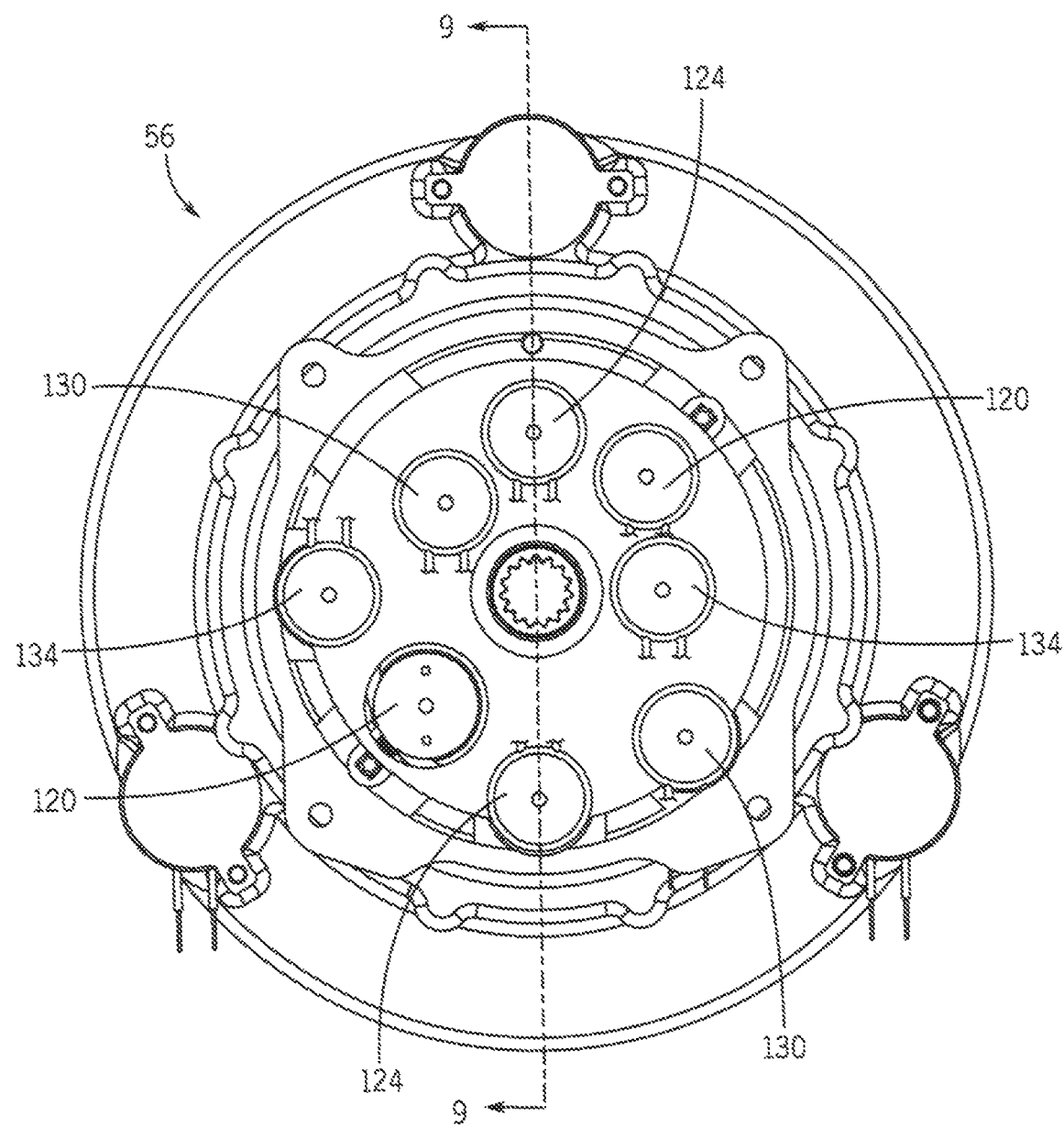
FIG. 5 is an end view of the drive assembly thereof.
Figure 6:
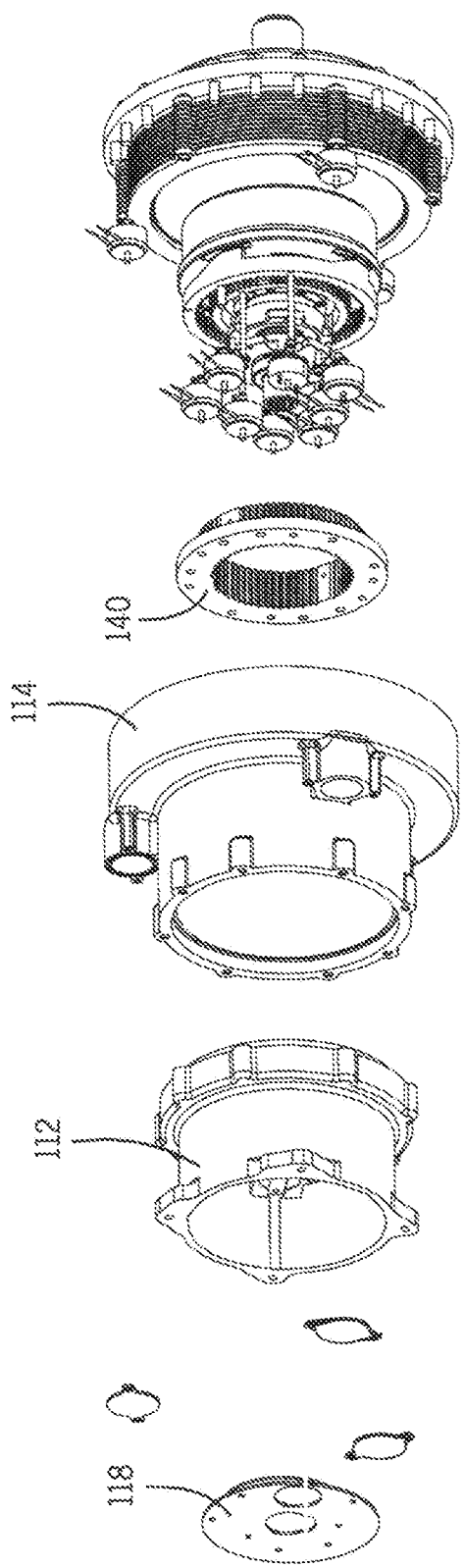
FIG. 6 is a partial exploded view of thereof.

Referring to FIGS. 5 and 6, the drive assembly 56 generally includes an actuator arrangement having one or more actuators. The one or more actuators are connected to and operable to engage and/or disengage one or more corresponding clutch arrangements. For illustrative purposes, an example implementation refers to first and second input clutch arrangements, as described in greater detail below. Accordingly, in an embodiment, the one or more actuators include first input actuators 120, 124 connected to the first input clutch arrangement and second input actuators 130, 134 connected to the second input clutch arrangement. Generally, the input actuators 120, 124, 130, 134 are configured to modify the power flow through the drive assembly 56 effecting movement of input clutch arrangements housed within the housing arrangement 110. As shown by FIG. 3, the input actuators 120, 124, 130, 134 are supported within the housing arrangement 110 on an actuator frame 118. The actuator frame 118 may be considered a reaction member.

Figure 7:
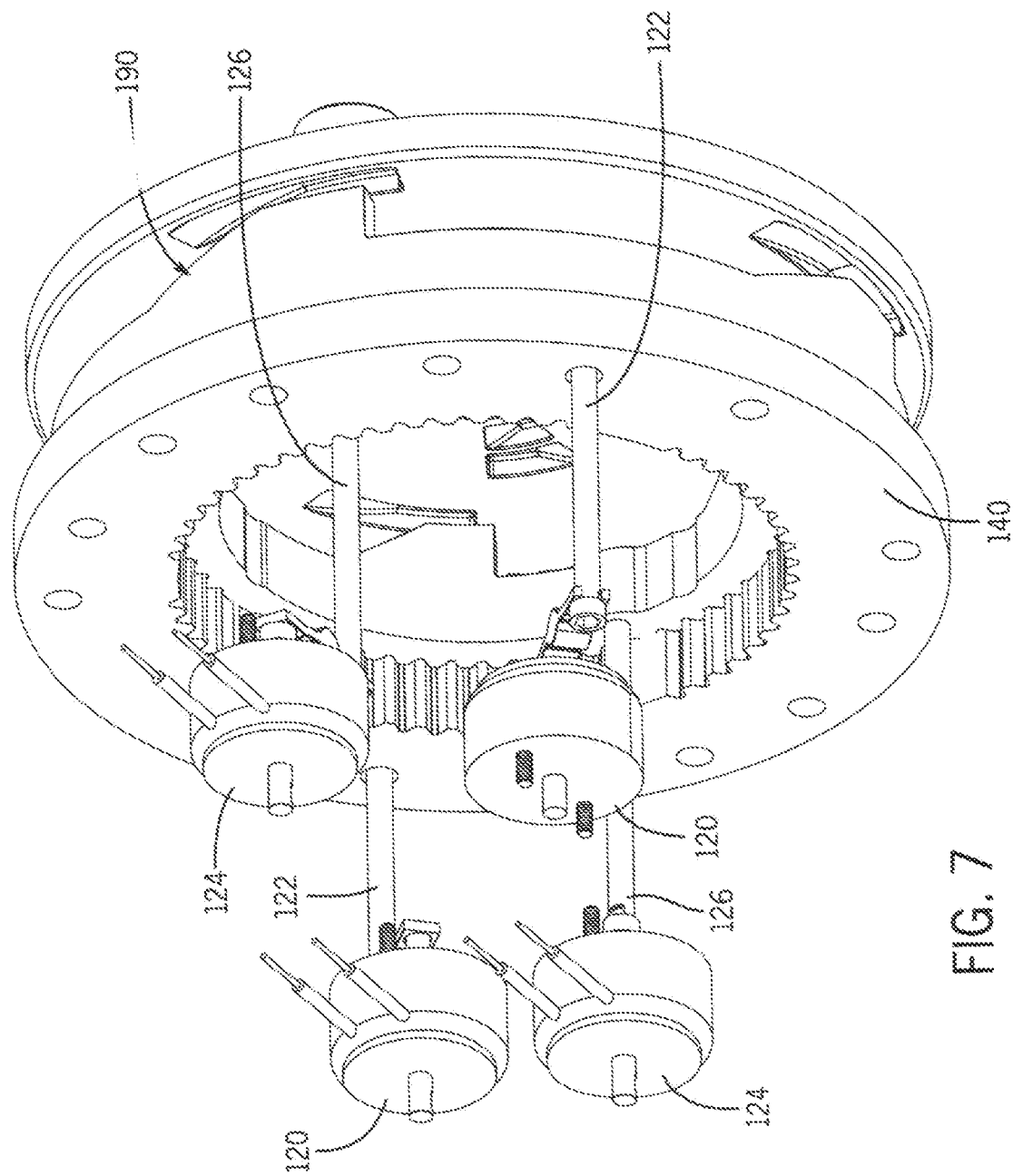
FIGS. 7 and 8 are isolated isometric views of respective first and second input clutch arrangements thereof.

In one implementation, the first input actuators 120, 124 include a first low actuator 120 and a second low actuator 124, and the second input actuators 130, 134 include a first high actuator 130 and a second high actuator 134. In a particular implementation, one or more of the input actuators 120, 124, 130, 134 may be provided as a plurality of actuators. For instance, in the view of FIG. 5, each input actuator 120, 124, 130, 134 is provided as a pair of input actuators 120, 124, 130, 134. FIG. 7 is an isolated input side isometric view of the first low actuator 120, the second low actuator 124 and a first input clutch arrangement 190 which will be described in further detail below. For clarity, in the view of FIG. 7, portions of the drive assembly 56 are removed, such as portions of the housing arrangement 110, the first high actuator 130, the second high actuator 134 and a second input clutch arrangement. The first low actuator 120 may be coupled to a first portion (e.g., a first low clutch ring) of the first input clutch arrangement 190 via a first low actuator linkage 122, and the second low actuator 124 may be coupled to a second portion (e.g., a second low clutch ring) of the first input clutch arrangement 190 via a second low actuator linkage 126.

Figure 8:
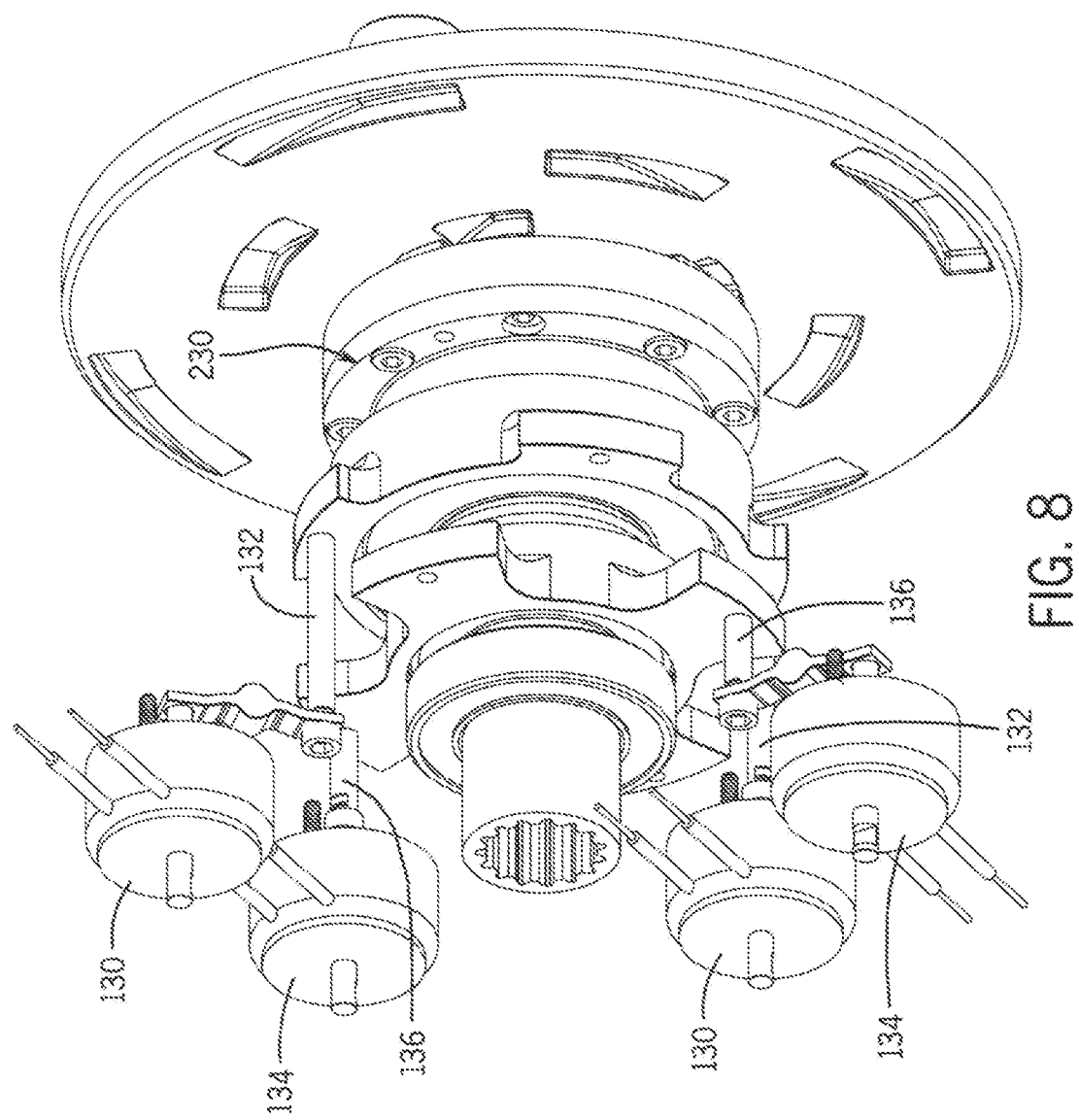

FIG. 8 is an isolated input side isometric view of the first high actuator 130, the second high actuator 134 and a second, or high, clutch arrangement 230 which will be described in further detail below. For clarity, in the view of FIG. 8, portions of the drive assembly 56 are removed, such as portions of the housing arrangement 110, the first low actuator 120, the second low actuator 124 and the low clutch arrangement 190. As described in greater detail below, the first high actuator 130 may be coupled to a first portion (e.g., a first high clutch ring) of the second input clutch arrangement 230 via a first high actuator linkage 132, and the second high actuator 134 may be coupled to a second portion (e.g., a second high clutch ring) of the second input clutch arrangement 230 via a second high actuator linkage 136. Each actuator and linkage (and associated clutch arrangements) of a pair enable unidirectional operation, and as a pair, may enable bi-directional operation in some examples.

In this example, each of the actuator linkages 122, 126, 132, 136 is formed by a radial linkage portion (or arm) and an axial linkage portion (or pin). In particular, the radial linkage portion (or arm) of the respective actuator linkage 122, 126, 132, 136 extends from the input actuator 120, 124, 130, 134 to a distal end that is coupled to the axial linkage portion of the actuator linkage 122, 126, 132, 136, which in turn extends into the drive assembly 56 to one or more portions of the clutch arrangements, as discussed in greater detail below.

In an implementation, the input actuators 120, 124, 130, 134 are electromechanical solenoid devices which can be activated to apply a push and/or pull force. In one embodiment, the solenoid devices apply one of a push and a pull force, and a spring applies the other of a push and pull force. Further, in this example, input actuators 120, 124, 130, 134 may be oriented in different directions such that a single type of solenoid device (e.g., a push solenoid device or a pull solenoid device) may be used in different positions to produce the desired movements within the drive assembly 56. In the discussion below, the term "active" or "engaged" actuator refers to movement of the actuator that results in the engaged position of the respective clutch element (e.g., regardless of whether the respective actuator is pushing, pulling, and/or enabling a spring or other force to engage the clutch element). Although not shown, the input actuators 120, 124, 130, 134 include at least one connection element that enables wired or wireless commands and/or power with respect to the control system 30 (FIG. 2A) and/or other sources. Other types and arrangements of actuators and linkages may be provided.

As introduced above and particularly referencing FIGS. 6 and 7, the housing arrangement 110 includes the first housing element 112 that functions as a reaction member. As shown by FIG. 6, a stationary spindle 140 extends into the drive assembly 56 and thereby also forming a reaction member that facilitates torque transfer between the input element 106 and the output element 108 and through the drive assembly 56 via the first input clutch arrangement, as discussed in greater detail below. In one example, the stationary spindle 140 is secured to the first housing element 112 by one or more suitable fasteners and may be considered as part of the first housing element 112.

Figure 9:
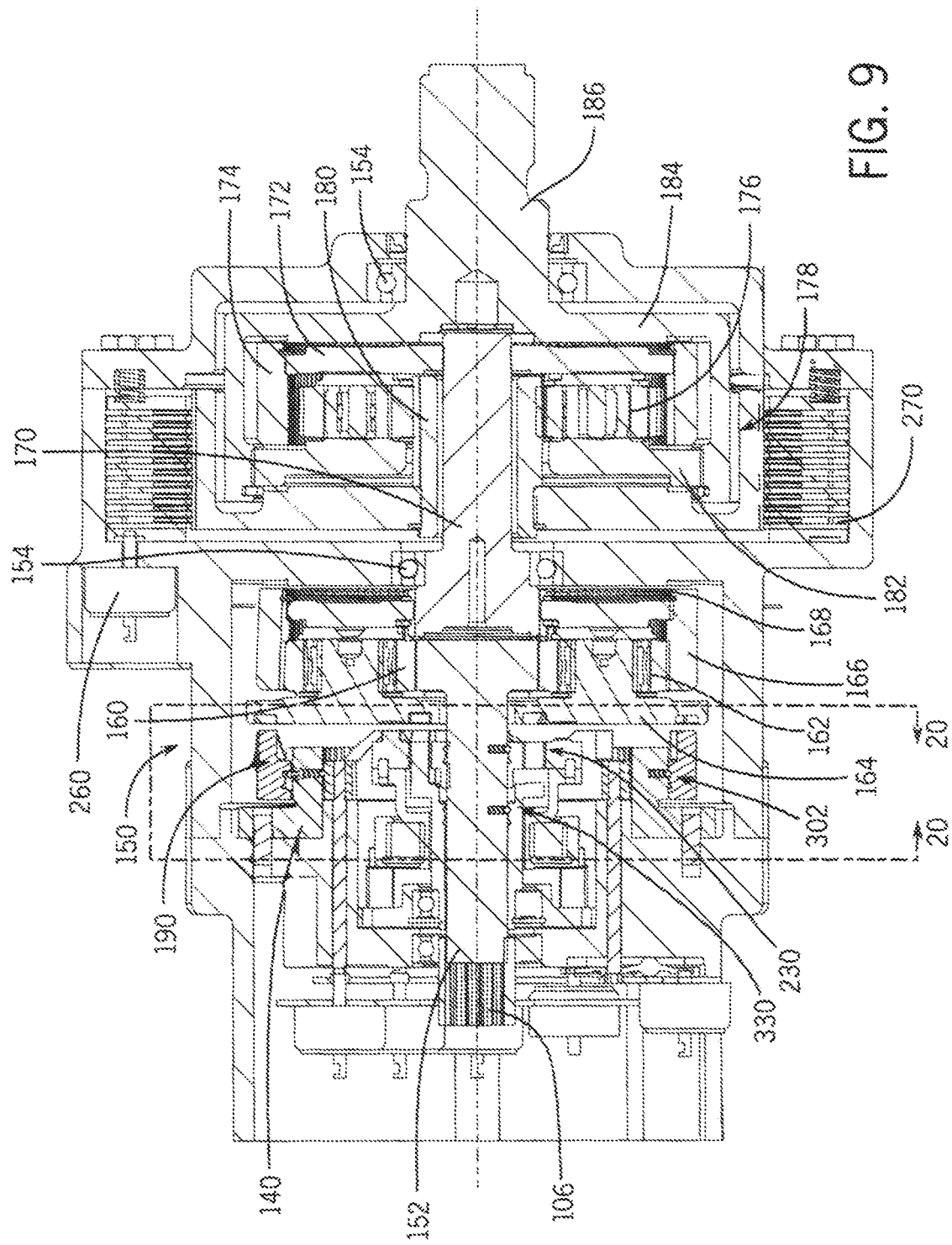
FIG. 9 is a cross-sectional view of the drive assembly of FIGS. 3 and 4, through line 9-9 of FIG. 5.

Referring now to FIG. 9, the drive assembly 56 includes a gear set 150 and a number of input clutch arrangements 190, 230 positioned at the input side of the gear set 150 that enable and modify the transfer of torque between the input element 106 and output element 108 at predetermined gear ratios that are selected based on the status of the clutch arrangements 190, 230. As noted above, the input clutch arrangements 190, 230 are controlled by the actuators 120, 124, 130, 134 based on signals from the control system 30 (FIG. 2A). The drive assembly 56 also includes a third, or output, clutch arrangement 270 positioned at an output side of the gear set 150 that is configured to damp a torque increase or spike generated in response to operating one of the first and second input clutch arrangements 190, 230. The third clutch arrangement 270 is controlled by one or more third, or output, actuators based on signals from the control system 30. The gear set 150 and clutch arrangements 190, 230, 270 are discussed below. In the present embodiments, clutch arrangements and actuators disposed and/or effecting operations upstream from the planetary gear set 150 along a power flow path, and/or which are operable to effect a torque input to the planetary gear set 150, may be referred to as input clutch arrangements and input actuators. Further, in the present embodiments, clutch arrangements and actuators disposed and/or effecting operations downstream from the planetary gear set 150 along a power flow path, and/or which are operable to effect damping or attenuating of torque transmitted from an input side, may be referred to as control clutch arrangements and control actuators positioned at an output side. Such control or output side components may include components interfaced with planetary gear set 150 along the power flow path downstream from where torque and rotational speed is input to the planetary gear set 150.

As shown, the drive assembly 56 includes a drive shaft 152 (also referred to herein as a first drive shaft) extending through at least a portion of the interior of the stationary spindle 140 and the gear set 150. The drive shaft 152 is rotatable about a drive axis relative to a reaction member such as a housing element 112, 114. The drive shaft 152 is configured for rotation in a first rotational direction and alternatively in a second rotational direction. The input element 106 of the drive assembly 56 is integral with or otherwise coupled to the drive shaft 152, which in turn is coupled to drive the gear set 150. The drive assembly 56 includes one or more bearing elements 154 that support rotation of the rotatable elements relative to the stationary elements, as well as rotation of rotatable elements relative other rotatable elements (e.g., if a rotatable element is grounded or rotating at different speed).

In this example, the gear set 150 of the drive assembly 56 is a planetary gear set, and in particular, a two-stage planetary gear set. In some embodiments, the drive shaft 152 may be considered part of the planetary gear set 150. Although one example configuration of the planetary gear set 150 is described below, other embodiments may have different configurations.

The planetary gear set 150 generally includes an input component, an output component and a reaction component. For example, the planetary gear set 150 includes a sun gear, a planet carrier, a set of planet gears and a ring gear which may be provided in different configurations, for example, by fixing or grounding a gear or carrier to a reaction member and/or connecting a gear or carrier to a source of input torque and rotation. Depending on a particular configuration of the planetary gear set, different gears or components may be considered as the input component, the output component, and the reaction component. For example, in one configuration, the input component is the sun gear ("sun in"), the output component is the planet carrier ("carrier out") and the ring gear is the reaction component ("ring reaction"). In another configuration, the input component is the ring gear ("ring in"), the output component is the planet carrier ("carrier out") and the sun gear is the reaction component ("sun reaction"). The different configurations may be effect different gear ratios according to operations of the one or more input clutch arrangements 190, 230

In one implementation, the planetary gear set 150 includes a first-stage sun gear 160, a set of first-stage planet gears 162, a first-stage planet carrier 164 and a first-stage ring gear 166. The first-stage sun gear 160 is mounted for rotation with the first drive shaft 152. In one example, the first drive shaft 152 and the first-stage sun gear 160 are integral with one another and provided as one piece. The first-stage sun gear 160 includes a plurality of teeth or splines that mesh with the set of first-stage planet gears 162 circumscribing the first-stage sun gear 160. In one example, the first-stage planet gears 162 include a single circumferential row of one or more planet gears, although other embodiments may include radially stacked rows, each with an odd number of planet gears in the radial direction.

The first-stage planet gears 162 are supported by the first-stage planet carrier 164. The first-stage planet carrier 164 circumscribes the first-stage sun gear 160 and the first drive shaft 152 and is at least partially formed by first and second radially extending, axially facing carrier plates. The first-stage carrier plates of the first-stage planet carrier 164 include a row of mounting locations for receiving axles extending through and supporting the first-stage planet gears 162 for rotation. In this arrangement, each of the planet axles respectively forms an individual axis of rotation for a first-stage planet gear 162, and the first-stage planet carrier 164 enables the set of first-stage planet gears 162 to collectively rotate about the first-stage sun gear 160.

The first-stage ring gear 166 circumscribes the first-stage sun gear 160 and the first-stage planet gears 162. The first-stage ring gear 166 includes radially interior teeth that engage the teeth of the first-stage planet gears 162. As such, first-stage planet gears 162 extend between, and engage with, the first-stage sun gear 160 and the first-stage ring gear 166. In some embodiments, the gear set 150 further includes a first-stage ring gear cover 168. The first-stage ring gear cover 168 is mounted to rotate with the first-stage ring gear 166. For example, the first-stage ring gear cover 168 may be press-fit within an interior of the first-stage ring gear 166.

The first-stage ring gear 166 is arranged within the housing arrangement 110, and as shown in FIG. 9, within the second housing element 114. The first-stage ring gear 166 is configured to rotate relative to the first and second housing elements 112, 114 and the stationary spindle 140. As noted above, the first-stage ring gear cover 168 is mounted to rotate with the first-stage ring gear 166. By way of such rotation, the first-stage ring gear 166, via the first-stage ring gear cover 168, transmits torque and speed in one or more rotational clock directions to a second stage of the planetary gear set 150 as described further below.

The gear set 150 further includes a second drive shaft 170. The second drive shaft 170 may be integrated with, or otherwise coupled to the second stage of the planetary gear set 150. The second drive shaft 170 is also coupled to the first stage of the planetary gear set 150. As shown in FIG. 9, for example, the second drive shaft 170 is coupled to the first-stage ring gear 166, optionally via the first-stage ring gear cover 168. The second drive shaft 170 has a first end rotationally fixed to the first-stage ring gear 166 (via the first-stage ring gear cover 168) and a second end axially opposite to the first end. The second drive shaft 170 may be rotationally fixed to the first-stage ring gear cover 168, for example, by a press fit connection. Accordingly, the second drive shaft 170 is rotatable with the first-stage ring gear cover 168 and the first-stage ring gear 166 to transmit rotational speed and torque from the first stage of the planetary gear set 150 to the second stage.

The second stage of the planetary gear set 150 generally includes an optional second-stage ring gear cover 172, a second-stage ring gear 174, a set of second-stage planet gears 176, a second-stage planet carrier 178, and a second-stage sun gear 180. Referring still to FIG. 9, the second-stage ring gear cover 172 is rotationally fixed to the second drive shaft 170, for example, at or near the second end of the second drive shaft 170. The second-stage ring gear cover 172 is rotationally fixed to the second drive shaft 170, for example, by a press-fit connection. In this manner, the second-stage ring gear cover 172 and the second drive shaft 170 rotate together.

The second-stage ring gear 174 is rotationally fixed to the second-stage ring gear cover 172 such that the second-stage ring gear 174 and the second-stage ring gear cover 172 rotate together. The second-stage ring gear 174 and the second-stage ring gear cover 172 may be rotationally fixed, for example, by way of a press-fit connection. Accordingly, the first-stage ring gear 166, the first-stage ring gear cover 168, the second drive shaft 170, the second-stage ring gear cover 172 and the second-stage ring gear 174 are rotationally fixed and configured to rotate as a unit. The second-stage ring gear 174 includes radially interior teeth and circumscribes the set of second-stage planet gears 176, the second-stage sun gear 180 and the second drive shaft 170. The radially interior teeth of the second-stage ring gear 174 engage teeth of the second-stage planet gears 176.

The second-stage planet gears 176 circumscribe the second-stage sun gear 180 and the second drive shaft 170. In one example, the second-stage planet gears 176 include a single circumferential row of one or more planet gears, although other embodiments may include radially stacked rows, each with an odd number of planet gears in the radial direction. Each second-stage planet gear 176 has the same or a different number of teeth relative to a corresponding first-stage planet gear 162.

The second-stage planet carrier 178 circumscribes the second-stage sun gear 180 and the second drive shaft 170. The second-stage planet carrier 178 supports the second-stage planet gears 176. The second-stage planet carrier 178 may be at least partially formed by first and second radially extending, axially facing carrier plates. One or more of the second-stage carrier plates of the second-stage planet carrier 178 include a row of mounting locations for receiving axles extending through and supporting the second-stage planet gears 176 for rotation. In such an arrangement, each of the planet axles respectively forms an individual axis of rotation for a second-stage planet gear 176. The second-stage planet carrier 178 enables the second-stage planet gears 176 to collectively rotate about the second drive shaft 170.

The second-stage planet carrier 178 includes a mounting part 182 and an output part 184. The mounting part 182 includes the mounting locations for receiving the axles supporting the second-stage planet gears 176. The output part 184 is rotationally fixed to the mounting part 182 for rotation together with the mounting part 182. The output part 184 includes an axial section extending axially away from the mounting part 182 and a radial section spaced from the mounting part 182 by the axial section. The mounting part 182 and the output part 184 may correspond to, include, or be coupled to, one or more of the second-stage carrier plates described above.

The second-stage planet carrier 178 includes a cavity defined at least partially by the mounting part 182 and the output part 184. In the view of FIG. 9, axial ends of the cavity are defined at least partially by the mounting part 182 and the radial section of the output part 184, and a radial extent of the cavity is defined at least partially by the axial section of the output part 184. According to one implementation, the second-stage ring gear cover 172, the second-stage ring gear 174 and the second-stage planet gears 176 are arranged within the cavity. In addition, the second drive shaft 170 and the second-stage sun gear 180 extend through the mounting part 182 into the cavity, and thus, are partially arranged in the cavity as well.

The second-stage planet carrier 178 includes or is coupled to an output shaft 186. The output shaft 186 extends through the third housing element 116 and rotates together with the output part 184. In the view of FIG. 9, the output shaft 186 is formed integrally with the output part 184 and extends axially from the radial section of the output part 184. Accordingly, in the arrangement described above and shown by FIG. 9, the second-stage planet carrier 178 may correspond to, or include, at least a portion of the output element 108. The mounting part 182, the output part 184 and the output shaft 186 rotate together as unit to output torque and rotational speed. Thus, the drive assembly 56 outputs torque and rotational speed via the second-stage planet carrier 178.

The second-stage sun gear 180 is generally hollow and cylindrical and circumscribes a portion of the second drive shaft 170. That is, the second drive shaft 170 extends through the hollow interior of the second-stage sun gear 180. The first end and the second end of the second drive shaft 170 are axially offset from the second-stage sun gear 180, and thus, in this example, are not disposed within the hollow interior of the second-stage sun gear 180.

The second-stage sun gear 180 has a splined or toothed exterior configured for meshed engagement with corresponding splines or teeth of the second-stage planet gears 176. As referenced above, the second-stage ring gear 174 circumscribes the second-stage planet gears 176 which circumscribe the second-stage sun gear 180. The second-stage planet gears 176 are interposed between the second-stage ring gear 174 and the second-stage sun gear 180. The teeth of the second-stage planet gears 176 engage teeth of the second-stage ring gear 174 and teeth of the second-stage sun gear 180.

As described in greater detail below, the second-stage sun gear 180 is interfaced with the third clutch arrangement 270 and is selectively grounded to the housing arrangement 110, for example, to the second housing element 114, by the third clutch arrangement 270. Thus, the second-stage sun gear 180 is selectively held against rotation by way of selective coupling to the second housing element 114 (i.e., a reaction member) via the third clutch arrangement 270. In this manner, the second-stage sun gear 180 functions as the reaction component of the planetary gear set 150. Accordingly, the planetary gear set 150 described above is a ring in, sun reaction, carrier out configuration.

As noted above, power flow through the gear set 150 is modified based on adjustments of first and second input clutch arrangements 190, 230, also referred to as low and high clutch arrangements, respectively, both of which are positioned at the input side. Power flow through the gear set 150 may also be adjusted by operation of the third clutch arrangement, also referred to as a control clutch arrangement 270, positioned at the output side.

Figure 10:
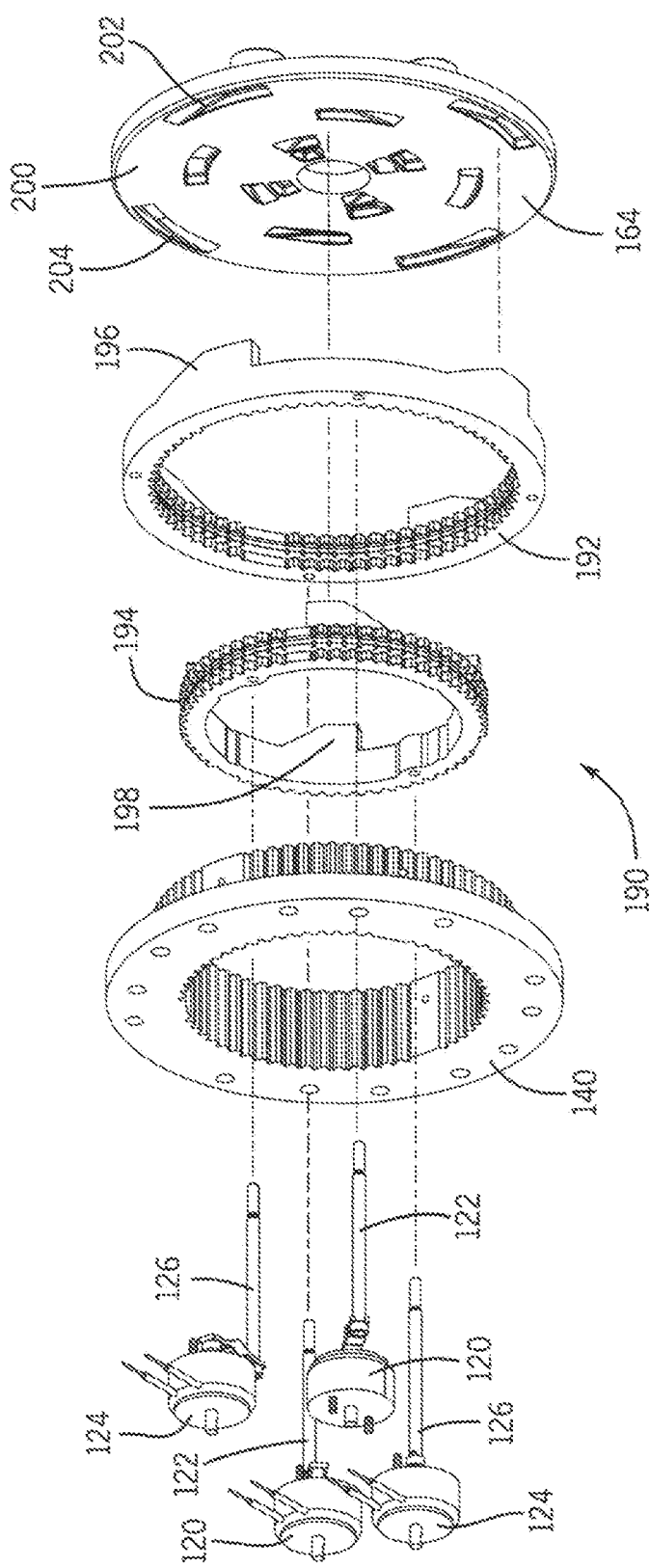
FIGS. 10 and 11 are isolated exploded views of the first input clutch arrangement.
Figure 11:
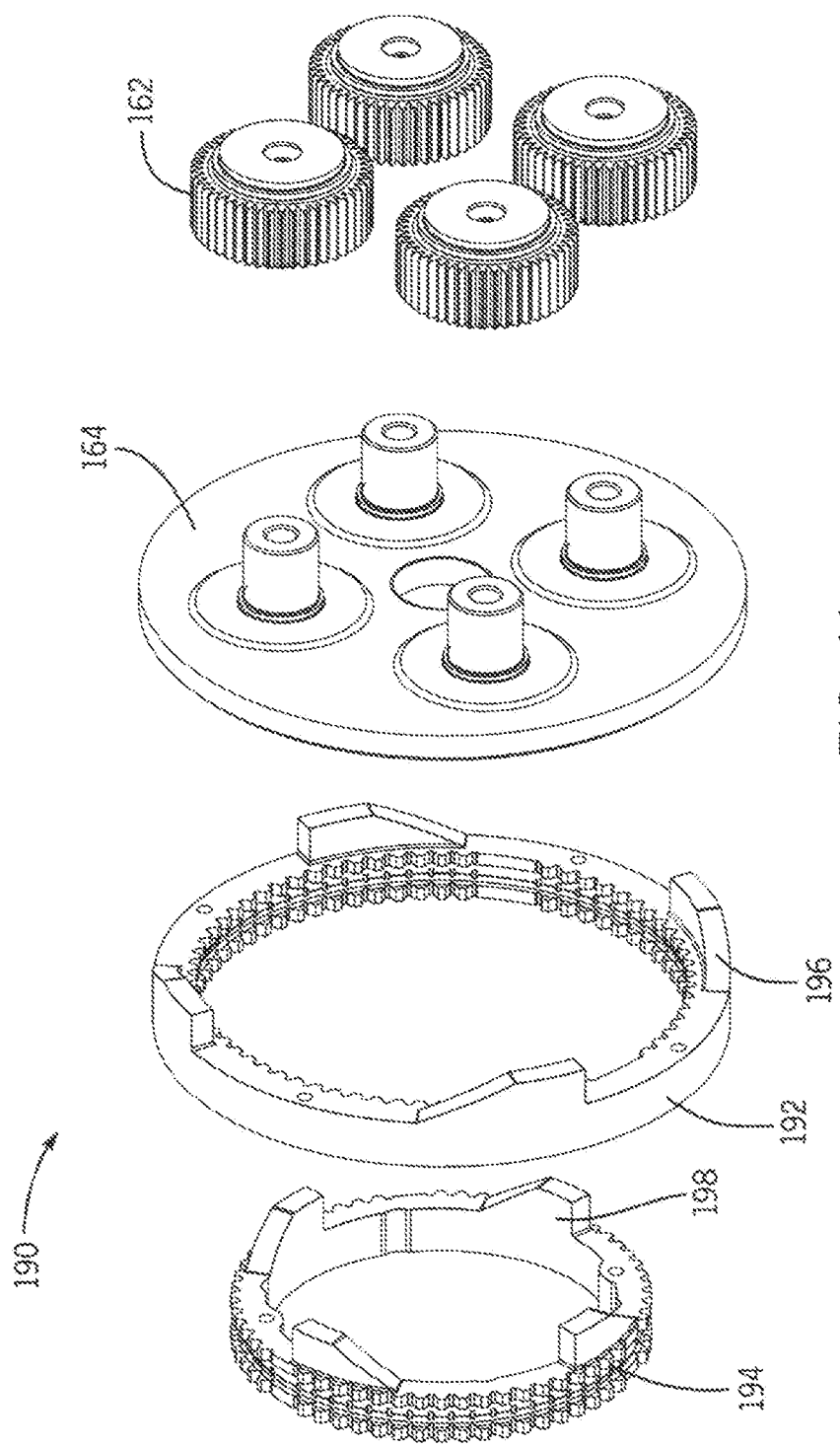

Reference is initially made to the cross-sectional view of FIG. 9, as well as the partially exploded isolated views of FIGS. 10 and 11, which depict the low clutch arrangement 190 and the first-stage planet carrier 164. In particular, FIG. 10 depicts an input side isometric view of the low clutch arrangement 190 and the first-stage planet carrier 164, and FIG. 11 depicts an output side isometric view of the low clutch arrangement 190 and the first-stage planet carrier 164.

As described in greater detail below, the low clutch arrangement 190 selectively interacts with the first-stage planet carrier 164 at the input side of the planetary gear set 150 to modify power flow through the drive assembly 56. In this example, the low clutch arrangement 190 is repositioned in an axial direction towards the first-stage planet carrier 164 to engage the first-stage planet carrier 164 and in an axial direction away from the first-stage planet carrier 164 to disengage the first-stage planet carrier 164. The low clutch arrangement 190 is repositioned in at least one direction in response to activation of the low actuators 120, 124.

In this example, the low clutch arrangement 190 is coupled to the stationary spindle 140 and is configured for axial movement in both directions along the stationary spindle 140. Accordingly, the low clutch arrangement 190 is configured to interface with a reaction member (i.e., a housing element and stationary spindle) and the planetary gear set. In this example, the low clutch arrangement 190 is rotationally fixed to the stationary spindle 140, and thus, does not rotate relative to the stationary spindle 140. In this manner, the low clutch arrangement 190 engages the first-stage planet carrier 164 to rotationally fix the first-stage planet carrier 164 against rotation in both rotational clock directions. Conversely, the low clutch arrangement 190 disengages to the first-stage planet carrier 164 to allow rotation of the first-stage planet carrier 164 in both rotational clock directions.

The low clutch arrangement 190 is retained at different axial positions relative to the stationary spindle 140 and the first-stage planet carrier 164 with a low retention mechanism 302. For example, the low clutch arrangement 190 may be retained at a first axial position where the low clutch arrangement 190 is disengaged from the first-stage planet carrier 164 and a second axial position where the low clutch arrangement 190 is engaged with the first-stage planet carrier 164.

The low clutch arrangement 190 generally includes a first low clutch ring 192 and a second low clutch ring 194. The first low clutch ring 192 circumscribes the stationary spindle 140 and the second low clutch ring 194 is circumscribed by the stationary spindle 140. The first low clutch ring 192 has inner splines that engage corresponding outer splines of the stationary spindle 140 and the second low clutch ring 194 has outer splines that engage corresponding inner splines of the stationary spindle 140. In this manner, the first and second low clutch rings 192, 194 are fixed against rotation relative to the stationary spindle 140 in both rotational clock directions. As described further below, the first and second low clutch rings 192, 194 are movable relative to the stationary spindle 140 in a first axial direction toward the planetary gear set 150 (i.e., in a direction from the first axial position to the second axial position) and a second axial direction away from the planetary gear set 150 (i.e., in a direction from the second axial position to the first axial position).

The low clutch rings 192, 194 further have mounting structures, such as tabs, bearing surfaces or the like, coupled to respective actuator linkages 122, 126. As shown in FIG. 10, the first low clutch ring 192 is coupled to the first low actuator linkage 122 and the second low clutch ring 194 is coupled to the second low actuator linkage 126. In this manner, the first low clutch ring 192 is coupled to the first low actuator 120 and the second low clutch ring 194 is coupled to the second low actuator 124. In effect, the first and second low clutch rings 192, 194 may be considered a bifurcated clutch arrangement. However, it will be appreciated that the present description is not limited to such a clutch arrangement. The mounting structures may be formed as, or included on, shifting mechanisms for the first low clutch ring 192 and the second low clutch ring 194.

Briefly, and as discussed in greater detail below, the low clutch arrangement 190 may be selectively repositioned by the low actuators 120, 124 via the linkages 122, 126 into various positions relative to the stationary spindle 140 and the first-stage planet carrier 164. In one example, the first low clutch ring 192 is configured such that the first low actuator 120 effects repositioning of the first low clutch ring 192 via the linkages 122 towards and/or away from the first-stage planet carrier 164 by causing the first low clutch ring 192 to move axially along the exterior of the of the stationary spindle 140. Similarly, in one example, the second low clutch ring 194 is configured such that the second low actuator 124 effects repositioning of the second low clutch ring 194 via the linkages 126 towards and/or away from the first-stage planet carrier 164 by causing the second low clutch ring 194 to move axially along the interior of the of the stationary spindle 140. The first and second low clutch rings 192, 194 may be repositioned individually or collectively.

Figure 20:
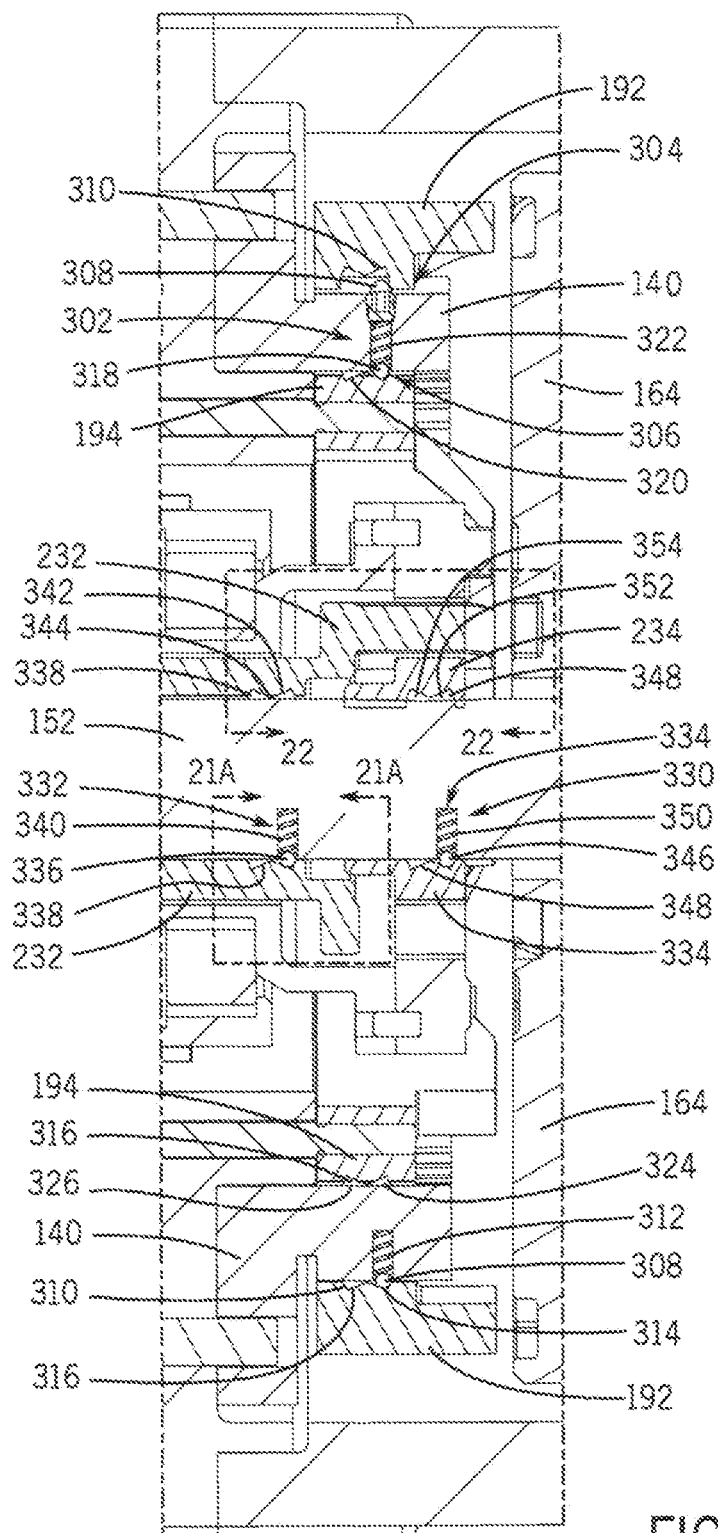
FIG. 20 is a detail view of the first and second clutch input clutch arrangements shown at detail 20 of FIG. 9.

Referring now to FIG. 20, the low retention mechanism 302 includes a first low retention mechanism 304 configured to retain the first low clutch ring 192 in the first axial position, and alternatively, in the second axial position, relative to the stationary spindle 140 and the first-stage planet carrier 164. Similarly, the low retention mechanism 302 includes a second low retention mechanism 306 configured to retain the second low clutch ring 194 in the first axial position, and alternatively, in the second axial position, relative to the stationary spindle 140 and the first-stage planet carrier 164.

The first low retention mechanism 304 interfaces with the stationary spindle 140 and the inner surface of the first low clutch ring 192. The first low retention mechanism 304 includes a first low detent ball 308 configured for selective engagement in a first low detent groove 310. The first low detent ball 308 is urged into the first low detent groove 310 by a first low resilient member 312. In the example of FIG. 20, the first low resilient member 312 is shown as a coil spring. However, it will be appreciated that other suitable resilient members are envisioned, including other springs or resilient, elastic materials configured to urge the first low detent ball 308 into the first low detent groove 310. The first low detent ball 308 and the first low resilient member 312 may be at least partially disposed in, or otherwise coupled to or mounted on the stationary spindle 140.

The first low detent groove 310 is positioned along the inner (radial) surface of the first low clutch ring 192. The first low detent groove 310 is configured to receive the first low detent ball 308 at multiple axial positions corresponding the first axial position and the second axial position of the low clutch arrangement 190 (and the first low clutch ring 192). The first low detent groove 310 is also configured to receive the first low detent ball 308 through a range of axial positions corresponding to intermediate axial positions between the first axial position and the second axial position of the first low clutch ring 192. In one example, the first low detent groove 310 includes a first groove section 314 and a second groove section 316 arranged axially relative to one another. The first low detent ball 308 may be received in different groove sections (i.e., the first groove section 314 and the second groove section 316) to retain the first low clutch ring 192 at corresponding axial positions (i.e., the first axial position and the second axial position).

The second low retention mechanism 306 interfaces with the stationary spindle 140 and the outer surface of the second low clutch ring 194. The second low retention mechanism 306 includes a second low detent ball 318 configured for selective engagement in a second low detent groove 320. The second low detent ball 318 is urged into the second low detent groove 320 by a second low resilient member 322. In the example of FIG. 20, the second low resilient member 322 is shown as a coil spring. However, it will be appreciated that other suitable resilient members are envisioned, including other springs or resilient, elastic materials configured to urge the second low detent ball 318 into the second low detent groove 320. The second low detent ball 318 and the second low resilient member 322 may be at least partially disposed in, or otherwise coupled to or mounted on the stationary spindle 140.

The second low detent groove 320 is positioned along the outer (radial) surface of the second low clutch ring 194. The second low detent groove 320 is configured to receive the second low detent ball 318 at multiple axial positions corresponding to the first axial position and the second axial position of the low clutch arrangement 190 (and the second low clutch ring 194). The second low detent groove 320 is also configured to receive the second low detent ball 318 through a range of axial positions corresponding to intermediate axial positions between the first axial position and the second axial position of the second low clutch ring 194. In one example, the second low detent groove 320 includes a first groove section 324 and a second groove section 326 arranged axially relative to one another. The second low detent ball 318 may be received in different groove sections (i.e., the first groove section 324 and the second groove section 326) to retain the second low clutch ring 194 at corresponding axial positions (i.e., the first axial position and the second axial position).

Accordingly, the first low clutch ring 192 and the second low clutch ring 194 may be retained at different axial positions by the low retention mechanism 302. Thus, the corresponding first and second low actuators 120, 124 which effect movements of the first and second low clutch rings 192, 194 do not need to be activated, or remain activated, to retain the low clutch rings 192, 194 in the different axial positions. In this manner, the low actuators 120, 124 may produce less heat, draw less power, and/or require less maintenance or less frequent maintenance (including repair and replacement) compared to a similarly situated actuator which remains activated to retain the axial position of a clutch arrangement or a component of a clutch arrangement.

As shown in FIGS. 10 and 11, the first low clutch ring 192 has one or more engagement elements (e.g., representing a combination of cavities, protrusions, teeth, or dogs configured for circumferential engagement) 196 that are oriented towards the first-stage planet carrier 164. The second low clutch ring 194 also has one or more engagement elements (e.g., representing a combination of cavities, protrusions, teeth, or dogs configured for circumferential engagement) 198 that are oriented towards the first-stage planet carrier 164.

In one implementation, each of the first low clutch ring engagement elements 196 is respectively formed with a square or perpendicular side and a ramped side. In some examples, the first low clutch ring engagement elements 196 may also be formed with an axial side disposed between the square side and the ramped side. Similarly, each of the second low clutch ring engagement elements 198 is respectively formed with a square or perpendicular side and a ramped side. In some examples, the second low clutch ring engagement elements 198 may also be formed with an axial side disposed between the square side and the ramped side. The square side of the engagement elements 196, 198 for each low clutch ring 192, 194 generally face (i.e., are perpendicular to) a rotational clock direction, and the ramped sides of the engagement elements 196, 198 face a direction having components in a rotational clock direction and in an axial direction. The axial sides generally face in an axial direction, for example, in the first axial direction.

In this example, the square side of the first low clutch ring engagement elements 196 and the square side of the second low clutch ring engagement elements 198 face in opposite rotational directions. For example, the square side of the first low clutch ring engagement elements 196 may face in the first rotational clock direction and the square side of the second low clutch ring engagement elements 198 may face in the second rotational clock direction.

As shown in the view of FIG. 10, the first-stage planet carrier 164 includes a first surface 200 facing the low clutch arrangement 190 and configured to interact with the low clutch arrangement 190. The first surface 200 is disposed at the input side of the planetary gear set 150. The first-stage planet carrier 164 includes first carrier engagement elements 202 arranged at the first surface 200 for selective engagement with and disengagement from the first low cutch ring engagement elements 196. The first-stage planet carrier 164 also includes second carrier engagement elements 204 arranged at the first surface 200 for selective engagement with and disengagement from the second low clutch ring engagement elements 198.

In one example, the first carrier engagement elements 202 are arranged in a first row in a circumferential direction at a first radial distance from the drive axis. The second carrier engagement elements 204 are arranged in second row in the circumferential direction at a second radial distance, less than the first radial distance.

The first and second carrier engagement elements 202, 204 are respectively formed with a square or perpendicular side and a ramped side. In some examples, the first and second carrier engagement elements 202, 204 may also be formed with an axial side disposed between the square side and the ramped side. In this example, the square side of the first carrier engagement elements 202 and the square side of the second carrier engagement elements 204 face in opposite rotational clock directions. For example, the square side of the first carrier engagement elements 202 may face in the second rotational clock direction and the square side of the second carrier engagement elements 204 may face in the first rotational clock direction. Thus, the square side of the first carrier engagement elements 202 opposes the square side of the first low clutch ring engagement elements 196 and the square side of the second carrier engagement elements 204 opposes the square side of the second low clutch ring engagement elements 198. The axial side may generally face in an axial direction, such as the second axial direction.

Accordingly, when the low clutch arrangement 190 is engaged with the first-stage planet carrier 164, interaction of the square sides of corresponding first carrier engagement elements 202 and first low clutch ring engagement elements 196 prevents rotation of the first-stage planet carrier 164 in the second rotational clock direction. Similarly, interaction of the square sides of corresponding second carrier engagement elements 204 and second low clutch ring engagement elements 198 prevents rotation of the first-stage planet carrier 164 in the first rotational clock direction. In this manner, the low clutch arrangement 190 is configured to hold the first-stage planet carrier 164 stationary.

As referenced above, the first and second low clutch rings 192, 194 may be individually repositioned as well. Thus, in one configuration, the first low clutch ring 192 may be engaged with the first-stage planet carrier 164 and the second low clutch ring 194 may be disengaged from the first-stage planet carrier 164. In this configuration, rotation of the first-stage planet carrier 164 in the second rotational clock direction is prevented by the interaction between square sides of the first low clutch ring engagement elements 196 and the first carrier engagement elements 202. The first-stage planet carrier 164 may rotate in the first rotational clock direction by way of engagement of the corresponding ramped sides of the first low clutch ring engagement elements 196 and the first carrier engagement elements 202 such that the first low clutch ring 192 overruns the first-stage planet carrier 164. That is, rotation of the first-stage planet carrier 164 relative to the first low clutch ring 192 in a direction that causes corresponding ramped sides to interact or engage one another (i.e., the first rotational clock direction), causes the first low clutch ring 192 move axially away from the first-stage planet carrier 164 such that the first low clutch ring engagement elements 196 disengage from the first carrier engagement elements 202. In this manner, the first low clutch ring 192 may overrun the first-stage planet carrier 164 and thus, may be considered an overrunning dog clutch.

In another configuration, the second low clutch ring 194 may be engaged with the first-stage planet carrier 164 and the first low clutch ring 192 may be disengaged from the first-stage planet carrier 164. In this configuration, rotation of the first-stage planet carrier 164 in the first rotational clock direction is prevented by the interaction between square sides of the second low clutch ring engagement elements 198 and the second carrier engagement elements 204. The first-stage planet carrier 164 may rotate in the second rotational clock direction by way of engagement of the corresponding ramped sides of the second low clutch ring engagement elements 198 and the second carrier engagement elements 204 such that the second low clutch ring 194 overruns the first-stage planet carrier 164. That is, rotation of the first-stage planet carrier 164 relative to the second low clutch ring 194 in a direction that causes corresponding ramped sides to interact or engage one another (i.e., the second rotational clock direction), causes the second low clutch ring 194 to move axially away from the first-stage planet carrier 164 such that the second low clutch ring engagement elements 198 disengage from the second carrier engagement elements 204. In this manner, the second low clutch ring 194 may overrun the first-stage planet carrier 164 and thus, may be considered an overrunning dog clutch.

In another configuration, the first low clutch ring 192 and the second low clutch ring 194 are both engaged with the first-stage planet carrier 164, such that the first low clutch ring engagement elements 196 are engaged with the first carrier engagement elements 202 and the second low clutch ring engagement elements 198 are engaged with the second carrier engagement elements 204. Rotation of the first-stage planet carrier 164 relative to the first low clutch ring 192 in the first rotational clock direction causes the first low clutch ring 192 to move axially away from the first-stage planet carrier 164 (i.e., in the second axial direction) to disengage the first low clutch ring engagement elements 196 from the first carrier engagement elements 202, such that the first low clutch ring 192 may overrun the first-stage planet carrier 164 while the second low clutch ring 194 remains engaged with the first-stage planet carrier 164. Alternatively, rotation of the first-stage planet carrier 164 relative to the second low clutch ring 194 in the second rotational clock direction causes the second low clutch ring 194 to move axially away from the first-stage planet carrier 164 (i.e., in the second axial direction) to disengage the second low clutch ring engagement elements 198 from the second carrier engagement elements 204, such that the second low clutch ring 194 may overrun the first-stage planet carrier 164 while the first low clutch ring 192 remains engaged with the first-stage planet carrier 164.

The first and second carrier engagement elements 202,204 are formed as cavities or recesses in the first surface 200 of the first-stage planet carrier 164. Accordingly, in this example, the first low actuator 120 is activated to reposition (via first low actuator linkage 122) the first low clutch ring 192 in an axial direction towards the first surface 200 of the first-stage planet carrier 164 (i.e., the first axial direction) such that the first low clutch ring engagement elements 196 are received in corresponding first carrier engagement elements 202 with corresponding square sides arranged in opposed relationship with one another. That is, the first low clutch ring 192 is repositioned from the first axial position to the second axial position by operation of the first low actuator 120. Similarly, the second low actuator 124 is activated to reposition (via second low actuator linkage 126) the second low clutch ring 194 in an axial direction towards the first surface 200 of the first-stage planet carrier 164 (i.e., the first axial direction) such that the second low clutch ring engagement elements 198 are received in corresponding second carrier engagement elements 204 with corresponding square sides arranged in opposed relationship with one another. That is, the second low clutch ring 194 is repositioned from the first axial position to the second axial position by operation of the second low actuator 124. Such an arrangement corresponds to an engaged status of the low clutch arrangement 190 and rotationally fixes the first-stage planet carrier 164.

The low clutch arrangement 190 is moved to a disengaged status by repositioning the first low clutch ring 192 in an axial direction away from the first surface 200 of the first-stage planet carrier 164 (i.e., the second axial direction) such that the first low clutch ring engagement elements 196 are withdrawn from corresponding first carrier engagement elements 202 (i.e., by repositioning the first low clutch ring 192 from the second axial position to the first axial position). Similarly, the second low clutch ring 194 is repositioned in an axial direction away from the first surface 200 of the first-stage planet carrier 164 (i.e., the second axial direction) such that the second low clutch ring engagement elements 198 are withdrawn from corresponding second carrier engagement elements 204. That is, the second low clutch ring 194 is moved to a disengaged status by repositioning the second low clutch ring 194 from the second axial position to the first axial position.

Reference is made to the cross-sectional view of FIG. 9, as well as the partially exploded isolated views of FIGS. 12 and 13, which depict the high clutch arrangement 230 and the first-stage planet carrier 164. In particular, FIG. 12 depicts an input side isometric view of the high clutch arrangement 230 and the first-stage planet carrier 164, and FIG. 13 depicts an output side isometric view of the high clutch arrangement 230 and the first-stage planet carrier 164.

As described in greater detail below, the high clutch arrangement 230 selectively interacts with the first-stage planet carrier 164 at the input side of the planetary gear set 150 to modify power flow through the drive assembly 56. In this example, the high clutch arrangement 230 is repositioned in an axial direction towards the first-stage planet carrier 164 (i.e., the first axial direction) to engage the first-stage planet carrier 164 and in an axial direction away from the first-stage planet carrier 164 (i.e., the second axial direction) to disengage the first-stage planet carrier 164. The high clutch arrangement 230 is repositioned in at least one axial direction in response to activation of the high actuators 130, 134.

In this example, the high clutch arrangement 230 is coupled to the first drive shaft 152 and is configured for axial movement in both directions along the first drive shaft 152. In addition, the high clutch arrangement 230 is rotationally fixed to the first drive shaft 152, and thus, does not rotate relative to the first drive shaft 152. In this manner, the high clutch arrangement 230, the first drive shaft 152 and the first-stage sun gear 160 rotate together as a unit. Accordingly, the high clutch arrangement 230 is configured to engage the first-stage planet carrier 164 to rotationally fix the high clutch arrangement 230, the first drive shaft 152 and the first-stage sun gear 160 to one another such that the first-stage planet carrier 164, the high clutch arrangement 230, the first drive shaft 152 and the first-stage sun gear 160 rotate together as a unit.

The high clutch arrangement 230 is retained at different axial positions relative to the first drive shaft 152 and the first-stage planet carrier 164 with a high retention mechanism 330. For example, the high clutch arrangement 230 may be retained at a first axial position where the high clutch arrangement 230 is disengaged from the first-stage planet carrier 164 and a second axial position where the high clutch arrangement 230 is engaged with the first-stage planet carrier 164.

As shown in FIGS. 12 and 13, in one example, the high clutch arrangement 230 generally includes a first high clutch ring 232 and a second high clutch ring 234. The first high clutch ring 232 circumscribes the first drive shaft 152 and at least a portion of the second high clutch ring 234 as described in greater detail below. The second high clutch ring 234 circumscribes the first drive shaft 152.

In one example, the first high clutch ring 232 includes inner splines that engage corresponding outer splines of the first drive shaft 152 and the second high clutch ring 234 includes inner splines that engage the outer splines of the first drive shaft 152. In this manner, the first and second high clutch rings 232, 234 are rotationally fixed to, and rotate with, the first drive shaft 152 in both rotational clock directions. As described further below, the first and second high clutch rings 232, 234 are movable relative to the first drive shaft 152 in both axial directions, i.e., towards and away from the first-stage planet carrier 164.

The high clutch rings 232, 234 further have, or are connected to, mounting structures, such as tabs, bearing surfaces or the like, coupled to respective actuator linkages 132, 126. As shown in FIGS. 12 and 13, the first high clutch ring 232 is coupled to the first high actuator linkage 132 and the second high clutch ring 234 is coupled to the second high actuator linkage 136. In this manner, the first high clutch ring 232 is coupled to the first high actuator 130 and the second high clutch ring 234 is coupled to the second high actuator 134. In effect, the first and second high clutch rings 232, 234 may be considered a bifurcated clutch arrangement.

Alternatively, or in addition to the mounting structures, the first and second high actuator linkages 132, 136 may be coupled to respective first and second high clutch rings 232, 234 via respective shifting mechanisms. The shifting mechanisms are configured to allow transmission of axial forces from the first and second high actuators 130, 134 and high actuator linkages 132, 136 to the corresponding high clutch rings 232, 234 to reposition the high clutch rings 232, 234. The shifting mechanisms are further configured to permit rotation of the first and second high clutch rings 232, 234 relative to the first and second high actuator linkages 132, 136. That is, the shifting mechanisms may be substantially axially fixed and rotationally decoupled from the corresponding clutch rings 232, 234.

Suitable shifting mechanisms include, but are not limited to, ball bearings (such as precision ball bearings), thrust bearings, and friction pads, including disc type and fork type friction pads. A suitable ball bearing arrangement may be disposed radially between a shifting ring connected to the first high actuator linkage 132 or the second high actuator linkage 136, and a corresponding high clutch ring 232, 234. A suitable thrust bearing arrangement may be disposed axially between a shifting ring connected to the first high actuator linkage 132 or the second high actuator linkage 136 and the corresponding high clutch rings 232, 234. A suitable disc type friction pad may be connected to the first high actuator linkage 132 or the second high actuator linkage 136 and arranged axially relative to a corresponding high clutch ring 232, 234, and a suitable fork type friction pad may be connected to the first high actuator linkage 132 or the second high actuator linkage 136 and may be disposed radially relative to a corresponding high clutch ring 232, 234.

In one example, a shifting mechanism includes or is coupled to a first plate 236 between the first high actuator linkage 132 and the first high clutch plate 232, and another shifting mechanism includes or is coupled to a second plate 238 between the second high actuator linkage 136 and the second high clutch plate 234. The first plate 236 is axially coupled to the first high clutch ring 232 and the second plate 238 is axially coupled to the second high clutch ring 234. Thus, the first plate 236 and the first high clutch ring 232 are repositionable in both axial directions (i.e., towards and away from the first-stage planet carrier 164) as a unit. Similarly, the second plate 238 and the second high clutch ring 234 are repositionable in both axial directions (i.e., towards and away from the first-stage planet carrier 164) as a unit. In addition, the first plate 236 is rotationally decoupled from the first high clutch ring 232 and the second plate 238 is rotationally decoupled from the second high clutch ring 234. In this manner, the first plate 236 is held stationary in both rotational clock directions while the first high clutch ring 232 is rotated relative to the first plate 236 in both rotational clock directions. Similarly, the second plate 238 is held stationary in both rotational clock directions while the second high clutch ring 234 is rotated relative to the second plate 238 in both rotational clock directions. Rotational bearing arrangements are disposed between the first plate 236 and the first high clutch ring 232 and between the second plate 238 and the second high clutch ring 234.

The first plate 236 is connected to one or more first high actuator linkages 132 to be moved axially by the linkage 132 in response to activation of the first high actuator 130. In addition, the first plate 236 is held rotationally fixed at least by way of the connection to the one or more first high actuator linkages 132. Similarly, the second plate 238 is connected to one or more second high actuator linkages 136 to be moved axially by the linkage 136 in response to activation of a second high actuator 134. In addition, the second plate 238 is held rotationally fixed at least by way of the connection to the one or more second high actuator linkage 136.

Briefly, and as discussed in greater detail below, the high clutch arrangement 230 may be selectively repositioned by the high actuators 130, 134 via the linkages 132, 136 into various positions relative to the first-stage planet carrier 164. In one example, the first high clutch ring 232 is configured such that the first high actuator 130 effects repositioning of the first high clutch ring 232 via the linkage 132 and the first plate 236 towards and/or away from the first-stage planet carrier 164 by causing the first high clutch ring 232 to move axially relative to the first drive shaft 152. Similarly, in one example, the second high clutch ring 234 is configured such that the second high actuator 134 effects repositioning of the second high clutch ring 234 via the linkage 136 and the second plate 238 towards and/or away from the first-stage planet carrier 164 by causing the second high clutch ring 234 to move axially relative to the first drive shaft 152.

Referring again to FIG. 20, the high retention mechanism 330 includes a first high retention mechanism 332 configured to retain the first high clutch ring 232 in the first axial position, and alternatively, the second axial position, relative to the first drive shaft 152 and the first-stage planet carrier 164. Similarly, the high retention mechanism 330 includes a second high retention mechanism 334 configured to retain the second high clutch ring 234 in the first axial position, and alternatively, the second axial position, relative to the first drive shaft 152 and the first-stage planet carrier 164.

The first high retention mechanism 332 interfaces with the first drive shaft 152 and the inner surface of the first high clutch ring 232. The first high retention mechanism 332 includes a first high detent ball 336 configured for selective engagement in a first high detent groove 338. The first high detent ball 336 is urged into the first high detent groove 338 by a first high resilient member 340. In the example of FIG. 20, the first high resilient member 340 is shown as a coil spring. However, it will be appreciated that other suitable resilient members are envisioned, including other springs or resilient, elastic materials configured to urge the first high detent ball 336 into the first high detent groove 338. The first high detent ball 336 and the first high resilient member 340 may be at least partially disposed in, or otherwise coupled to or mounted on the first drive shaft 152.

The first high detent groove 338 is positioned along the inner (radial) surface of the first high clutch ring 232. The first high detent groove 338 is configured to receive the first high detent ball 336 at multiple axial positions corresponding to the first axial position and the second axial position of the high clutch arrangement 230 (and the first high clutch ring 232). The first high detent groove 338 is also configured to receive the first high detent ball 336 through a range of axial positions corresponding to intermediate axial positions between the first axial position and the second axial position of the first high clutch ring 232. In one example, the first high detent groove 338 includes a first groove section 342 and a second groove section 344 arranged axially relative to one another. The first high detent ball 336 may be received in different groove sections (i.e., the first groove section 342 and the second groove section 344) to retain the first high clutch ring 232 at corresponding axial positions (i.e., the first axial position and the second axial position).

The second high retention mechanism 334 interfaces with the first drive shaft 152 and the inner surface of the second high clutch ring 234. The second high retention mechanism 334 includes a second high detent ball 346 configured for selective engagement in a second high detent groove 348. The second high detent ball 346 is urged into the second high detent groove 348 by a second high resilient member 350. In the example of FIG. 20, the second high resilient member 350 is shown as a coil spring. However, it will be appreciated that other suitable resilient members are envisioned, including other springs or resilient, elastic materials configured to urge the second high detent ball 346 into the second high detent groove 348. The second high detent ball 346 and the second high resilient member 350 may be at least partially disposed in, or otherwise coupled to or mounted on the first drive shaft 152.

The second high detent groove 348 is positioned along the inner (radial) surface of the second high clutch ring 234. The second high detent groove 348 is configured to receive the second high detent ball 346 in multiple axial positions corresponding to the first axial position and the second axial position of the high clutch arrangement 230 (and the second high clutch ring 234). The second high detent groove 348 is also configured to receive the second high detent ball 346 through a range of axial positions corresponding to intermediate axial positions between the first axial position and the second axial position of the second high clutch ring 234. In one example, the second high detent groove 348 includes a first groove section 352 and a second groove section 354 arranged axially relative to one another. The second high detent ball 346 may be received in different groove sections (i.e., the first groove section 352 and the second groove section 354) to retain the second high clutch ring 234 at corresponding axial positions (i.e., the first axial position and the second axial position).

Accordingly, the first high clutch ring 232 and the second high clutch ring 234 may be retained at different axial positions by the high retention mechanism 330. Thus, the corresponding first and second high actuators 130, 134 which effect movements of the first and second high clutch rings 232, 234 do not need to be activated, or remain activated, to retain the high clutch rings 232, 234 in the different axial positions. In this manner, the high actuators 130, 134 may produce less heat, draw less power, and/or require less maintenance or less frequent maintenance (including repair and replacement) compared to a similarly situated actuator which remains activated to retain the axial position of a clutch arrangement or a component of a clutch arrangement.

As shown in FIGS. 12 and 13, the first high clutch ring 232 has one or more engagement elements (e.g., representing a combination of cavities, protrusions, teeth, or dogs configured for circumferential engagement) 244 that are oriented towards the first-stage planet carrier 164. The second high clutch ring 234 also has one or more engagement elements (e.g., representing a combination of cavities, protrusions, teeth, or dogs configured for circumferential engagement) 246 that are oriented towards the first-stage planet carrier 164.

In one implementation, each of the first high clutch ring engagement elements 244 is respectively formed with a square or perpendicular side and a ramped side. In some examples, the first high clutch ring engagement elements 244 may also be formed with an axial side disposed between the square side and the ramped side. Similarly, each of the second high clutch ring engagement elements 246 is respectively formed with a square or perpendicular side and a ramped side. In some examples, the second high clutch ring engagement elements 246 may also be formed with an axial side disposed between the square side and the ramped side. The square side of the engagement elements 244, 246 for each high clutch ring 232, 234 generally face (i.e., are perpendicular to) a rotational clock direction, and the ramped sides of the engagement elements 244, 246 face a direction having components in a rotational clock direction and in an axial direction. The axial sides generally face in an axial direction, for example, the first axial direction.

In this example, the square side of the first high clutch ring engagement elements 244 and the square side of the second high clutch ring engagement elements 246 face in opposite rotational directions. For example, the square side of the first high clutch ring engagement elements 244 may face in the first rotational clock direction and the square side of the second high clutch ring engagement elements 246 may face in the second rotational clock direction.

With further reference to FIGS. 12 and 13, in an embodiment, at least a portion of the second high clutch ring 234 extends through the first high clutch ring 232. That is, the first high clutch ring 232 circumscribes at least a portion of the second high clutch ring 234. In this example, the first high clutch ring engagement elements 244 may be received through an input side of the second high clutch ring 234 and project outwardly beyond an output side of the second high clutch ring 234 towards the first-stage planet carrier 164.

Referring now to FIG. 12, the first surface 200 of the first-stage planet carrier 164 further includes third carrier engagement elements 206 configured for selective engagement with and disengagement from the first high clutch ring engagement elements 244. The first surface 200 of the first-stage planet carrier 164 also includes fourth carrier engagement elements 208 for selective engagement with and disengagement from the second high clutch ring engagement elements 246.

In one example, the third carrier engagement elements 206 are arranged in a third row in a circumferential direction at a third radial distance from the drive axis less than the second radial distance from the drive axis. The fourth carrier engagement elements 208 are arranged in a fourth row in the circumferential direction at a fourth radial distance from the drive axis, less than the third radial distance from the drive axis.

The third and fourth carrier engagement elements 206, 208 are respectively formed with a square or perpendicular side and a ramped side. In some examples, the third and fourth carrier engagement elements 206, 208 may also be formed with an axial side disposed between the square side and the ramped side. In this example, the square side of the third carrier engagement elements 206 and the square side of the fourth carrier engagement elements 208 face in opposite rotational directions. For example, the square side of the third carrier engagement elements 206 may face in the second rotational clock direction and the square side of the fourth carrier engagement elements 208 may face in the first rotational clock direction. Thus, the square side of the third carrier engagement elements 206 opposes the square side of the first high clutch ring engagement elements 244 and the square side of the fourth carrier engagement elements 208 opposes the square side of the second high clutch ring engagement elements 246. Accordingly, when the high clutch arrangement 230 is engaged with the first-stage planet carrier 164, interaction of the square sides of corresponding third carrier engagement elements 206 and first high clutch ring engagement elements 244 allows the first high clutch ring 232 to rotate the first-stage planet carrier 164 in the first rotational clock direction. Similarly, interaction of the square sides of corresponding fourth carrier engagement elements 208 and second high clutch ring engagement elements 246 allows second high clutch ring 234 to rotate the first-stage planet carrier 164 in the second clock rotational direction. The axial side may generally face in an axial direction, such as the second axial direction.

The first and second high clutch rings 232, 234 may be individually repositioned as well. Thus, in one configuration the first high clutch ring 232 may be engaged with the first-stage planet carrier 164 and the second high clutch ring 234 may be disengaged from the first-stage planet carrier 164. In this configuration, the first high clutch ring 232 and the first-stage planet carrier 164 are rotationally fixed for rotation together in the first rotational clock direction by the interaction between square sides of the first high clutch ring engagement elements 244 and the third carrier engagement elements 206. The first high clutch ring 232 and the first-stage planet carrier 164 are not rotationally fixed for rotation together in the second rotational clock direction. Instead, the first high clutch ring 232 overruns the first-stage planet carrier 164 in the second rotational clock direction by way of engagement of the corresponding ramped sides of the first high clutch ring engagement elements 244 and the third carrier engagement elements 206. That is, rotation of the first high clutch ring 232 in the second rotational clock direction relative to the first-stage planet carrier 164 causes corresponding ramped sides of the first high clutch ring engagement elements 244 and the third carrier engagement elements 206 to interact or engage one another such that the first high clutch ring 232 moves axially away from the first-stage planet carrier 164 to disengage the first high clutch ring engagement elements 244 from the third carrier engagement elements 206. In this manner, the first high clutch ring 232 may overrun the first-stage planet carrier 164 and may be considered an overrunning dog clutch.

In another configuration, the second high clutch ring 234 may be engaged with the first-stage planet carrier 164 and the first high clutch ring 232 may be disengaged from the first-stage planet carrier 164. In this configuration, the second high clutch ring 234 and the first-stage planet carrier 164 are rotationally fixed for rotation together in the second rotational clock direction by the interaction between square sides of the second high clutch ring engagement elements 246 and the fourth carrier engagement elements 208. The second high clutch ring 234 and the first-stage planet carrier 164 are not rotationally fixed for rotation together in the first rotational clock direction. Instead, the second high clutch ring 234 overruns the first-stage planet carrier 164 in the first rotational clock direction by way of engagement of the corresponding ramped sides of the second high clutch ring engagement elements 246 and the fourth carrier engagement elements 208. That is, rotation of the second high clutch ring 234 in the first rotational clock direction relative to the first-stage planet carrier 164 causes corresponding ramped sides of the second high clutch ring engagement elements 246 and the fourth carrier engagement elements 208 to interact or engage one another such that the second high clutch ring 234 moves axially away from the first-stage planet carrier 164 to disengage the second high clutch ring engagement elements 246 from the fourth carrier engagement elements 208. In this manner, the second high clutch ring 234 may overrun the first-stage planet carrier 164 and may be considered an overrunning dog clutch.

In another configuration, the first high clutch ring 232 and the second high clutch ring 234 are both engaged with the first-stage planet carrier 164, such that the first high clutch ring engagement elements 244 are engaged with the third carrier engagement elements 206 and the second high clutch ring engagement elements 246 are engaged with the fourth carrier engagement elements 208. Rotation of the first high clutch ring 232 relative to the first-stage planet carrier 164 in the second rotational clock direction causes the first high clutch ring 232 to move axially away from the first-stage planet carrier 164 to disengage the first high clutch ring engagement elements 244 from the third carrier engagement elements 206, such that the first high clutch ring 232 may overrun the first-stage planet carrier 164 while the second high clutch ring 234 remains engaged with the first-stage planet carrier 164. Alternatively, rotation of the second high clutch ring 234 relative to the first-stage planet carrier 164 in the first rotational clock direction causes the second high clutch ring 234 to move axially away from the first-stage planet carrier 164 to disengage the second high clutch ring engagement elements 246 from the fourth carrier engagement elements 208, such that the second high clutch ring 234 may overrun the first-stage planet carrier 164 while the first high clutch ring 232 remains engaged with the first-stage planet carrier 164. It will be appreciated that relative rotations, such as those above, may be caused by rotating engaged elements (e.g., a clutch ring and the planet carrier) at different relative speeds, holding one engaged element stationary while rotating another, and/or rotating engaged elements in different directions.

In one implementation, the third and fourth carrier engagement elements 206, 208 are formed as cavities or recesses in the first surface 200 of the first-stage planet carrier 164. Accordingly, in this example, the first high actuator 130 is activated to reposition (via first high actuator linkage 132 and first plate 236) the first high clutch ring 232 in an axial direction towards the first surface 200 of the first-stage planet carrier 164 such that the first high clutch ring engagement elements 244 are received in corresponding third carrier engagement elements 206 with corresponding square sides arranged in opposed relationship with one another. That is, the first high clutch ring 232 is repositioned from the first axial position to the second axial position by operation of the first high actuator 130. Similarly, the second high actuator 134 is activated to reposition (via second high actuator linkage 136 and second plate 238) the second high clutch ring 234 in an axial direction towards the first surface 200 of the first-stage planet carrier 164 such that the second high clutch ring engagement elements 246 are received in corresponding fourth carrier engagement elements 208 with corresponding square sides arranged in opposed relationship with one another. That is, the second high clutch ring 234 is repositioned from the first axial position to the second axial position by operation of the second high actuator 134. Such an arrangement corresponds to an engaged status of the high clutch arrangement 230 and rotationally drives the first-stage planet carrier 164.

The high clutch arrangement 230 is moved to a disengaged status by repositioning the first high clutch ring 232 in an axial direction away from the first surface 200 of the first-stage planet carrier 164 such that the first high clutch ring engagement elements 244 are withdrawn from corresponding third carrier engagement elements 206 (i.e., by repositioning the first high clutch ring 232 from the second axial position to the first axial position). Similarly, the second high clutch ring 234 is repositioned in an axial direction away from the first surface 200 of the first-stage planet carrier 164 such that the second high clutch ring engagement elements 246 are withdrawn from corresponding fourth carrier engagement elements 208. That is, the second high clutch ring 234 is moved to a disengaged status by repositioning the second high clutch ring 234 from the second axial position to the first axial position.

According to examples herein, the clutch rings 192, 194, 232, 234 each include a detent groove 310, 320, 338, 348 having first and second groove sections 314, 316, 324, 326, 342, 344, 352, 354 as described above. In addition, respective retention mechanisms 304, 306, 332, 334 are configured to retain corresponding clutch rings 192, 194, 232, 234 at first and second axial positions. Each retention mechanism 304, 306, 332, 334 includes a detent ball 308, 318, 336, 346 urged into a corresponding detent groove 310, 320, 338, 348 by a resilient member 312, 322, 340, 350.

Examples of the first high clutch ring 232, including the first high detent groove 338 and the first high retention mechanism 332, are described below with reference to FIGS. 21A, 21B and 22. It will be appreciated, however, that the following examples are applicable to each of the clutch rings 192, 194, 232, 234 and the corresponding retention mechanisms 302, 304, 332, 334, including the detent grooves 310, 320, 338, 348 formed on corresponding clutch rings 192, 194, 232, 234. For example, features of the first high detent groove 338 described below, including a geometry of the detent groove 338, may be the same for all detent grooves 310, 320, 338, 348, and interactions between the first high detent groove 338, the first high detent ball 336, and the first high resilient member 340 may be same for each of the detent grooves 310, 320, 338, 348 and corresponding detent balls 308, 318, 336, 346 and resilient members 312, 322, 340, 350, even where express description of such may be omitted below. It will further be appreciated that references to the first high detent groove 338 having a particular orientation or relationship to an adjacent component, may be applied to other detent grooves 310, 320, 348 in the context of the orientation and relationship of such detent grooves to adjacent components.

Figure 21A:
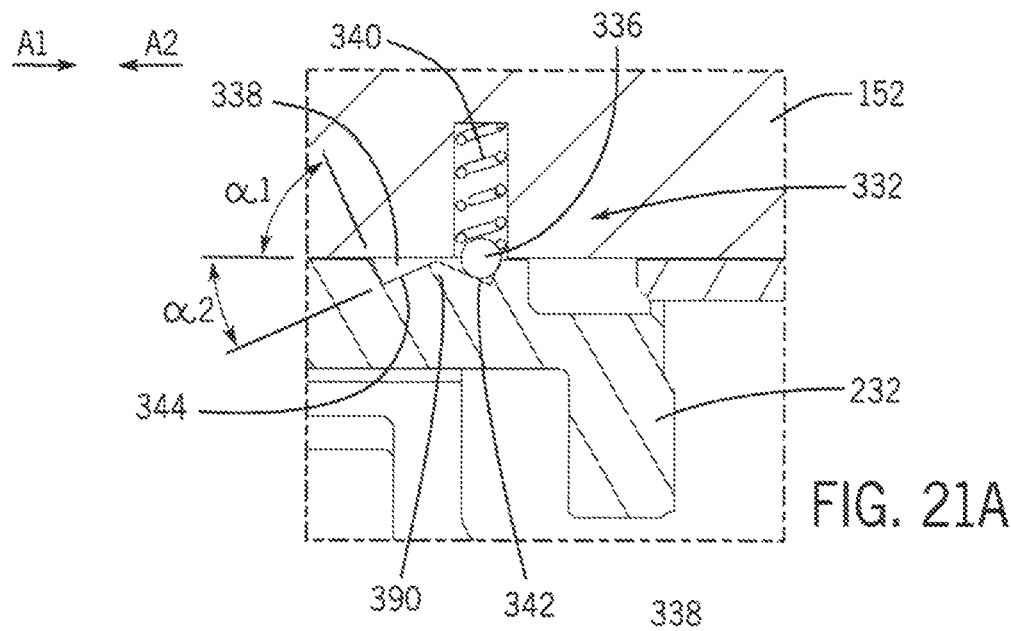
FIG. 21A is a detail view of a clutch arrangement in a first axial position shown at detail 21A of FIG. 20.

Referring now FIG. 21A, the first high clutch ring 232 is shown in the first axial position, such that the first high detent ball 336 is engaged in the first groove section 342 of the first high detent groove 338. The first high clutch ring 232 is disengaged from the first-stage planet carrier 164 when retained at the first axial position. Similarly, the other clutch rings 192, 194, 234 may be retained at a first axial position such that corresponding detent balls 308, 318, 346 are engaged in corresponding first groove sections 314, 324, 352 of corresponding detent grooves 310, 320, 348. The clutch rings 192, 194, 234 are also disengaged from the first-stage planet carrier 164 when retained at respective first axial positions.

Figure 21B:
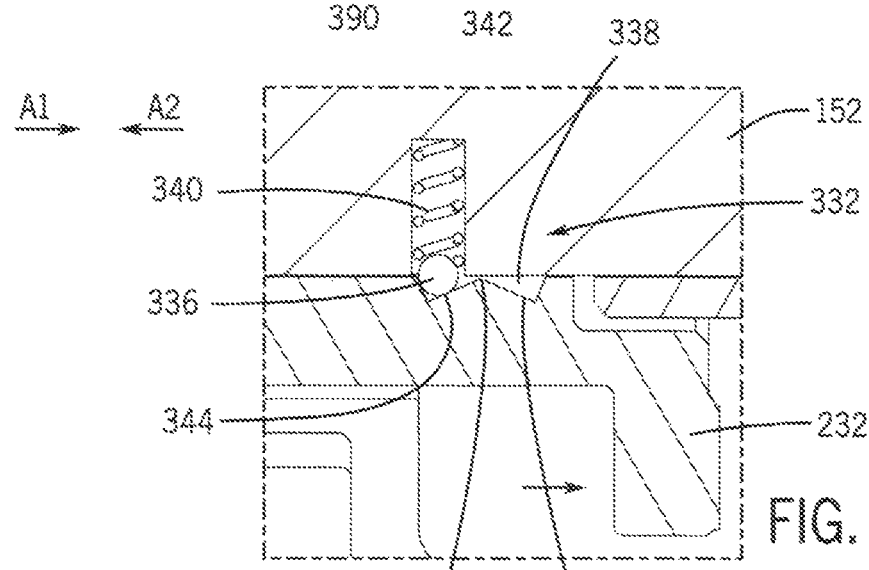
FIG. 21B is a detail view of the clutch arrangement of FIG. 21A moved to a second axial position.

In FIG. 21B, the first high clutch ring 232 is moved in the direction of the arrow A1 (i.e., the first axial direction) to the second axial position such that the first high detent ball 336 is engaged in the second groove section 344 of the first high detent groove 338. The first high clutch ring 232 is engaged with the first-stage planet carrier 164 when retained at the second axial position. Similarly, the other clutch rings 192, 194, 234 may be retained at a second axial position such that corresponding detent balls 308, 318, 346 are engaged in corresponding second groove sections 316, 326, 354 of corresponding detent grooves 310, 320, 348. The clutch rings 192, 194, 234 are also engaged with the first-stage planet carrier 164 when retained at respective second axial positions.

Figure 22:
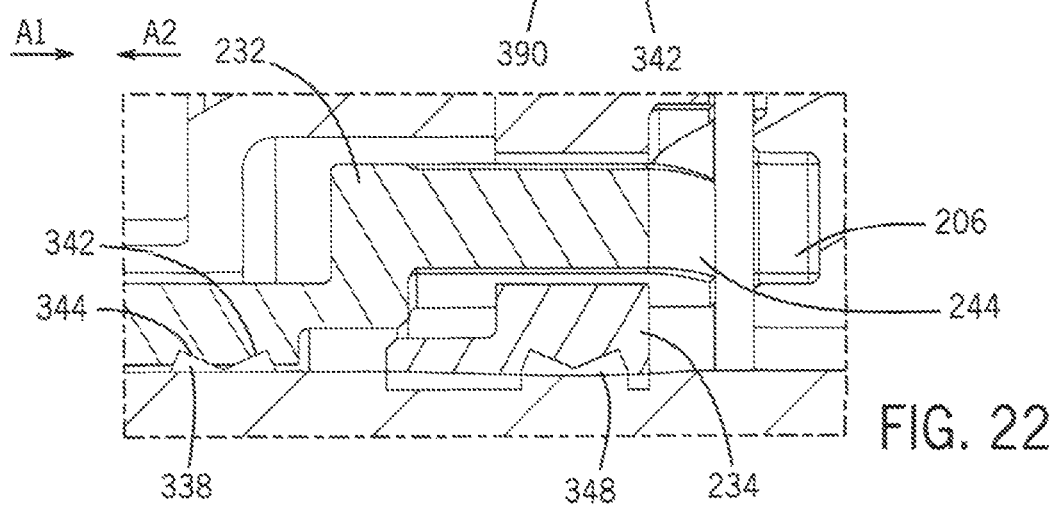
FIG. 22 is a detail view of the second clutch arrangement shown at detail 22 of FIG. 20.

Generally referring to FIGS. 21A, 21B and 22, it will be appreciated that the size and relative positioning of the first and second groove sections 342, 344 of the first high clutch ring 232 are related to the size and relative positioning of the first high clutch ring engagement elements 244 and the third carrier engagement elements 206. In this manner, engaging and disengaging movements of the first high clutch ring engagement elements 244 are coordinated with movements of the first and second groove sections 342, 344 relative to the first high detent ball 336. In some examples, the size and relative positioning of the groove sections may be based at least in part on a geometry of the groove sections 342, 344. For example, a length of a groove section 342, 344 may be based at least in part on a first angle α1 of a first groove section wall (referred to as an end wall below) and a second angle α2 of a second groove section wall (referred to as a guide wall below).

Likewise, the size and relative positioning of the other first and second groove sections 314, 316, 324, 326, 352, 354 of corresponding clutch rings 192, 194, 234 are related to the size and relative positioning of the clutch ring engagement elements 196, 198, 246 and the corresponding carrier engagement elements 202, 204, 208. In this manner, engaging and disengaging movements of the clutch ring engagement elements 196, 198, 246 with corresponding carrier engagement elements 202, 204, 208 are coordinated with movements of the first and second groove sections 314, 316, 324, 326, 352, 354 relative to the corresponding detent balls 308, 318, 346.

FIGS. 23-28 show example movements of the clutch rings 192, 194, 232, 234 and corresponding movements of associated detent grooves 310, 320, 338, 348 relative to corresponding detent balls 308, 318, 336, 346 and resilient members 312, 322, 340, 350. However, for clarity in the figures and simplicity of reference, FIGS. 23-28 and the following description refer generally to the examples of the first high clutch ring 232, the first high detent groove 338, the first high detent ball 336 and the first high resilient member 340. It will be appreciated that such examples, however, are applicable to the other clutch rings 192, 194, 234, and corresponding detent grooves 310, 320, 348, detent balls 308, 318, 346 and resilient members 312, 322, 350.

Figure 23A:
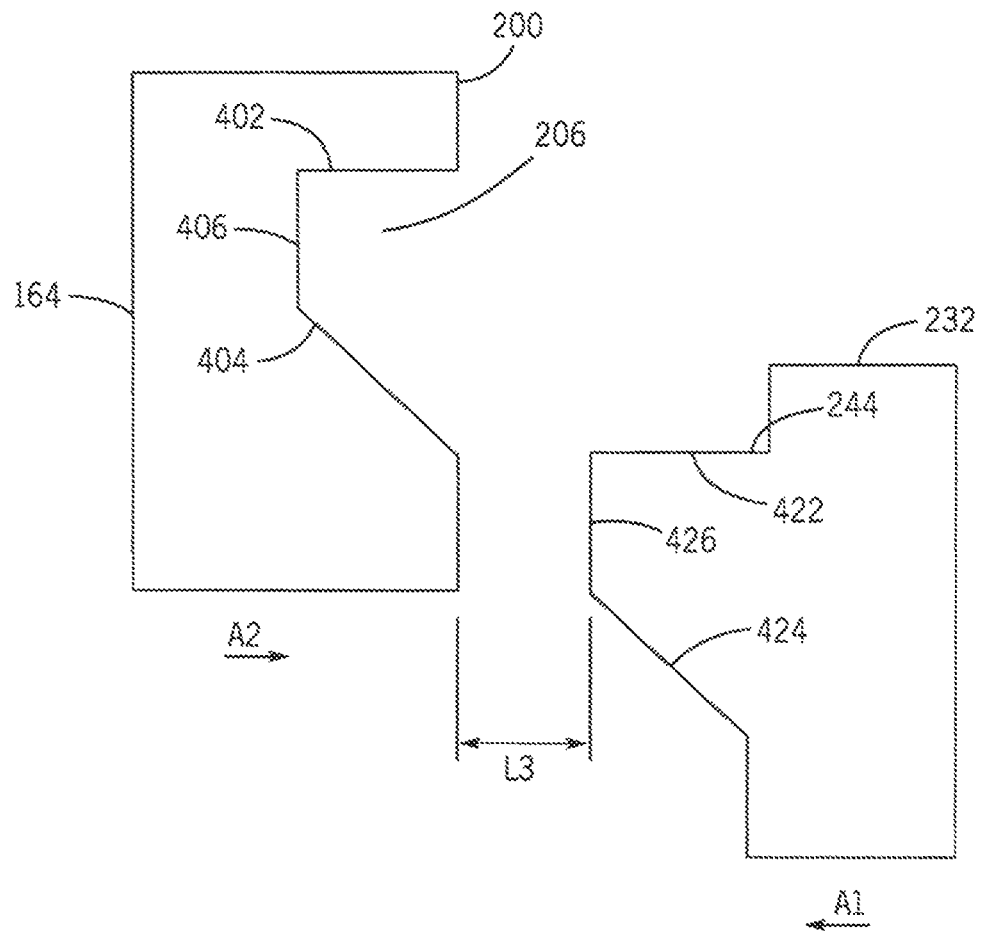
FIGS. 23A and 23B are diagrams showing an example of an input clutch arrangement of FIG. 9 at a first axial position.
Figure 23B:
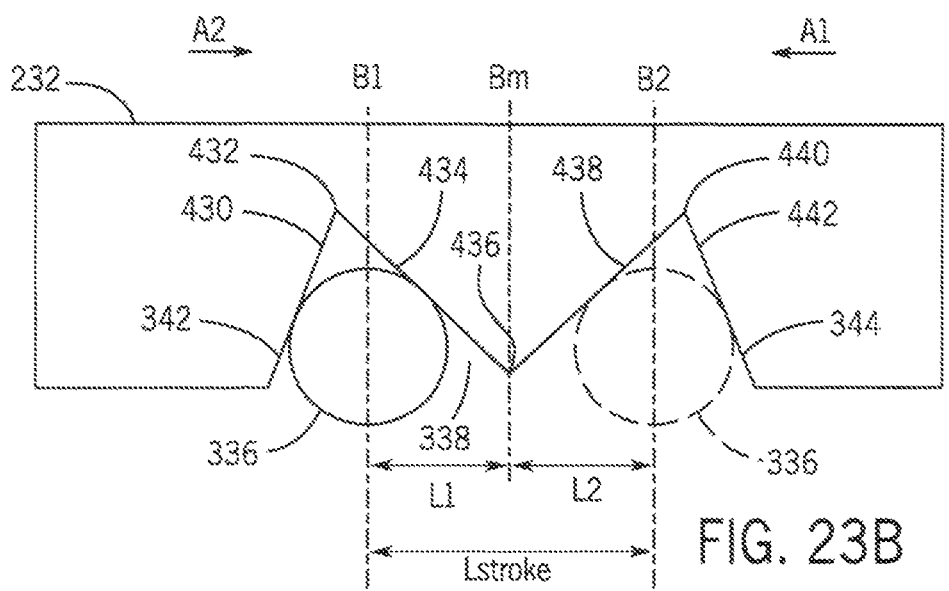

As shown in FIGS. 23A and 23B, according to an implementation, the third carrier engagement elements 206 may include a square side 402, a ramped side 404 and an axial side. The corresponding first high clutch ring engagement elements 244 include a square side 422, a ramped side 424 and an axial side 426. The first groove section 342 may include a first end wall 430, a first groove peak 432 and a first guide wall 434. An inner peak 436 may be disposed at a radially inner end of the first guide wall 434. The second groove section 344 may include a second guide wall 348 adjacent to the first guide wall 434 and extending from the inner peak 436. The second groove section 344 may further include a second groove peak 440 and a second end wall 442.

The first high clutch ring 232 is movable in the first axial direction A1 from the first axial position (FIG. 23A) to the second axial position (FIG. 28A) and through a plurality of intermediate axial positions (FIGS. 24A-27A) between the first axial position and the second axial position. The first high detent groove 338, which is included on the first high clutch ring 232, moves with the first high clutch ring 232 from the first axial position (FIG. 23B) to the second axial position (FIG. 28B) and through the plurality of intermediate axial positions (FIGS. 24B-27B). The first high clutch ring 232 and corresponding first high detent groove 338 are also movable in the second axial direction A2 from the second axial position to the first axial position, and through the plurality of intermediate axial positions.

The first high detent ball 336 is received in the first groove section 342 in a first seated configuration (FIG. 23B) with the first high clutch ring 232 at the first axial position. The first high detent ball 336 is alternatively received in the second groove section 344 in a second seated configuration (FIG. 23B, shown in broken lines, and FIG. 28B) with the first high clutch ring 232 at the second axial position. In addition, the first high detent ball 336 may be received in the first groove section 342 in a first unseated configuration (FIG. 24B), in the second groove section 344 in a second unseated configuration (FIGS. 26B and 27B) or aligned with the inner peak 436 in a neutral configuration (FIG. 25B) when the first high clutch ring 232 is disposed at an intermediate axial position.

In one example, the first high clutch ring 232 and first high detent groove 338 are movable in the first and second axial directions A1, A2 relative to the first high detent ball 336. Accordingly, a number of axial reference locations may be provided along the first high detent groove 338 based on the position of the first high detent groove 338 relative to the first high detent ball 336. The axial reference locations may be radially aligned with a reference midline extending through a center of the first high detent ball 336. The refence midline extends in a radial direction from an axis about which the first high detent ball 336 is disposed (i.e., the drive axis). For example, as shown in FIG. 23B, a first axial reference location B1 may be provided where the first high detent ball 336 is in the first seated configuration and a second axial reference location B2 may be provided where the first high detent ball 336 is in the second seated configuration. A mid-groove axial reference location Bm may be provided where the first high detent ball 336 is in the neutral configuration. Further, as shown in FIGS. 24B-27B, various intermediate axial reference locations Bi may be provided where the first high detent ball 336 is in the first and/or second unseated configuration.

Referring now to FIG. 23A, the first high clutch ring 232 is retained at the first axial position and is spaced from the first-planet carrier 164 by a third length L3. In one example, the third length L3 is an axial distance that may extend between the axial side 426 of the first high clutch ring engagement elements 244 and a first surface 200 of the first-stage planet carrier 164.

With reference to FIG. 23B, the first high detent groove 338 receives the first high detent ball 336 in the first seated configuration with the first high clutch ring 232 at the first axial position. In the first seated configuration, the first high detent ball 336 is held in contact with the first end wall 430 and the first guide wall 434 under the spring force of the first high resilient member 340 (see FIG. 21A, for example). Thus, the first high detent ball 336 transmits an axial force in the first axial direction A1 via contact with the first end wall 430 and an axial force in the second axial direction A2 via contact with the first guide wall 434.

The first high clutch ring 232 is movable from the first axial position to the second axial position, and vice versa, over a stroke length Lstroke. In one example, the stroke length Lstroke may be the axial distance between the first axial reference location B1 and the second axial reference location B2. In addition, a first intermediate stroke length L1 may be provided as an axial distance between the first axial reference location B1 and the mid-groove axial reference location Bm. A second intermediate stroke length L2 may be provided as an axial distance between the mid-groove axial reference location Bm and the second axial reference location B2. In one example, L1 is greater than L2. Further, in an example, L3 is greater than L1.

Figure 24A:
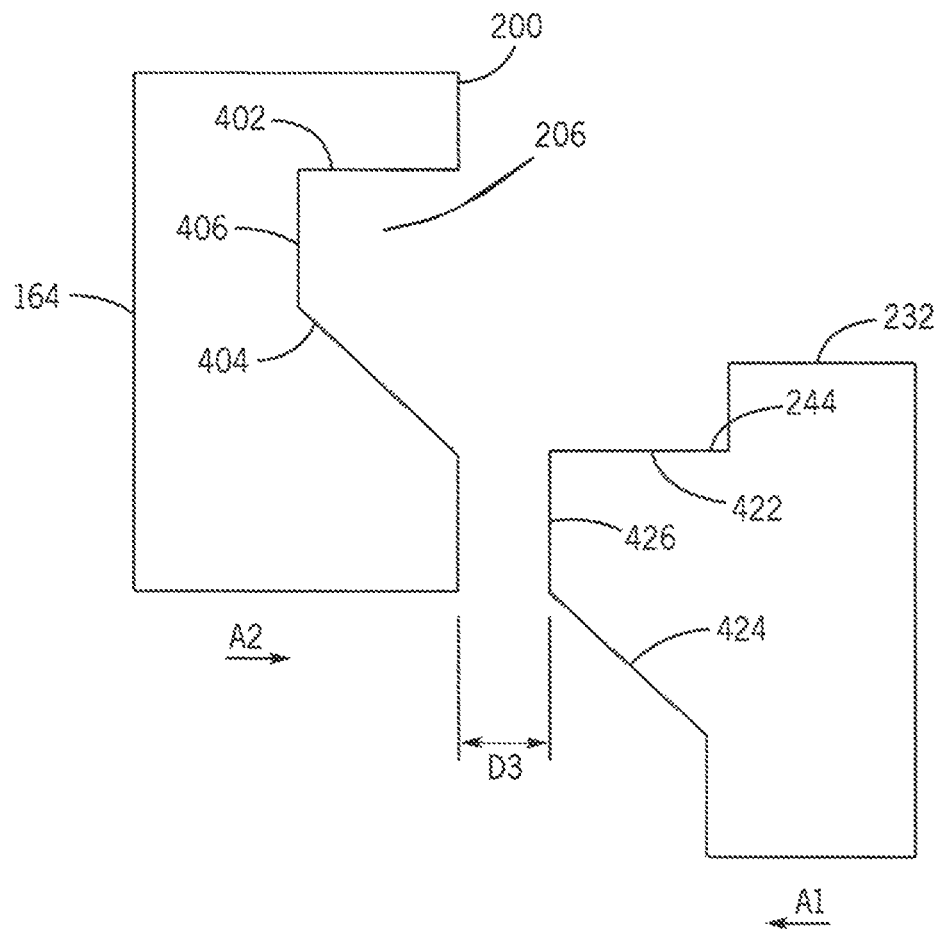
FIGS. 24A and 24B are diagrams showing an example of an input clutch arrangement of FIG. 9 at a first intermediate axial position.
Figure 24B:
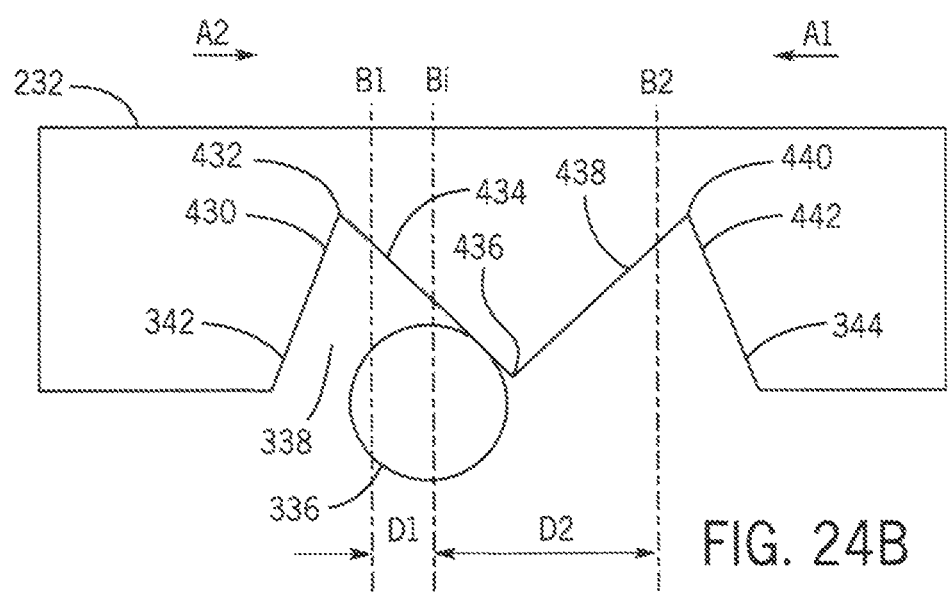

In FIGS. 24A and 24B, the first high clutch ring 232 is displaced in the first axial direction A1 over a first distance D1 to a first intermediate axial position. At the first intermediate axial position, the first high clutch ring 232 is positioned at a third distance D3 from the first-stage planet carrier 164. In this example, the third distance D3 is less than the third length L3. As shown in FIG. 24B, the first distance D1 may be provided between the first axial reference location B1 and an intermediate axial reference location Bi. A second distance D2 represents the remaining axial distance to complete movement through the stroke length Lstroke.

The first high detent ball 336 is received in the first groove section 342 in the first unseated configuration. In the first unseated configuration, the first end wall 430 is spaced from the first high detent ball 336 while the first high detent ball 336 is held in contact with the first guide wall 434. Thus, the first high detent ball 336 transmits an axial force in the second axial direction A2 via contact with the first guide wall 434.

Figure 25A:
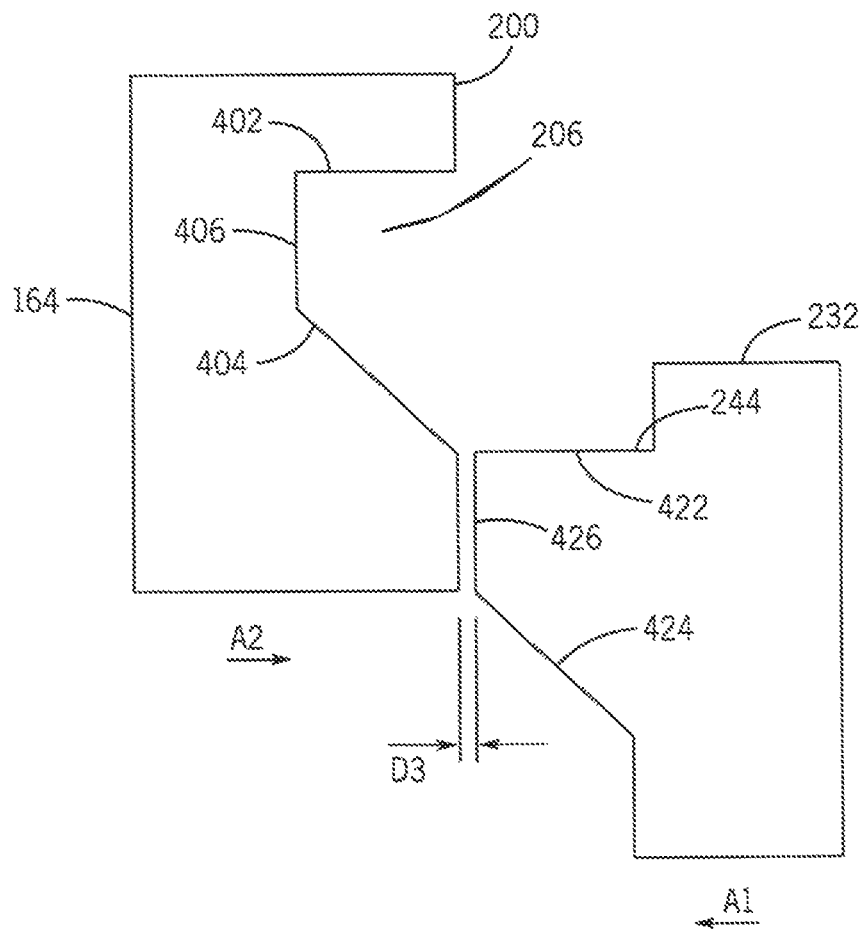
FIGS. 25A and 25B are diagrams showing an example of an input clutch arrangement of FIG. 9 at a second intermediate axial position.
Figure 25B:
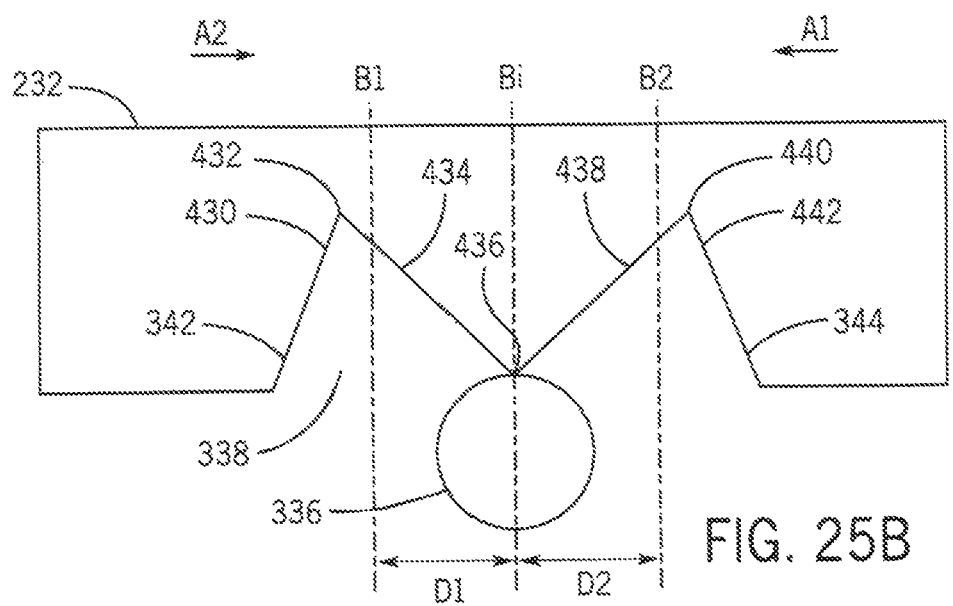

In FIGS. 25A and 25B, the first high clutch ring 232 is displaced in the first axial direction A1 over a first distance D1 to a second intermediate axial position. At the second intermediate axial position, the first high clutch ring 232 is positioned at a third distance D3 from the first-stage planet carrier 164. In this example, the third distance D3 is less than the third length L3. At this position, an intermediate axial reference location Bi is the same is the mid-groove axial reference location Bm shown in FIG. 23B. The first distance D1 may be provided between the first axial reference location B1 and the intermediate axial reference location Bi (i.e., the mid-groove reference location Bm in this example). Thus, the first distance D1 is equal to the first intermediate stroke length L1 in this example. Because L3 is greater than L1, the first high clutch ring 232 remains spaced from the first-stage planet carrier as shown in FIG. 25A.

In the neutral configuration, the first high detent ball 336 transmits forces substantially in the radial direction through contact with the inner peak 436, and thus, does not apply forces to the first high clutch ring 232 in the first or second axial direction A1, A2.

Figure 26A:
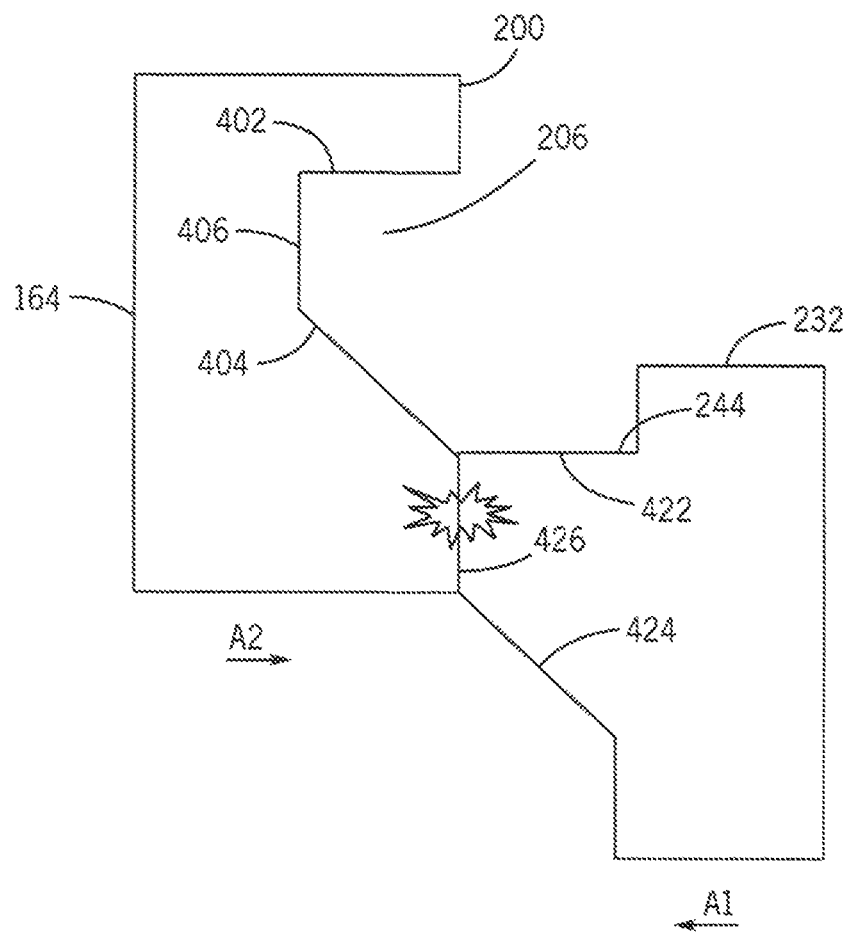
FIGS. 26A and 26B are diagrams showing an example of an input clutch arrangement of FIG. 9 at a third intermediate axial position.
Figure 26B:
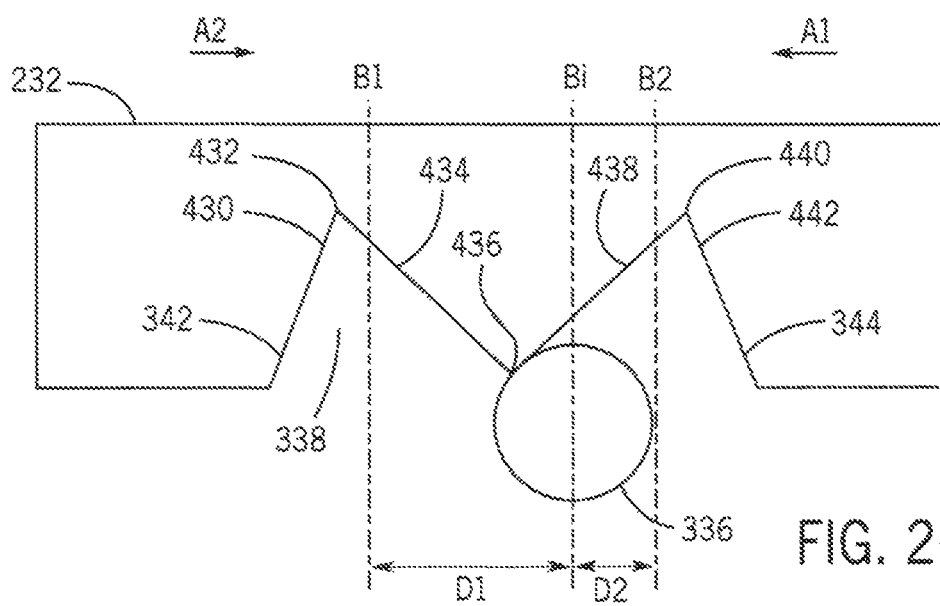

In FIGS. 26A and 26B, the first high clutch ring 232 is displaced in the first axial direction A1 over a distance equal to the third length L3 (FIG. 23A) to a third intermediate axial position. In this example, the axial side 426 of the first high clutch ring engagement elements 244 contact the first surface 200 of the first-stage planet carrier 164, and the first high clutch ring engagement elements 244 are not engaged with the corresponding third carrier engagement elements 206.

The first high detent ball 336 is received in the second groove section 344 in the second unseated configuration. In the second unseated configuration, the second end wall 442 is spaced from the first high detent ball 336 while the first high detent ball 336 is held in contact with the second guide wall 438. Thus, the first high detent ball 336 transmits an axial force in the first axial direction A1 via contact with the second guide wall 438. In this example, the first distance D1 traveled by the first high clutch ring 232 is greater than the first intermediate stroke length L1.

Figure 27A:
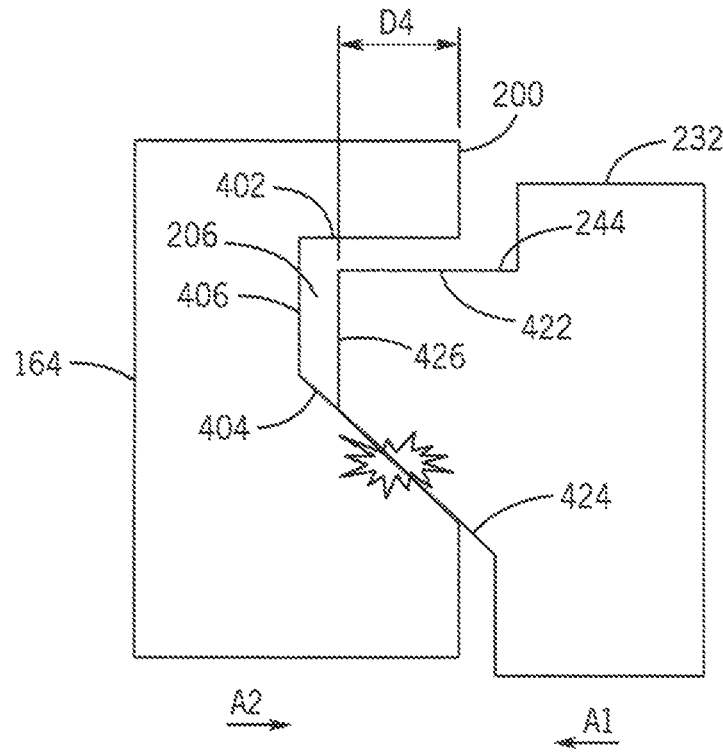
FIGS. 27A and 27B are diagrams showing an example of an input clutch arrangement of FIG. 9 at a fourth intermediate axial position.
Figure 27B:
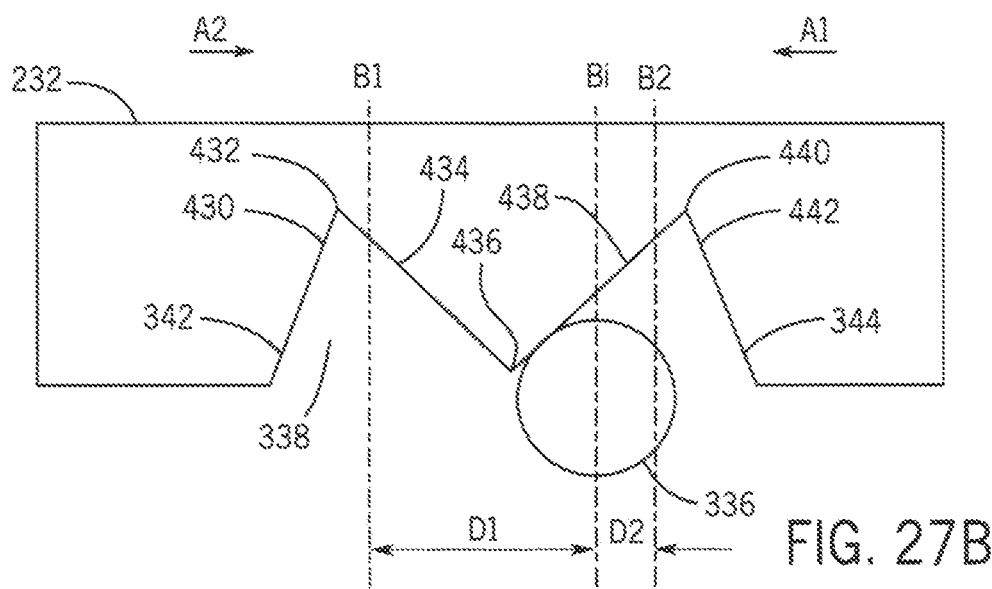

In FIGS. 27A and 27B, the first high clutch ring 232 is displaced in the first axial direction A1 over a first distance D1 which is greater than the first intermediate stroke length L1 but less than the total stroke length Lstroke, to a fourth intermediate axial position. In addition, the first high clutch ring engagement elements 244 are brought into partial alignment with the corresponding third carrier engagement elements 206, such that the axial end 426 is received within the third carrier engagement element 206 at a fourth distance D4 from the first surface 200. The ramped side 424 of the first high clutch ring engagement elements 244 contact the ramped side 404 of the third carrier engagement elements 206.

At the fourth intermediate axial position of this example, the first high detent ball 336 is received in the second groove section 344 in the second unseated configuration, such that the first high detent ball 336 is held in contact with the second guide wall 438 and transmits an axial force in the second axial direction A2 via such contact.

Figure 28A:
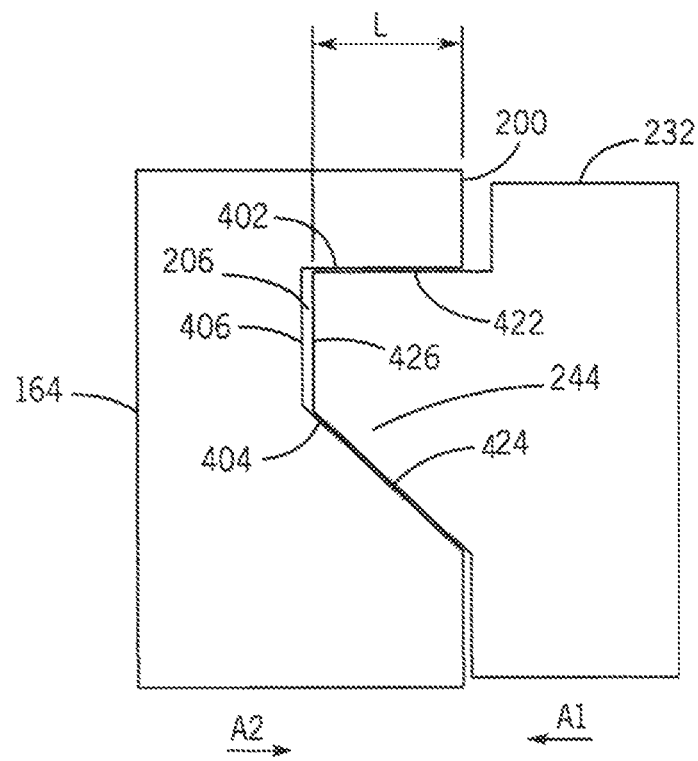
FIGS. 28A and 28B are diagrams showing an example of an input clutch arrangement of FIG. 9 at a second axial position.
Figure 28B:
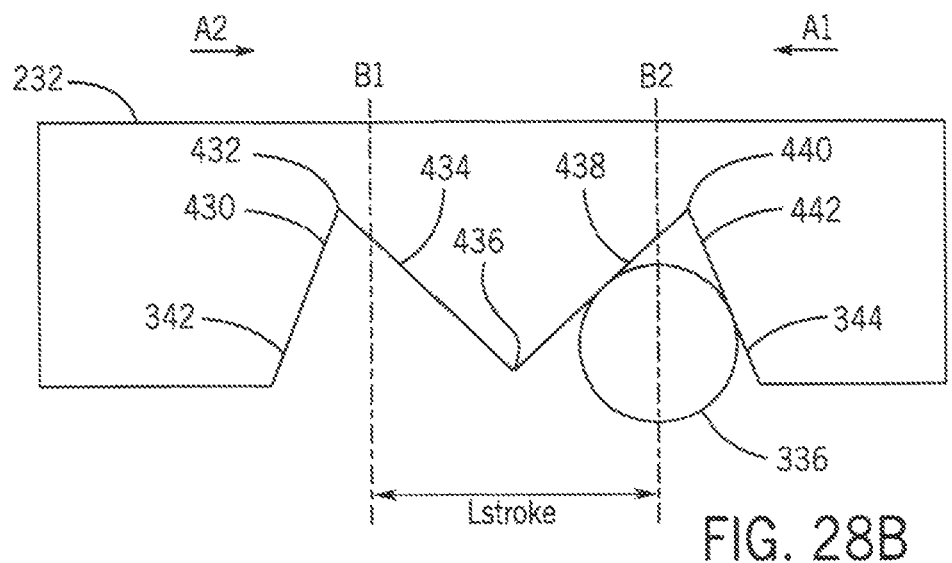

In FIGS. 28A and 28B, the first high clutch ring 232 is retained at the second axial position. At the second axial position, the first high clutch ring engagement elements 244 are engaged with the corresponding third carrier engagement elements 206 such that the axial side 426 is received in the third carrier engagement element 206 at a fourth length L4 from the first surface 200.

The first high detent ball 336 is received in the second groove section 344 in the second seated configuration. In the second seated configuration, the first high detent ball 336 is held in contact with the second guide wall 438 and the second end wall 442 under the spring force of the first high resilient member 340. Thus, the first high detent ball 336 transmits an axial force in the first axial direction A1 via contact with the second guide wall 438 and an axial force in the second axial direction A2 via contact with the second end wall 442.

Axial forces transmitted from the first high detent ball 336 to the first high clutch ring 232 either resist movement of the first high clutch ring 232 in one of the axial directions (a "retention force") or promote or assist movement of the first high clutch ring 232 in one of the axial directions (a "closing force"). According to one example, in the first seated configuration (FIG. 23B), the first high clutch ring 232 is retained at the first axial position in response to an external axial force in the first axial direction A1 that does not exceed the retention force in the second axial direction A2. Conversely, the first high clutch ring 232 may be moved in the first axial direction A1 in response to application of an external force in the first axial direction that exceeds the retention force in the second axial direction A2.

In the first unseated configuration (FIGS. 24A and 24B), the retention force resists movement of the first high clutch ring in the first axial direction A1 and urges the first high clutch ring 232 to return to the first axial position. Thus, the first high clutch ring 232 may be moved in the second axial direction A2 to return to the first axial position under the retention force in response to application of an external force that does not exceed the retention force in the second axial direction A2. Conversely, the first high clutch ring 232 may be further moved in the first axial direction A1 in response to application of an external force in the first axial direction A1 that exceeds the retention force in the second axial direction A2.

In the neutral configuration (FIGS. 25A and 25B), the first high detent ball 336 does not transmit a retention force or closing force to the first high clutch ring 232. Thus, the first high clutch ring 232 may be further moved in the first axial direction A1 in response to application of an external force in the first axial direction A1.

In the second unseated configuration (FIGS. 26A, 26B, 27A and 27B), the first high detent ball 336 transmits a closing force in the first axial direction A1. The closing force may promote or assist movement of the first high clutch ring 232 to the second axial position in response to application of an external force in the first axial direction A1. In this manner, movement of the first high clutch ring 232 to the second axial position may be completed even if the external force is removed from the first high clutch ring 232.

Additionally, in the second unseated configuration, the first high clutch ring engagement elements 244 may be disengaged from the third carrier engagement elements 206, for example, due to a misalignment of corresponding engagement elements as shown in FIG. 26A. However, the closing force urges the first high clutch ring engagement elements 244 into engagement with the corresponding third carrier engagement elements 206 upon alignment.

In the second seated configuration (FIGS. 28A and 28B), the first high clutch ring 232 is retained at the second axial position in response to an external force in the second axial direction A2 that does not exceed the retention force in the first axial direction A1.

Conversely, first high clutch ring 232 may be moved in the second axial direction A2 from the second axial position to the first axial position to disengage the first high clutch ring 232 from the first-stage planet carrier 164 in response to application of an external force in the second axial direction A2 that exceeds the retention force in the first axial direction A1. Such an external force may be provided, for example, by interaction of the corresponding ramped sides 404, 424. Alternatively, in normal operation, axial reaction forces may be transmitted from the first-stage planet carrier 164 to the first high clutch ring 232 to cause movement in the second axial direction A2.

In the second unseated configuration (FIGS. 26A, 26B, 27A, 27B), the retention force urges the first high clutch ring 232 in the first axial direction A1 to return to the second axial position. Thus, the first high clutch ring 232 may return to the second axial position (FIG. 28B) in response to a reaction force (or other force) in the second axial direction A2 being removed. Conversely, the first high clutch ring 232 may be further moved in the second axial direction A2 in response to application of an external force in the second axial direction A2 that exceeds the retention force in the first axial direction A1.

In the neutral configuration (FIGS. 25A and 25B), neither a retention force nor a closing force is transmitted by the first high detent ball 336 to the first high clutch ring 232. In one example, the first high clutch ring 232 may move in the second axial direction A2 under momentum from the interaction between the corresponding ramped sides 404, 424, after the corresponding engagement elements 206, 244 are disengaged. In this manner, the first high clutch ring 232 may continue movement in the second axial direction A2 to the first unseated configuration.

In the first unseated configuration (FIGS. 24A and 24B), the first high clutch ring 232 may be moved to the first axial position under a closing force transmitted by the first high detent ball in the second axial direction A2. Accordingly, the first high clutch ring 232 may be retained at the first axial position with the first high detent ball 336 in the first seated configuration (FIGS. 23A and 23B).

In examples herein, movement of the first high clutch ring 232 in the first and second axial directions A1, A2 causes radial displacement of the first high detent ball 336. For example, the first high detent ball 336 may be disposed at a first radial extent in the first seated configuration and a second radial extent in the second seated configuration. In one example, the first and second radial extents may be equal. Movement of the first high clutch ring 232 to the mid-groove reference location Bm causes radially inward displacement of the first high detent ball 336 against the spring force of the resilient member 340 to a mid-groove radial extent. At the mid-groove reference location Bm (corresponding to inner peak 436), the radial displacement may be at a maximum displacement value. In one example, the radial displacement value may be a minimum at the first radial extent and the second radial extent.

The retention force and/or the closing force of the retention mechanisms 302, 304, 332, 334, and in turn, movements of the clutch rings 192, 194, 232, 234, may be affected by the geometry of the corresponding detent groove 310, 320, 338, 348, the corresponding detent ball 308, 318, 336, 346, and/or a spring force provided by a corresponding resilient member 312, 322, 340, 350. For example, increasing the second angle α2 of a guide wall (e.g., first and second guide walls 434, 438 of the first high detent groove 338) and/or increasing a spring force of a resilient member 312, 322, 340, 350 increases the axial force transmitted by the detent ball 308, 318, 336, 346 to the clutch ring 192, 194, 232, 234, and thus, increases the retention force and/or the closing force.

Conversely, decreasing the second angle α2 of a guide wall and/or decreasing a spring force decreases the axial force transmitted by the detent ball 308, 318, 336, 346 to the corresponding clutch ring 192, 194, 232, 234 and thus, decreases the retention force and/or the closing force.

In addition, the retention force and/or the closing force, and thus, movements of clutch rings 192, 194, 232, 234, may be affected by a profile or contour of the end walls and/or the guide walls (e.g., first and second end walls 430, 442, and/or first and second guide walls 434, 438) in each of the detent grooves 310, 320, 338, 348. For example, in each groove section (e.g., first and second groove sections 342, 344) the end wall and guide wall (e.g., first end wall 430 and first guide wall 434) may be substantially linear and intersect to form an angled peak (e.g., first groove peak 432). However, other contours or profiles are envisioned. For example, an end wall and/or a guide wall may have a curved contour. Alternatively, one or more of the end wall and/or the guide wall may have a plurality of curved portions with different curvatures, a plurality of linear portions arranged at different angles, and/or some combination of curved and linear portions. In some implementations, adjacent guide walls (e.g. first guide wall 434 and second guide wall 438) of the first and second groove sections may have different contour or profiles. In this manner, a force profile to move a clutch ring 192, 194, 232, 234 from one axial position to another may be controlled to provide desired movement or resistance to movement. In addition, the groove peaks (e.g., first groove peak 432 and/or second groove peak 440), and/or the inner peak (e.g., 436) may either be angled or curved. In some examples, a groove peak and/or an inner peak may form part of a contoured surface to control movements of the clutch rings 192, 194, 232, 234.

In the above-referenced implementations, operation (activation) of the first high actuator 130 may effect movement of the first high clutch ring 232 in the first axial direction A1 to move the first high clutch ring 232 from the first axial position to the second axial position. For example, the first high actuator 130 may apply an external force to the first high clutch ring 232 that exceeds the retention force at the first axial position (in the first seated configuration) and during movement along the first intermediate stroke length L1 (in the first unseated configuration).

The first high actuator 130 may continue to apply the external force along at least a portion of the second intermediate stroke length L2 (in the second unseated configuration). However, as described previously, a closing force from the first high detent ball 336 is also applied to the first high clutch ring 232 in the first axial direction A1 to assist movement of the first high clutch ring 232 in the first axial direction A1 along the second intermediate stroke length L2. Thus, the first high actuator 130 may release the external force from the first high clutch ring 232 within the axial range between the Bm and B2 and the first high clutch ring 232 my complete movement to the second axial position under the closing force. As such, the first high actuator 130 is not required to have a stroke length equal to the stroke length Lstroke of the first high clutch ring 232.

With the first high clutch ring 232 retained at the second axial position by way of the first high detent ball 336 in the second seated configuration, the first high actuator 130 may be deactivated and need not hold the first high clutch ring 232 against movement in the second axial direction A2. In this manner, operating time of the first high actuator 130 may be reduced and service life may be improved. In addition, power draw and heat output from the first high actuator 130 may be reduced as well, which may reduce maintenance time, frequency and cost. It will be appreciated that each of the clutch rings 192, 194, 232, 234 may be operated by a corresponding actuator 120, 124, 130, 134 in a similar manner.

For movement from the second axial position to the first axial position, an external force in the second axial direction A2 may be applied to the first clutch ring 232 by way of interaction between corresponding ramped sides 404, 424 of the third carrier engagement elements 206 and the first high clutch ring engagement elements 244. Such movement of the other clutch rings 192, 194, 234 may be accommodated by similar interactions between ramped sides of corresponding carrier engagement elements 202, 204, 208 and clutch ring engagement elements 196, 198, 246. Movement from the second axial position to the first axial position may also be accommodated, at least in part, by the closing force provided by the detent ball 308, 318, 336, 346 in the first unseated configuration (i.e., at axial positions between reference locations Bm and B1).

Figure 14:
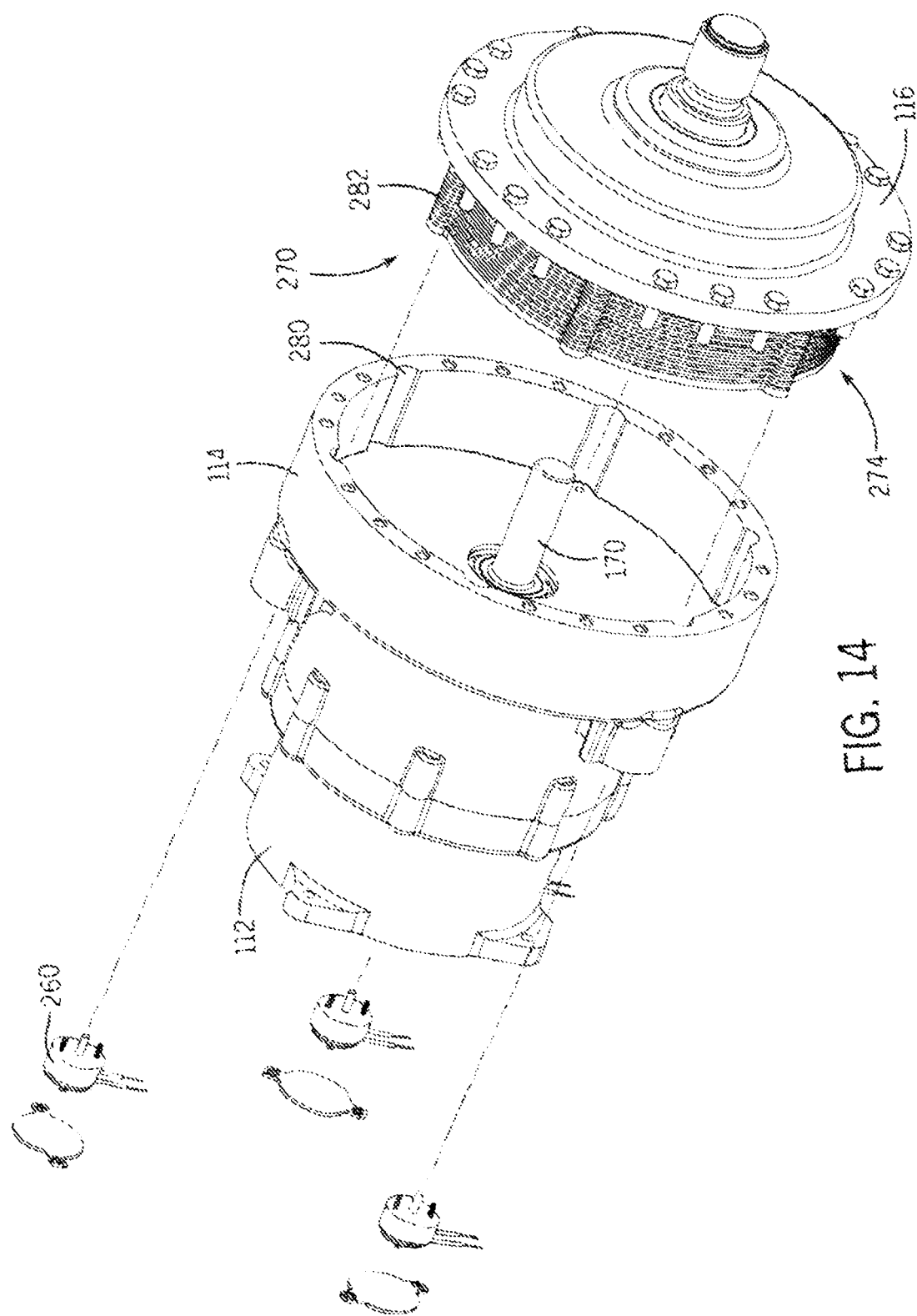
FIG. 14 is a partial exploded isometric view of the drive assembly of FIGS. 3 and 4.
Figure 15:
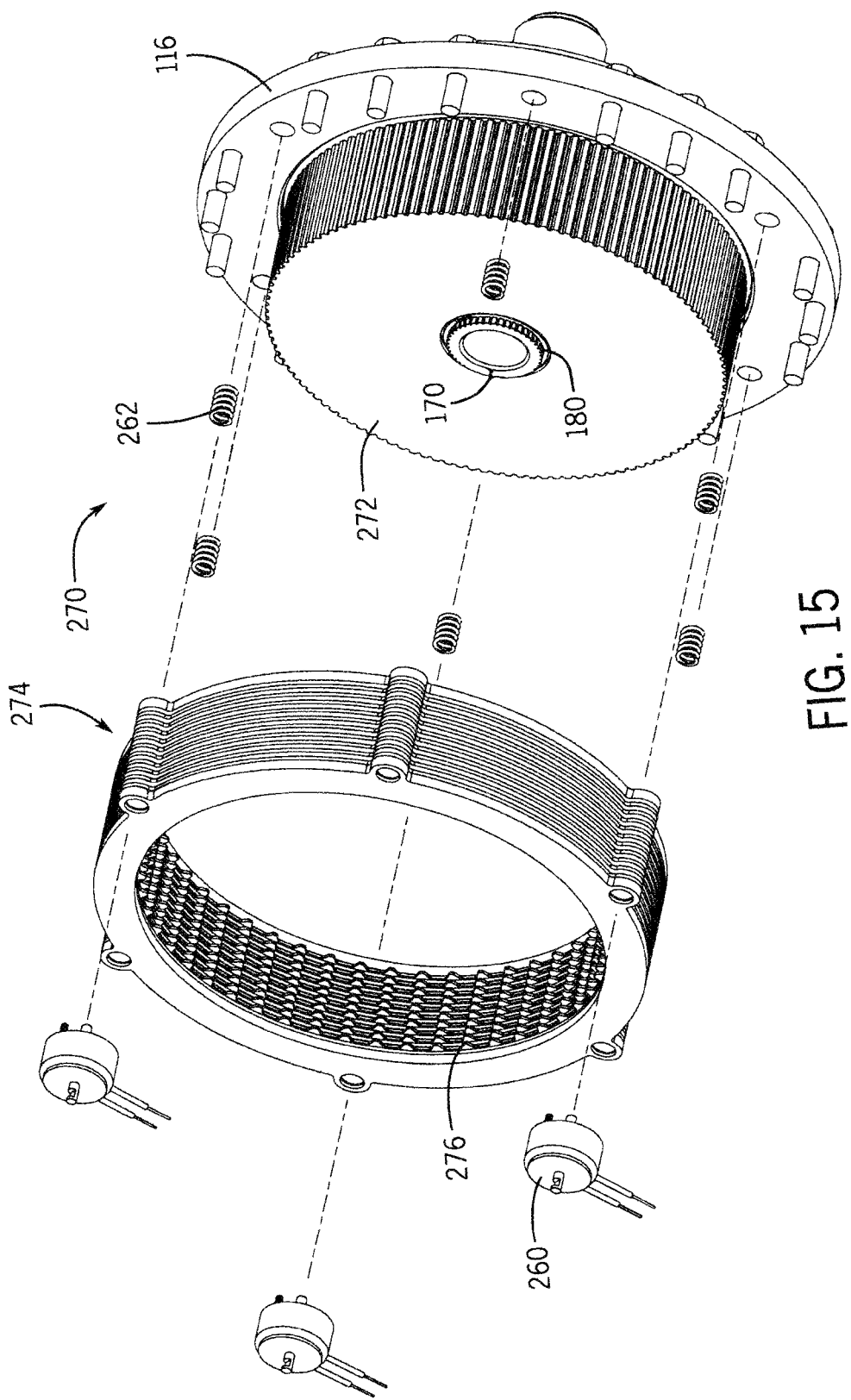
FIG. 15 is an isolated exploded view of a control clutch arrangement of thereof.

Now referring to FIGS. 9, 14 and 15, the drive assembly 56 includes one or more control actuators 260. In an embodiment, the one or more control actuators 260 may be similar or identical to input actuators 120, 124, 130, 134 described above. For example, a control actuator 260 may be a solenoid which can be activated to apply a push and/or pull force via its armature. Alternatively, or in addition, the control actuators 260 may include one or more hydraulic actuators as described further below.

In one implementation, the control actuator 260 is secured to the housing arrangement 110. As shown in FIGS. 9 and 14, for example, the control actuator 260 is fixed to the second housing element 114 and may be housed by a portion of the second housing element 114. The control actuator 260, fixed to the second housing element 114, can be considered as a reaction member. The control actuator 260 is activated to effect engagement and/or disengagement of the control clutch arrangement 270.

In one embodiment, a control actuator linkage (not shown) is coupled between the control actuator 260 and the control clutch arrangement 270 such that the control actuator 260 is configured to effect engagement and/or disengagement of the control clutch arrangement 270 via the control actuator linkage. In one implementation, the control actuator linkage (not shown) includes a pivot lever. Activation of the control actuator 260 effects movement of the pivot lever (i.e., a pivoting movement) to engage and/or disengaged the control clutch arrangement 270.

As shown in the views of FIGS. 9 and 15, the control clutch arrangement 270 is interfaced between a reaction component of the gear set 150 and a stationary reaction member. The control clutch arrangement 270 selectively couples the reaction component to the stationary reaction member and selectively decouples the reaction component from the stationary reaction member. For example, the control clutch arrangement 270 can be engaged to couple the reaction component to the stationary reaction member and disengaged to decouple the reaction component from the stationary reaction member. The control clutch arrangement 270 is engaged to prevent rotation of the reaction component relative to the stationary reaction member. That is, the control clutch arrangement 270 rotationally fixes, or grounds, the reaction component to the stationary reaction member. The control clutch arrangement 270 is disengaged to permit rotation of the reaction component relative to the stationary reaction member.

In one implementation, and with reference to FIGS. 9, 14 and 15, the control clutch arrangement 270 is interfaced with the second-stage sun gear 180 (i.e., a reaction component) and the second housing element 114 (i.e. a stationary reaction member). Thus, the control clutch arrangement 270 is engaged to prevent rotation of the second-stage sun gear 180 relative to the second housing element 114. The control clutch arrangement 270 is disengaged to permit rotation of the second-stage sun gear 180 relative to the second housing element 114.

With further reference to FIGS. 9, 14 and 15, an implementation of the control clutch arrangement 270 includes a clutch hub 272 and a clutch pack 274 having a plurality of clutch disks 276 and a plurality of friction disks 278 alternately positioned with respect to one another. The clutch disks 276 and the friction disks 278 are selectively moved into frictional engagement to substantially prevent relative rotation and moved out of frictional engagement to permit relative rotation. The friction disks 278 may have a friction surface on their axial faces which engages adjacent clutch disks 276 to provide the frictional engagement and disengages the adjacent clutch disks 276 release the frictional engagement.

One of the plurality of clutch disks 276 and the plurality of friction disks 278 is rotationally fixed to the reaction component, for example via a clutch hub 272, and the other of the plurality of clutch disks 276 and the plurality of friction disks 278 is rotationally fixed to the reaction member, i.e., the second housing element 114. For illustrative purposes, the following description refers to the clutch disks 276 as being rotationally fixed to the reaction component (e.g., the clutch hub 272) and the friction disks 278 as being rotationally fixed to the second housing element 114. However, it will be appreciated that in other embodiments, the clutch disks 276 may be rotationally fixed to the second housing element 114 or other stationary reaction member and the friction disks 278 may be rotationally fixed to the reaction component of the gear set 150.

As best shown in FIG. 15, the clutch hub 272 has a splined external surface and the clutch disks 276 have inward oriented teeth configured to engage the splined external surface of the clutch hub 272 such that the clutch disks 276 are rotationally fixed to the clutch hub 272. The second housing element 114 includes one or more housing engagement elements 280 and the friction disks 278 include one or more corresponding disk engagement elements 282. In this example, the housing engagement elements 280 are formed as notches or grooves and the disk engagement elements 282 are formed as tabs or projections configured to be received in the housing engagement elements 280 such the friction disks 278 are rotationally fixed to the second housing element 114.

The control clutch arrangement 270 is engaged when the clutch disks 276 and the friction disks 278 are frictionally engaged. The control clutch arrangement 270 is disengaged when the clutch disks 276 and the friction disks are not frictionally engaged. The control clutch arrangement 270 has a first torque capacity when engaged and a second torque capacity when disengaged. The second torque capacity is less than the first torque capacity.

The control clutch arrangement 270 is normally engaged, and the one or more control actuators 260 are activated to disengage the control clutch arrangement 270. For example, one or more springs 262 apply an axial compressive force on the clutch pack 274 to urge the clutch disks 276 and the friction disks 278 into frictional engagement to engage the control clutch arrangement. The control actuator 260 is activated to effect application of a release force against the spring to move the clutch disks 276 and friction disks 278 out of frictional engagement to disengage the control clutch arrangement 270. In one embodiment, the release force may be applied via a control actuator linkage (not shown). The control actuator linkage may include a pivot lever similar to that described above, such that the control actuator 260 applies the release force against the one or more springs 262 via pivot lever. The control actuator 260 is deactivated to effect engagement of the control clutch arrangement 270, such that the one or more springs 262 urge the clutch disks 276 and friction disks 278 into frictional engagement.

An increase or spike in torque caused by operation of an input clutch arrangement is transmitted through the planetary gear set to the reaction component (i.e., the second-stage sun gear 180). The control actuator 260 operates to disengage the control clutch arrangement 270 such that if the torque increase or spike is greater than the second torque capacity (i.e., the torque capacity of the disengaged control clutch arrangement 270), the reaction component rotates relative to the reaction member to damp or attenuate the torque increase or spike. Consequently, the torque increase or spike transmitted to the output element is reduced.

The control system 30 controls and coordinates operation of the input actuators 120, 124, 130, 134 for the input clutch arrangements 190, 230 and operation of the control actuator 260 for the control clutch arrangement 270 at the output side. In an embodiment, the control system 30 may control one or more of the input actuators 120, 124, 130, 134 to disengage a clutch arrangement 190, 230 at the input side and engage another clutch arrangement 190, 230 at the input side to effect a change in gear ratio.

The control system 30 also operates the control actuator 260 to disengage the control clutch arrangement 270 during the change in gear ratio. For example, the control system 30 activates the control actuator 260 to disengage the control clutch arrangement 270 at a time between disengagement of one input clutch arrangement and the engagement of another input clutch arrangement at the input side. The control system 30 may also deactivate the control actuator 260 at a time just after engagement of the input clutch arrangement 190, 230 to effect engagement of the control clutch arrangement 270, for example, under the compressive force of the one or more springs 262. Thus, the control actuator 260 is configured to disengage the control clutch arrangement 270 for a period of time during a change in gear ratio such that the control clutch arrangement 270 can damp the torque increase or spike (i.e., the "shift shock") resulting from the change in gear ratio.

The control clutch arrangement 270 may be disengaged to allow relative rotation, i.e., slippage, between the clutch disks 276 and the friction disks 278 for about 200-300 ms. That is, the control actuator 260 may be activated to disengage the control clutch arrangement 270 for about 200-300 ms to damp the torque increase or spike transmitted from the input side of the planetary gear set 150 during a change in gear ratio.

As indicated above, the control clutch arrangement 270 returns to an engaged status under the compressive force of the one or more springs 262 when the control actuator 260 is deactivated. The control clutch arrangement 270 is configured such that the first torque capacity exceeds the maximum torque transmitted through the planetary gear set 150 in normal operation. Accordingly, in normal operation, slippage between the clutch disks 276 and the friction disks 278 is avoided and the reaction component 180 is rotationally fixed to the reaction member 114.

In the embodiments above, the control clutch arrangement 270 may be either a wet clutch or a dry clutch. In addition, the control clutch arrangement 270 is normally static, such that slippage between clutch disks 276 and friction disks 278 is limited to the time when the control clutch arrangement 270 is disengaged. As such, the components of the control clutch arrangement 270 may avoid significant or prolonged wear and may have a long service life. Further, the control clutch arrangement 270, according to an embodiment, is a spring-applied clutch, such that it is normally engaged, as discussed above. Accordingly, the control actuator 260, i.e., the one or more solenoids in the embodiment above, does not need to be powered to engage the control clutch arrangement 270. Instead, the control actuator 260 is only powered, or activated, to release the control clutch arrangement 270.

Moreover, in the embodiments above, and shown in FIGS. 9, 14 and 15, by configuring the second-stage sun gear 180 as the reaction component, a relatively small diameter clutch pack 274 may be used. The power needed for disengaging the control clutch arrangement 270 may be generally proportional to the diameter of the clutch pack 274. Thus, by reducing the diameter, or using a clutch pack 274 having a relatively small diameter, the power used by the control actuator 260 can be reduced or minimized. In some embodiments, the clutch hub 272 described above may be omitted and a smaller diameter clutch pack 274 may be implemented, such that the clutch disks 276 are rotationally fixed directly to the reaction component (i.e., the second-stage sun gear 180 in the embodiment above).

The arrangements described above and shown in FIGS. 3-15 relate generally to a drive assembly 56 having a ring in, sun reaction, carrier out planetary gear set configuration, and a control clutch arrangement 270 configured to selectively decouple the reaction component of the planetary gear set 150 from the stationary reaction member to damp a torque increase or spike transmitted from the input side. However, the control clutch arrangement 270 may be implemented in differently configured drive assemblies or with differently configured planetary gear sets. Moreover, the arrangements described above and shown in FIGS. 3-15 refer to embodiments in which the control actuator 260 may be provided as a solenoid. The present disclosure is not limited to such an example, however and other control actuators are envisioned as further described in the following embodiments.

FIGS. 16-19 show variations of drive assemblies having a control clutch arrangement for damping shift shock. The same reference numbers and/or terminology used in the embodiments above may be used below to describe and identify like parts. In addition, further description of like parts may be omitted below.

In general, FIGS. 16-19 show drive assemblies having a housing arrangement 110, a drive shaft 152, a first-stage planetary gear set, and one or more clutch arrangements 190, 230 at the input side that are the same as those described above. However, in the embodiments of FIGS. 16-19, a planetary gear set 350 is arranged in a sun in, ring reaction, carrier out configuration. Accordingly, the planetary gear set 350 of the following embodiments includes the first-stage sun gear 160, the first-stage planet gears 162, the first-stage planet carrier 164, the first-stage ring gear 166 and the optional first-stage ring gear cover 168 as described above. The planetary gear set 350 further includes a second drive shaft 370, a second-stage sun gear 380, a second-stage ring gear 374, a set of second-stage planet gears 376, and a second-stage planet carrier 378 on which the second-stage planet gears 376 are supported. The second-stage sun gear 380 is the input component, the second-stage ring gear 374 is the reaction component, and the second-stage planet carrier 378 is the output component.

The second-stage sun gear 380 is rotationally fixed to the second drive shaft 370 and the second-stage planet gears 376 are disposed about the second-stage sun gear 380. The second-stage planet gears 376 are supported on the second-stage planet carrier 378 in same manner as the first-stage planet gears 162 and the first-stage planet carrier 164 above. The second-stage ring gear 374 circumscribes the second-stage planet gears 376 and the second-stage sun gear 380. The second-stage ring gear 374 includes internal teeth and the second-stage planet gears 376 and the second-stage sun gear 380 each include external teeth. The second-stage planet gears 376 are disposed between and engaged with the second-stage ring gear 374 and the second-stage sun gear 380.

Accordingly, in the embodiments of FIGS. 16-19, torque and rotational speed are transmitted from the first-stage ring gear 166 (via first-stage ring gear cover 168) to the second drive shaft 370 and second-stage sun gear 380, which rotate together with the first-stage ring gear 166. Torque and rotational speed are transmitted from the second-stage sun gear 380 to the second-stage planet gears 376 and reacts against the second-stage ring gear 374 for transmission to the second-stage planet carrier 378.

Further, in the embodiments of FIGS. 16-19, a control clutch arrangement 470 is interfaced with the reaction component, i.e., the second-stage ring gear 374, and a stationary reaction member, i.e., a stationary portion of the housing arrangement 110, such as the second housing element 114. The control clutch arrangement 470 may be similar to the control clutch arrangement 270 described in the embodiments above. Accordingly, the control clutch arrangement 470 may include a clutch pack 474 having clutch disks 476 and friction disks 478 which operate in the same manner as the clutch disks 276 and the friction disks 278 above. One of the clutch disks 476 and the friction disks 478 are rotationally fixed to the reaction component, i.e., the second-stage ring gear 374, and the other of the clutch disks 476 and the friction disks 478 are rotationally fixed to the stationary housing member, e.g., the secondary housing element 114.

The control clutch arrangement 470 operates similarly to the control clutch arrangement 270 above. For example, the control clutch arrangement 470 is engaged to couple (i.e., rotationally fix) the reaction component (i.e., the second-stage ring gear 374) to the stationary reaction member (e.g., the second housing element 114), and is disengaged to decouple the reaction component from the stationary reaction member. The control clutch arrangement 470 is disengaged to allow rotation of the reaction component relative to the stationary reaction member to damp or attenuate an increase or spike in torque as described above with respect to control clutch arrangement 270. The control clutch arrangement 470 may be a spring-applied clutch in the manner described above with respect to control clutch arrangement 270 as well.

Figure 16:
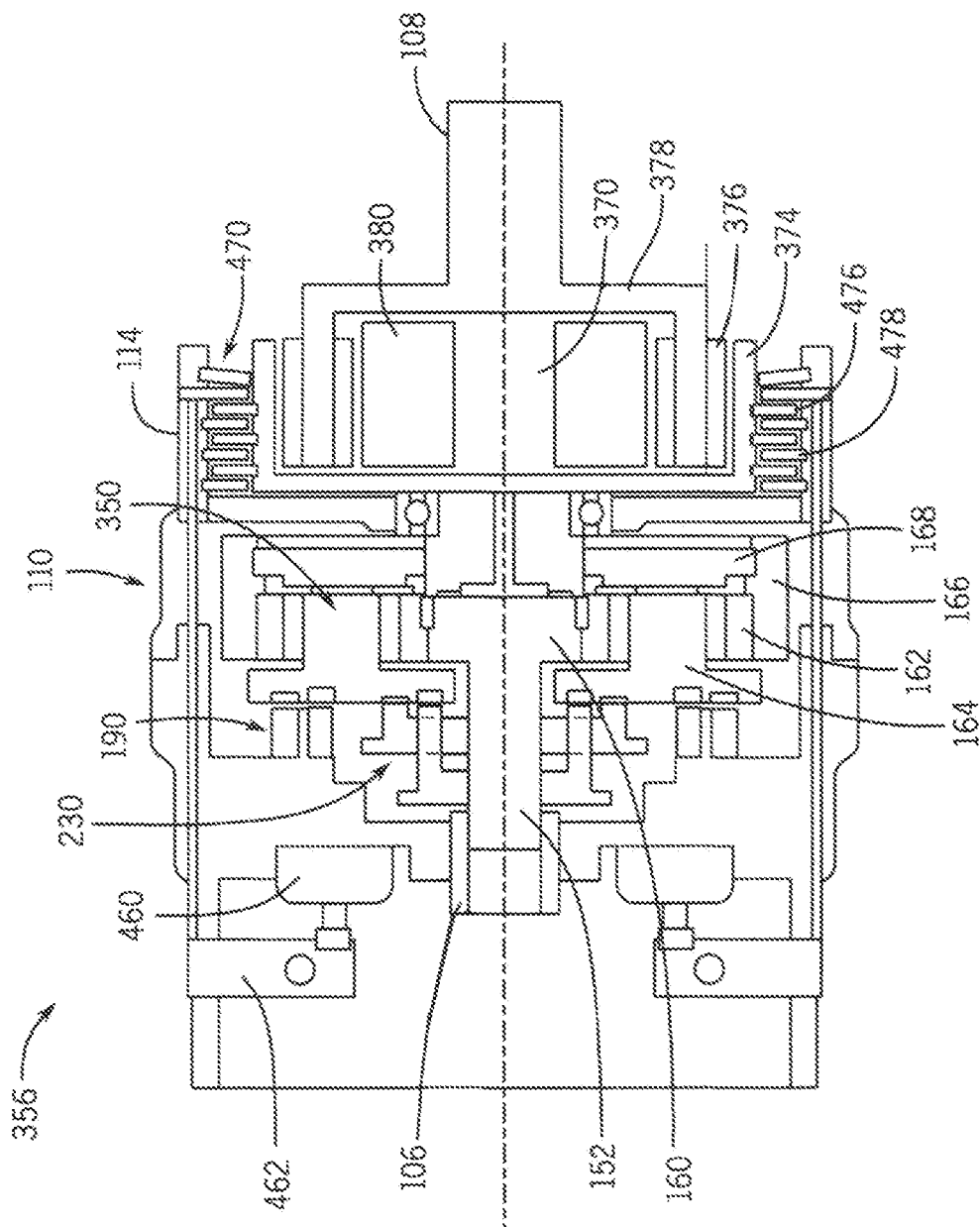
FIGS. 16-19 are cross-sectional views similar to FIG. 9 depicting drive assemblies according to alternate embodiments.

Referring particularly now to FIG. 16, a drive assembly 356 further includes one or more control actuators 460. In this example, the control actuator 460 includes one or more solenoids similar to the control actuator 260 described above. However, the control actuator 460 may be mounted on the input side, proximal to the actuators 120, 124, 130, 134. An actuator linkage 462 is coupled to the control actuator 460 and the control clutch arrangement 470. In this example, the actuator linkage 462 is a pivot lever.

The control actuator 460 is activated is disengage the control clutch arrangement 470. In an embodiment, the activation of the control actuator 460 effects movement of the actuator linkage 462 to act against a compressive force applied to the control clutch arrangement 470 by one or more springs. In this manner, a torque capacity of the control clutch arrangement 470 is reduced. Accordingly, the control clutch arrangement 470 is disengaged to damp or attenuate a torque increase or spike caused by operation of an input clutch arrangement 190, 230 effecting a change in gear ratio. The control actuator 460 is deactivated to effect engagement of the control clutch arrangement 470 under the compressive force of the one or more springs.

Figure 17:
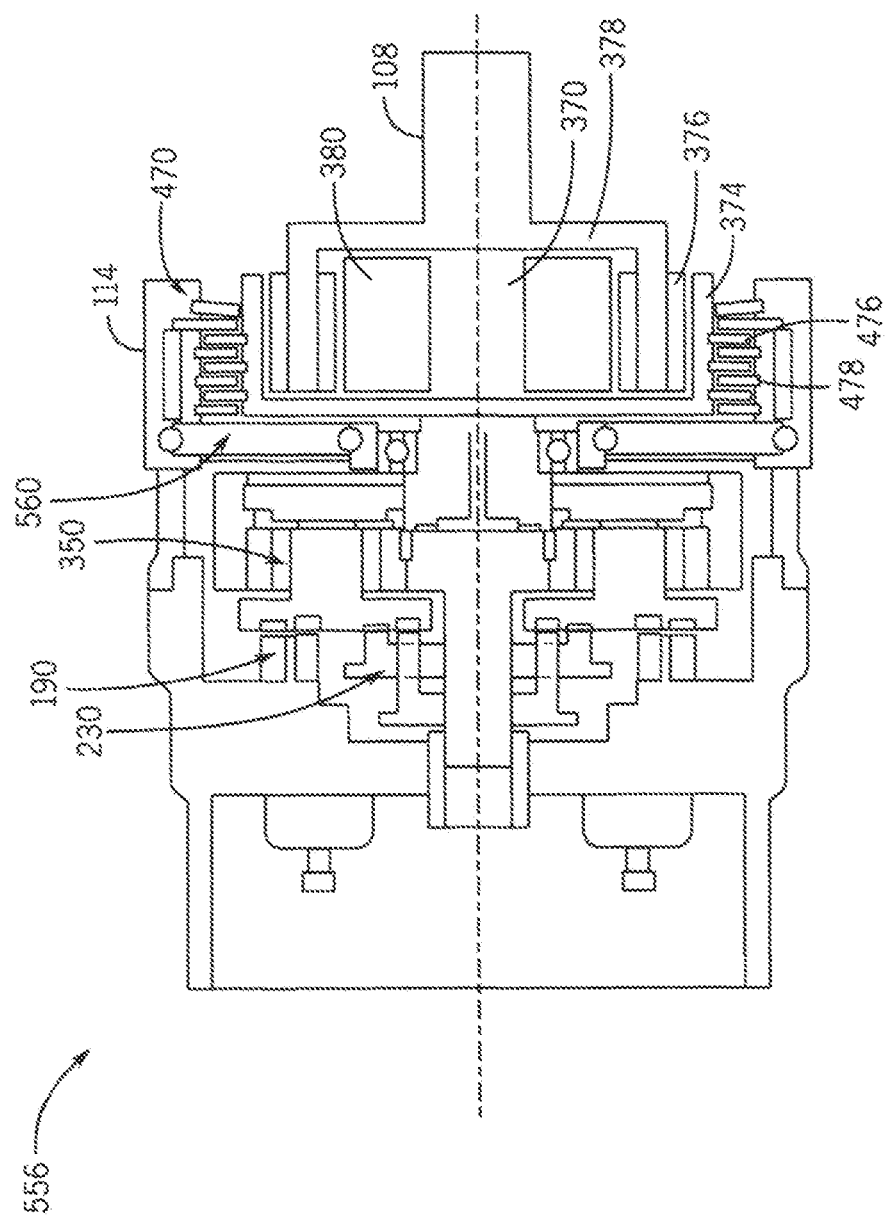

FIG. 17 is a cross-sectional view of a drive assembly 556 that is substantially the same as the drive assembly 356 of FIG. 16 except that a control actuator 560 is a hydraulic actuator. In this example, the control actuator 560 is an apply piston 560 configured to selectively disengage the control clutch arrangement 470. In an embodiment, the control actuator 560 is activated to act against a compressive force applied to the control clutch arrangement 470 by one or more springs. In this manner, a torque capacity of the control clutch arrangement 470 is reduced. Accordingly, the control clutch arrangement 470 is disengaged to damp or attenuate a torque increase or spike caused by operation of an input clutch arrangement 190, 230 effecting a change in gear ratio. The control actuator 560 is deactivated to effect engagement the control clutch arrangement 470 under the compressive force of the one or more springs. In an embodiment, an actuator linkage may be connected between the control actuator 560 and the control clutch arrangement 570 such that activation of the control actuator 560 effects movement of the actuator linkage to act against the compressive force.

The control actuator 560, implemented in this embodiment as an apply piston, is activated by being pressurized with hydraulic fluid, such as oil. The pressurized apply piston applies a force, either directly or via the actuator linkage, to act against the compressive force of the one or more springs. In this example, the hydraulic fluid is provided to the apply piston by a high pressure, but not high flow, pump. Pressure is controlled using a modulated control valve to feed the hydraulic fluid (i.e., oil) to the apply piston and modulate pressure.

Figure 18:
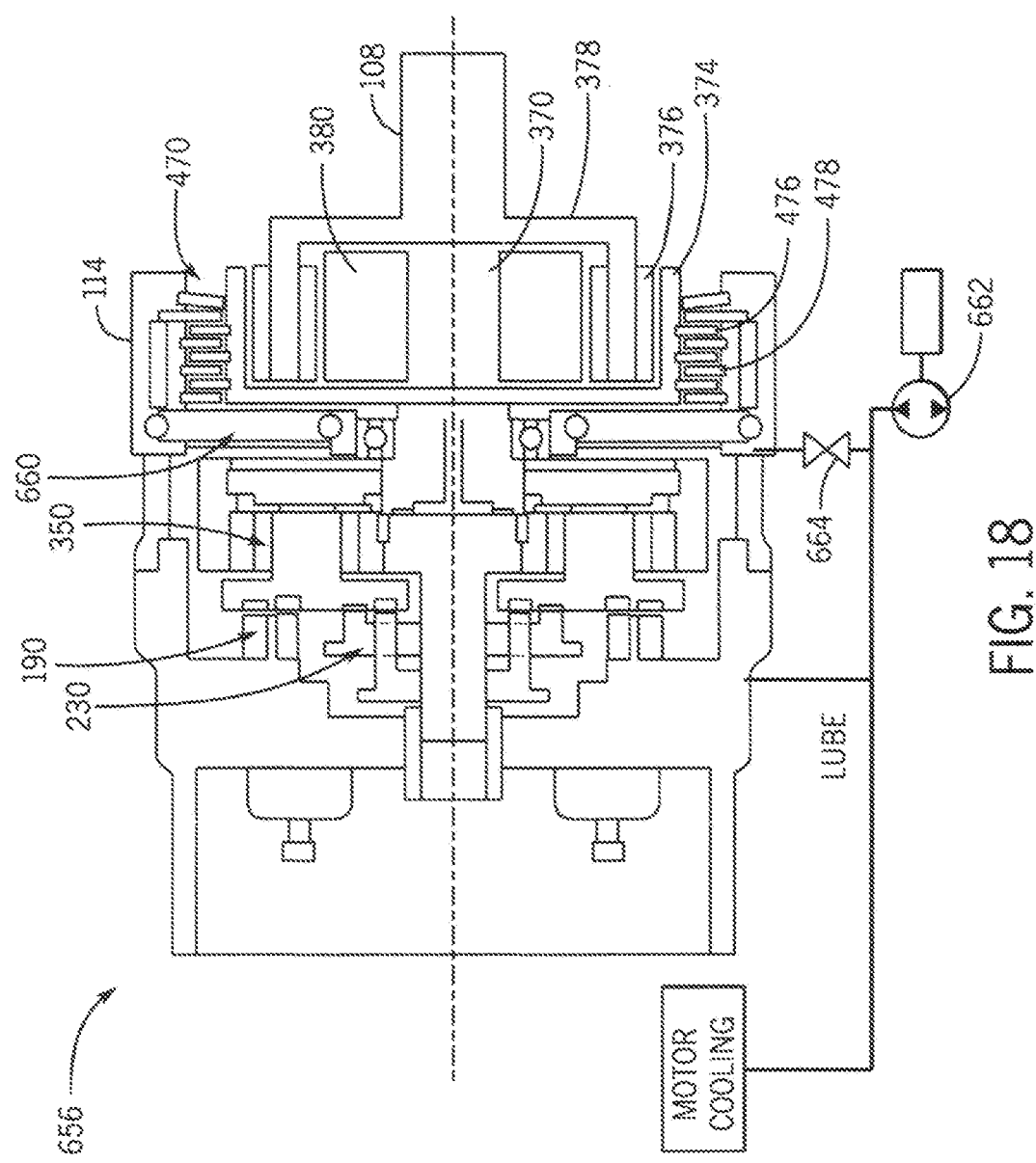

FIG. 18 is a cross-sectional view of a drive assembly 656 that is substantially the same as the drive assembly 556 of FIG. 17 except that a control actuator 660 is a large diameter apply piston configured to selectively disengage the control clutch arrangement 470. The control actuator 660 acts against a compressive force applied to the control clutch arrangement 470 by one or more springs to disengage the control clutch arrangement 470 in the same manner as the control actuator 560 described above.

In an embodiment, hydraulic fluid is provided to the large diameter apply piston 660 by a low pressure lube pump 662. The low pressure lube pump 662 may be, for example, an 80 PSI lube pump. Pressure is controlled using a modulated control valve 664 to feed the hydraulic fluid (i.e., oil) to the large diameter apply piston 660 and modulate pressure. Accordingly, the control actuator 660 can be activated to disengage the control clutch arrangement 470 to damp or attenuate a torque increase or spike caused by operation of a clutch arrangement 190, 230 at the input side effecting a change in gear ratio.

Figure 19:
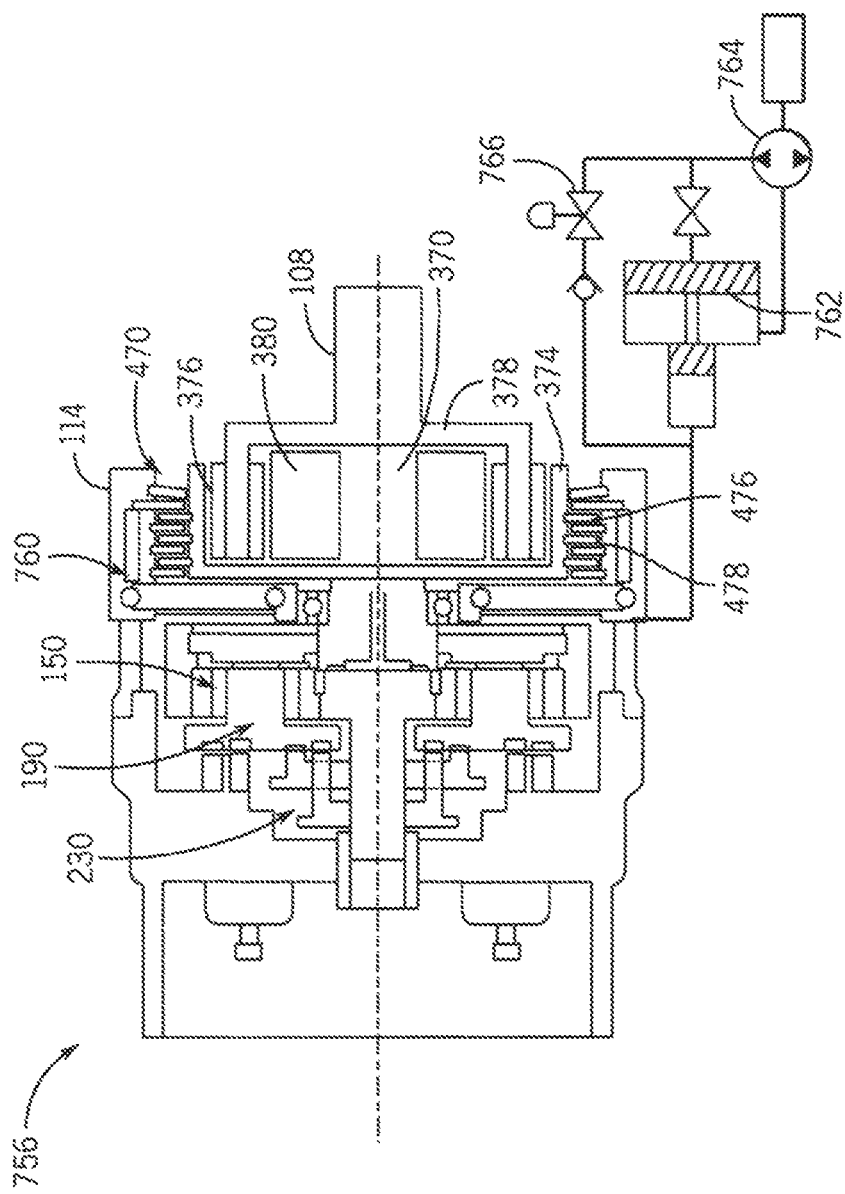

FIG. 19 is a cross-sectional view of a drive assembly 756 that is substantially the same as the drive assemblies 556, 656 of FIGS. 17 and 18, except that a control actuator 760 is a smaller diameter apply piston configured to selectively disengage the control clutch arrangement 470. In addition, a boost piston 762 is hydraulically connected to the small diameter apply piston 760 to further effect disengagement of the control clutch arrangement 470. The control actuator 760 acts against a compressive force applied to the control clutch arrangement 470 by one or more springs to disengage the control clutch arrangement 470 in the same manner as the control actuators 560, 660 described above.

In an embodiment, hydraulic fluid is provided to the small diameter apply piston 760 and the boost piston 762 by a low pressure lube pump 764. In this example, the low pressure lube pump 764 may be a 60-80 PSI lube pump. Pressure is controlled using a modulated control valve 766 to feed the hydraulic fluid (i.e., oil) to the low pressure side of the boost piston 762 and modulate pressure to the small diameter apply piston 760. Accordingly, the control actuator 760 can be activated to disengage the control clutch arrangement 470 to damp or attenuate a torque increase or spike caused by operation of an input clutch arrangement 190, 230 effecting a change in gear ratio.

In the embodiments above, the different control actuators 260, 460, 560, 660, 760 may be implemented to provide different power levels for actuating the control clutch arrangement 470. For example, as indicated above, a relatively large diameter clutch pack may require more power to disengage than a relatively small diameter clutch pack. In the embodiments above, the hydraulic actuators 560, 660, 760 may be used with control clutch configurations which benefit from additional actuation power.

Enumerated Examples of Work Vehicle
Multi-Speed Drive Assemblies with Clutch
Retention Mechanism The following examples of work vehicles multi-speed drive assemblies with clutch retention mechanism(s) are further provided and numbered for ease of reference.

1. A drive assembly for a work vehicle has a drive housing including at least one housing element forming a reaction member, a drive shaft rotatable about a drive axis relative to the reaction member, and a planetary gear set coupled to the drive shaft and configured to selectively rotate an output element. At least one clutch arrangement includes at least one clutch ring configured to selectively interact with the planetary gear set to effect a rotation speed of the output element, and at least one actuator is configured to axially drive the clutch ring along the drive axis to selectively interact with the planetary gear set. A retention mechanism is configured to retain the clutch ring at one or more axial positions along the drive axis. The retention mechanism includes a detent ball, a detent groove and a resilient member configured to urge the detent ball into the detent groove to retain the clutch ring at an axial position.

2. The drive assembly of example 1, wherein the one or more axial positions include a first axial position at which the clutch ring is disengaged from the planetary gear set and a second axial position at which the clutch ring is engaged with the planetary gear set.

3. The drive assembly of example 2, wherein the detent groove includes a first groove section and a second groove section arranged axially relative to the first groove section. The first groove section is configured to receive the detent ball to retain the clutch ring at the second axial position and the second groove section is configured to receive the detent ball to retain the clutch ring at the first axial position.

4. The drive assembly of example 3, wherein each groove section includes a first surface and a second surface and a peak at a junction of the first surface and the second surface.

5. The drive assembly of example 4, wherein the detent ball is urged into contact with at least one of the first surface and the second surface during movement along the drive axis between the first axial position and the second axial position.

6. The drive assembly of example 4, wherein the detent ball is urged into contact with the first surface and the second surface when the clutch ring is retained at the first axial position and the second axial position.

7. The drive assembly of example 4, wherein at least one of the first surface and the second surface is substantially linear.

8. The drive assembly of example 4, wherein at least one of the first surface and the second surface is curved.

9. The drive assembly of example 4, wherein the second surface of the first groove section and the second surface of the second groove section are adjacent to one another and form an intersection at a boundary of the first groove section and the second groove section.

10. The drive assembly of example 1, wherein the clutch ring is rotationally fixed to the drive shaft and is configured for axial movement on the drive shaft.

11. The drive assembly of example 10, wherein the detent groove is arranged on the clutch ring and the detent ball and resilient member are arranged on the drive shaft.

12. The drive assembly of example 1, further including a stationary spindle secured to a housing element of the at least one housing element forming a reaction member. The clutch ring is rotationally fixed to the stationary spindle and is configured for axial movement along the stationary spindle.

13. The drive assembly of example 12, wherein the detent groove is arranged on the clutch ring and the detent ball and the resilient member are arranged on the stationary spindle.

14. The drive assembly of example 2, wherein the actuator is configured to move the clutch ring from the first axial position to the second axial position.

15. The drive assembly of example 2, wherein the clutch ring includes engagement elements and the planetary gear set has corresponding engagement elements configured to receive the engagement elements of the corresponding clutch ring. The engagement elements and the corresponding engagement elements each have a square side and a ramped side. Relative rotation and engagement of the ramped sides causes the clutch ring to move axially from the second position to the first.

CONCLUSION

In the above-described example drive assemblies, a clutch ring may be releasably retained at an axial position with respect to a planetary gear set, such as a disengaged position or engaged position, independently from a corresponding input actuator. That is, an input actuator does not need to be maintained in an activated or energized state to retain a clutch ring at an axial position. Instead, an input actuator may be operated to reposition a clutch ring from one axial position to another, and a retention mechanism may retain the clutch ring at the axial position. Thus, after repositioning the clutch ring in a desired manner, the input actuator may be deactivated while the clutch ring is retained by the retention mechanism. In this manner, the input actuators may avoid periods of prolonged usage which may reduce heat output and likelihood overheating. The service life of the input actuator may be extended and maintenance frequency and/or downtime may be reduced.

In addition, the retention mechanism according to example drive assemblies herein may resist unintentional repositioning of a clutch ring, for example, in response incidental axial forces applied to the clutch ring during regular operation. Further, the retention mechanism described herein may allow movement of a clutch ring at an axial position within a predetermined range (i.e., axial play), and urge the clutch ring to a neutral position at the axial position in response to such movement.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A drive assembly for a work vehicle comprising:
   a drive housing including at least one housing element forming a reaction member;
   a drive shaft rotatable about a drive axis relative to the reaction member;
   a planetary gear set coupled to the drive shaft and configured to selectively rotate an output element;
   at least one clutch arrangement having at least one clutch ring configured to selectively interact with the planetary gear set to effect a rotation speed of the output element;
   at least one actuator configured to axially drive the clutch ring along the drive axis to selectively interact with the planetary gear set; and
   a retention mechanism configured to retain the clutch ring at one or more axial positions along the drive axis, the retention mechanism comprising a detent ball, a detent groove and a resilient member configured to urge the detent ball into the detent groove to retain the clutch ring at an axial position; and
   a stationary spindle secured to a housing element of the at least one housing element forming a reaction member, wherein the clutch ring is rotationally fixed to the stationary spindle and is configured for axial movement along the stationary spindle.

2. The drive assembly of claim 1, wherein the one or more axial positions include a first axial position at which the clutch ring is disengaged from the planetary gear set and a second axial position at which the clutch ring is engaged with the planetary gear set.

3. The drive assembly of claim 2, wherein the detent groove includes a first groove section and a second groove section arranged axially relative to the first groove section, wherein the first groove section is configured to receive the detent ball to retain the clutch ring at the second axial position and the second groove section is configured to receive the detent ball to retain the clutch ring at the first axial position.

4. The drive assembly of claim 3, wherein each groove section includes a first surface and a second surface and a peak at a junction of the first surface and the second surface.

5. The drive assembly of claim 4, wherein the detent ball is urged into contact with the first surface or the second surface, or both, during movement along the drive axis between the first axial position and the second axial position.

6. The drive assembly of claim 4, wherein the detent ball is urged into contact with the first surface and the second surface when the clutch ring is retained at the first axial position and the second axial position.

7. The drive assembly of claim 4, wherein the first surface or the second surface, or both, is substantially linear.

8. The drive assembly of claim 4, wherein the first surface and the second surface are linear.

9. The drive assembly of claim 4, wherein the second surface of the first groove section and the second surface of the second groove section are adjacent to one another and form an intersection at a boundary of the first groove section and the second groove section.

10. The drive assembly of claim 2, wherein the actuator is configured to move the clutch ring from the first axial position to the second axial position.

11. The drive assembly of claim 1, wherein the clutch ring is rotationally fixed to the drive shaft and is configured for axial movement on the drive shaft.

12. The drive assembly of claim 11, wherein the detent groove is arranged on the clutch ring and the detent ball and resilient member are arranged on the drive shaft.

13. The drive assembly of claim 1, wherein the detent groove is arranged on the clutch ring and the detent ball and the resilient member are arranged on the stationary spindle.

14. A drive assembly for a work vehicle comprising:
a drive housing including at least one housing element forming a reaction member;
a drive shaft rotatable about a drive axis relative to the reaction member;
a planetary gear set coupled to the drive shaft and configured to selectively rotate an output element;
at least one clutch arrangement having at least one clutch ring configured to selectively interact with the planetary gear set to effect a rotation speed of the output element;
at least one actuator configured to axially drive the clutch ring along the drive axis to selectively interact with the planetary gear set; and
a retention mechanism configured to retain the clutch ring at one or more axial positions along the drive axis, the retention mechanism comprising a detent ball, a detent groove and a resilient member configured to urge the detent ball into the detent groove to retain the clutch ring at an axial position;
wherein the one or more axial positions include a first axial position at which the clutch ring is disengaged from the planetary gear set and a second axial position at which the clutch ring is engaged with the planetary gear set;
wherein the clutch ring includes engagement elements and the planetary gear set has corresponding engagement elements configured to receive the engagement elements of the corresponding clutch ring, wherein the engagement elements and the corresponding engagement elements each have a square side and a ramped side; and
wherein relative rotation and engagement of the ramped sides causes the clutch ring to move axially from the second position to the first.

15. A drive assembly for a work vehicle comprising:
a drive housing comprising at least one housing element forming a stationary reaction member;
a stationary spindle secured to a housing element of the at least one housing element forming stationary reaction member;
a first drive shaft rotatable about a drive axis relative to the stationary reaction member and the stationary spindle;
a planetary gear set coupled to the first drive shaft and configured to selectively rotate an output element, the planetary gear set having a sun gear coupled to the drive shaft, a planet carrier, a set of planet gears supported by the planet carrier and engaging the sun gear, and a ring gear circumscribing and engaging the planet gears;
a plurality of clutch rings, each clutch ring interfaced with the stationary spindle or the drive shaft, and configured for movement along the drive axis to selectively engage and disengage the planet carrier;
a plurality of actuators, at least one actuator of the plurality of actuators configured for axially driving a corresponding clutch ring of the plurality of clutch rings along the drive axis from a first axial position to a second axial position; and
a plurality of retention mechanisms, each retention mechanism configured to retain the corresponding clutch ring at the first axial position and the second axial position along the drive axis;
wherein each retention mechanism comprises a detent ball, a detent groove and a resilient member configured to urge the detent ball into the detent groove to retain the corresponding clutch ring at the first axial position and the second axial position.

16. The drive assembly of claim 15, wherein the plurality of clutch rings includes a first low clutch ring interfaced with the stationary spindle, a second low clutch ring interfaced with the stationary spindle, a first high clutch ring interfaced with the drive shaft and a second high clutch ring interfaced with the drive shaft; and
wherein the plurality of retention mechanisms includes a first low retention mechanism interfaced with the stationary spindle and the first low clutch ring, a second low retention mechanism interfaced with the stationary spindle and the second low clutch ring, a first high retention mechanism interfaced with the drive shaft and the first high clutch ring, and a second high retention mechanism interfaced with the drive shaft and the second high clutch ring.

17. The drive assembly of claim 16, wherein each detent groove comprises a first groove section and a second groove section arranged axially relative to the first groove section, the first groove section configured to receive a corresponding detent ball to retain a corresponding clutch ring in the second axial position, and the second groove section configured to receive the corresponding detent ball to retain the corresponding clutch ring in the first axial position.

18. The drive assembly of claim 15, wherein the clutch rings are disengaged from the planet carrier when retained at the first axial position and are engaged with the planet carrier when retained at the second axial position.

19. The drive assembly of claim 18, wherein each clutch ring includes a plurality of engagement elements having a square side facing in one of a first rotational direction and a second rotational direction, and a ramped side facing in the other of the first rotational direction and the second rotational direction;
wherein the planet carrier includes corresponding engagement elements each having a square side facing the square side of the corresponding clutch ring engagement element and a ramped side facing the ramped side of the corresponding clutch ring engagement element;

wherein the engagement elements of the clutch rings are configured to engage the engagement elements of planet carrier when the clutch rings are in the second axial position; and wherein relative rotation about the drive axis between ramped sides of corresponding engagement elements of the clutch rings and the planet carrier cause the clutch rings to move from the second axial position to the first axial position.

* * * * *